US010081405B2

(12) United States Patent
McAndrews et al.

(10) Patent No.: US 10,081,405 B2
(45) Date of Patent: Sep. 25, 2018

(54) SADDLE ADJUSTMENT SYSTEM

(71) Applicant: Specialized Bicycle Components, Inc., Morgan Hill, CA (US)

(72) Inventors: Michael A. McAndrews, Capitola, CA (US); Ron Powers, Morgan Hill, CA (US); Brandon D. Sloan, Morgan Hill, CA (US); Jeffrey Keith Bowers, Morgan Hill, CA (US); Ian Thomas McPherson, Morgan Hill, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/950,903

(22) Filed: Apr. 11, 2018

(65) Prior Publication Data
US 2018/0229790 A1 Aug. 16, 2018

Related U.S. Application Data

(63) Continuation of application No. 15/635,759, filed on Jun. 28, 2017, now Pat. No. 9,944,337, which is a continuation of application No. 15/339,207, filed on Oct. 31, 2016, now Pat. No. 9,694,865, which is a continuation of application No. 14/446,173, filed on Jul. 29, 2014, now Pat. No. 9,481,420.

(60) Provisional application No. 61/861,348, filed on Aug. 1, 2013.

(51) Int. Cl.
F16M 11/00 (2006.01)
B62J 1/08 (2006.01)

(52) U.S. Cl.
CPC ............ *B62J 1/08* (2013.01); *B62J 2001/085* (2013.01)

(58) Field of Classification Search
None
See application file for complete search history.

(56) References Cited

U.S. PATENT DOCUMENTS

| 2,167,912 | A | 8/1939 | Schwinn |
| 3,758,154 | A | 9/1973 | Kitaguchi |
| 4,155,590 | A | 5/1979 | Cunningham |
| 5,048,891 | A | 9/1991 | Yach |
| 5,236,169 | A | 8/1993 | Johnsen |
| 5,295,727 | A | 3/1994 | Kao |

(Continued)

FOREIGN PATENT DOCUMENTS

| CN | 202728404 | 2/2013 |
| DE | 4401980 | 7/1995 |

(Continued)

*Primary Examiner* — Monica E Millner
(74) *Attorney, Agent, or Firm* — Knobbe Martens Olson & Bear LLP

(57) ABSTRACT

A saddle adjustment assembly comprising an adjustable height saddle post, the adjustable height saddle post comprising a first support and a second support, the second support configured to slidably move relative to the first support between at least a raised position and a lowered position, the first support configured to attach to a bicycle frame; a saddle angle adjustment mechanism coupled to the second support, the saddle angle adjustment mechanism comprising a rotatably coupled saddle support configured to couple to a bicycle saddle; wherein the saddle angle adjustment mechanism is configured to enable rotation of the saddle support relative to the second support as a result of the first support moving relative to the second support.

20 Claims, 43 Drawing Sheets

(56) References Cited

U.S. PATENT DOCUMENTS

| | | |
|---|---|---|
| 5,346,235 A | 9/1994 | Holman |
| 5,441,327 A | 8/1995 | Sanderson |
| 5,466,042 A | 11/1995 | Herman |
| 5,618,052 A | 4/1997 | Rendall |
| 5,664,829 A | 9/1997 | Thomson et al. |
| 5,713,555 A | 2/1998 | Zurfluh et al. |
| 5,826,935 A | 10/1998 | DeFreitas |
| 5,829,733 A | 11/1998 | Becker |
| 5,915,784 A | 6/1999 | Clark |
| 5,988,741 A | 11/1999 | Voss et al. |
| 6,095,538 A | 8/2000 | Maret |
| 6,354,557 B1 | 3/2002 | Walsh |
| 6,702,376 B1 | 3/2004 | Shen |
| 6,827,397 B1 | 12/2004 | Driver |
| 7,025,522 B2 | 4/2006 | Sicz et al. |
| 7,083,180 B2 | 8/2006 | Turner |
| 7,267,401 B2 | 9/2007 | Bertelloni |
| 7,621,595 B1 | 11/2009 | Chen |
| 7,673,936 B2 | 3/2010 | Hsu |
| 7,775,588 B2 | 8/2010 | Segato |
| 8,079,772 B1 | 12/2011 | Brennan et al. |
| 8,308,124 B2 | 11/2012 | Hsu |
| 8,414,070 B2 | 4/2013 | Hsieh |
| 8,454,086 B2 | 6/2013 | Kim |
| 8,480,170 B2 | 7/2013 | Lu et al. |
| 8,485,597 B2 | 7/2013 | Kim |
| 8,894,025 B2 | 11/2014 | Wehage et al. |
| 8,911,012 B2 | 12/2014 | Choi |
| 9,073,592 B2 | 7/2015 | Hsu |
| 9,481,420 B2 | 11/2016 | McAndrews |
| 2003/0227198 A1 | 12/2003 | Menayan |
| 2004/0036327 A1 | 2/2004 | Barandiaran Salaberria |
| 2007/0286671 A1 | 12/2007 | Meggiolan |
| 2009/0127898 A1 | 5/2009 | Segato |
| 2009/0192673 A1 | 7/2009 | Song |
| 2009/0324327 A1 | 12/2009 | McAndrews et al. |
| 2010/0187870 A1 | 7/2010 | Mackenroth |
| 2010/0194156 A1 | 8/2010 | Kim |
| 2010/0207351 A1 | 8/2010 | Klieber |
| 2010/0308628 A1 | 12/2010 | Hsu |
| 2010/0320814 A1 | 12/2010 | Singenberger et al. |
| 2011/0097139 A1 | 4/2011 | Hsu |
| 2011/0127813 A1 | 6/2011 | Kim |
| 2011/0210231 A1 | 9/2011 | D'Aluisio |
| 2011/0221245 A1 | 9/2011 | Kim |
| 2011/0254329 A1 | 10/2011 | Kim |
| 2012/0006949 A1 | 1/2012 | Laird et al. |
| 2012/0032414 A1 | 2/2012 | Kaiser |
| 2012/0139207 A1 | 6/2012 | Ferreira |
| 2012/0181824 A1 | 7/2012 | Hsu et al. |
| 2012/0228906 A1 | 9/2012 | McAndrews et al. |
| 2013/0123074 A1 | 5/2013 | Jun |
| 2013/0207424 A1 | 8/2013 | Choi |
| 2015/0034779 A1 | 2/2015 | McAndrews et al. |

FOREIGN PATENT DOCUMENTS

| | | |
|---|---|---|
| DE | 102005038565 | 2/2007 |
| DE | 202008007503 | 10/2008 |
| EP | 0542650 | 5/1993 |
| EP | 2402239 | 1/2012 |
| EP | 2514659 | 10/2012 |
| GB | 2493248 | 1/2013 |
| JP | H1059238 | 3/1998 |
| JP | 2010274896 | 12/2010 |
| TW | 478462 | 3/2002 |
| TW | M416586 | 11/2011 |

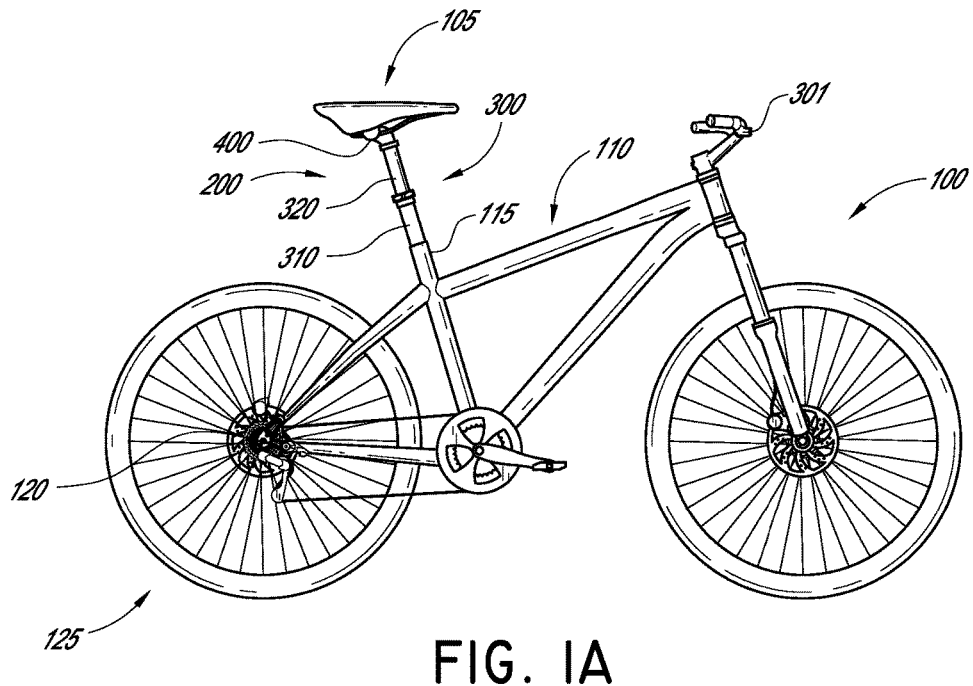
FIG. IA
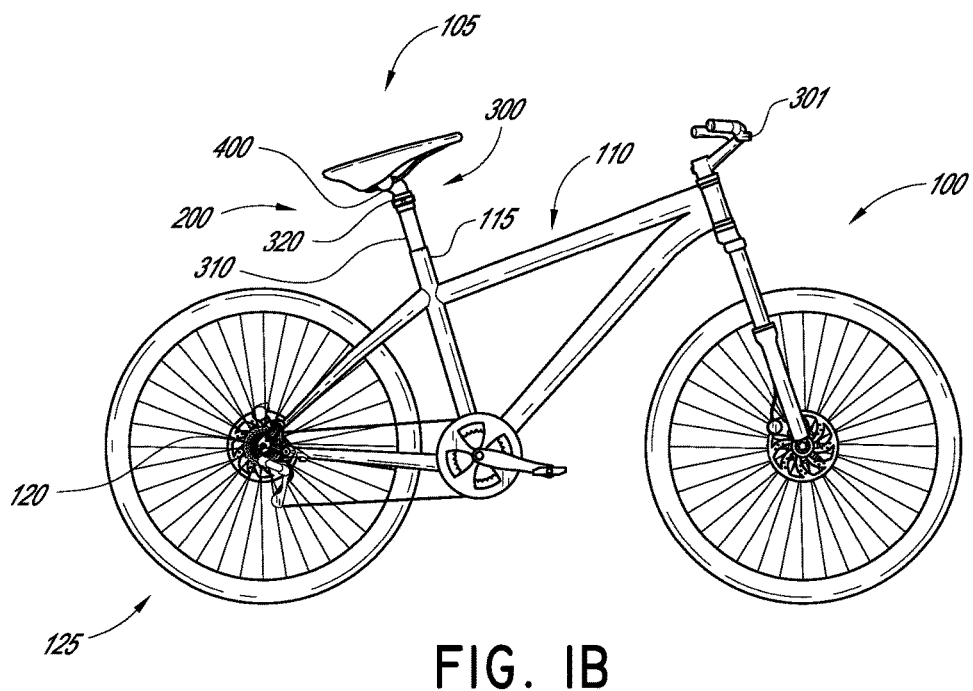
FIG. IB

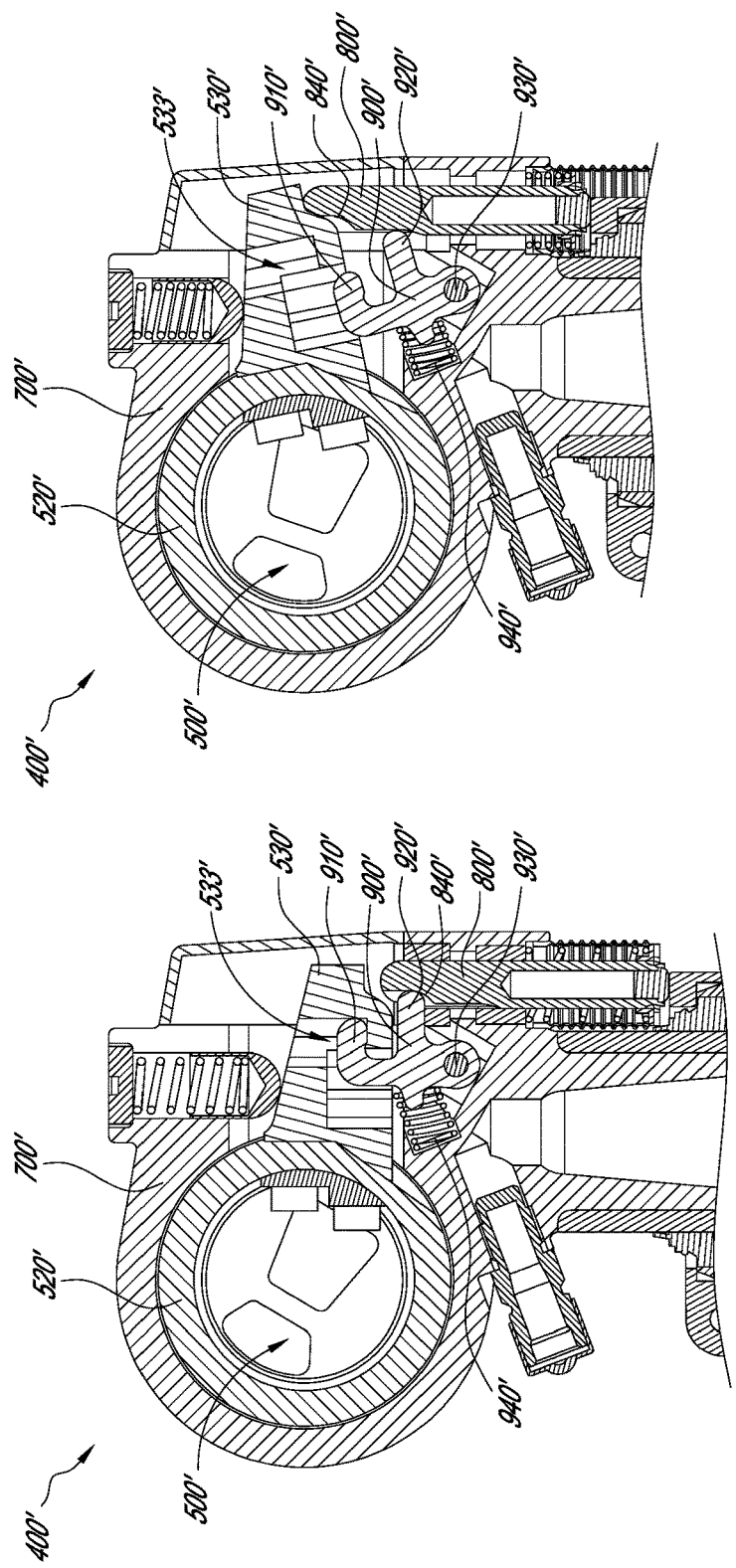

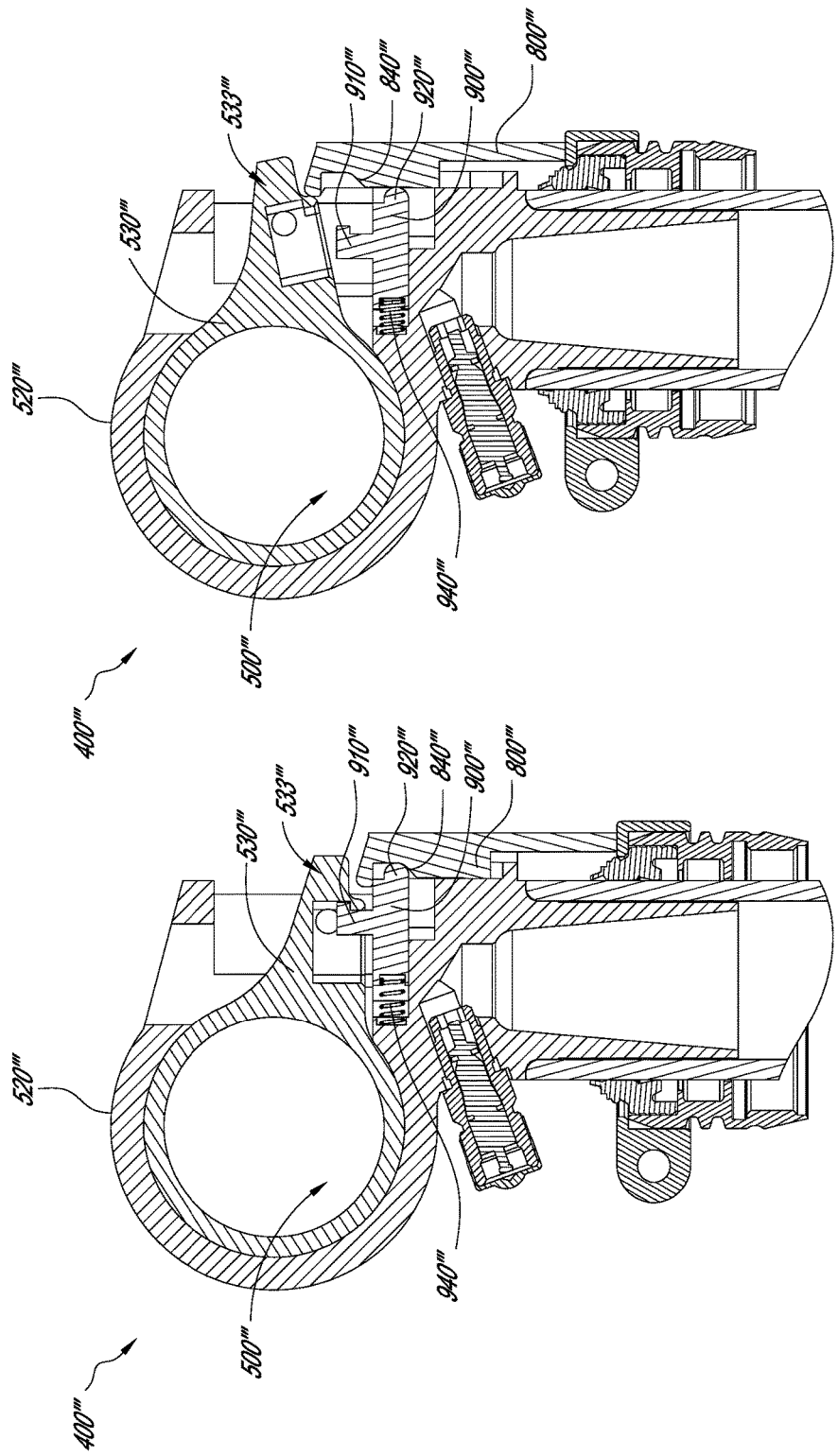

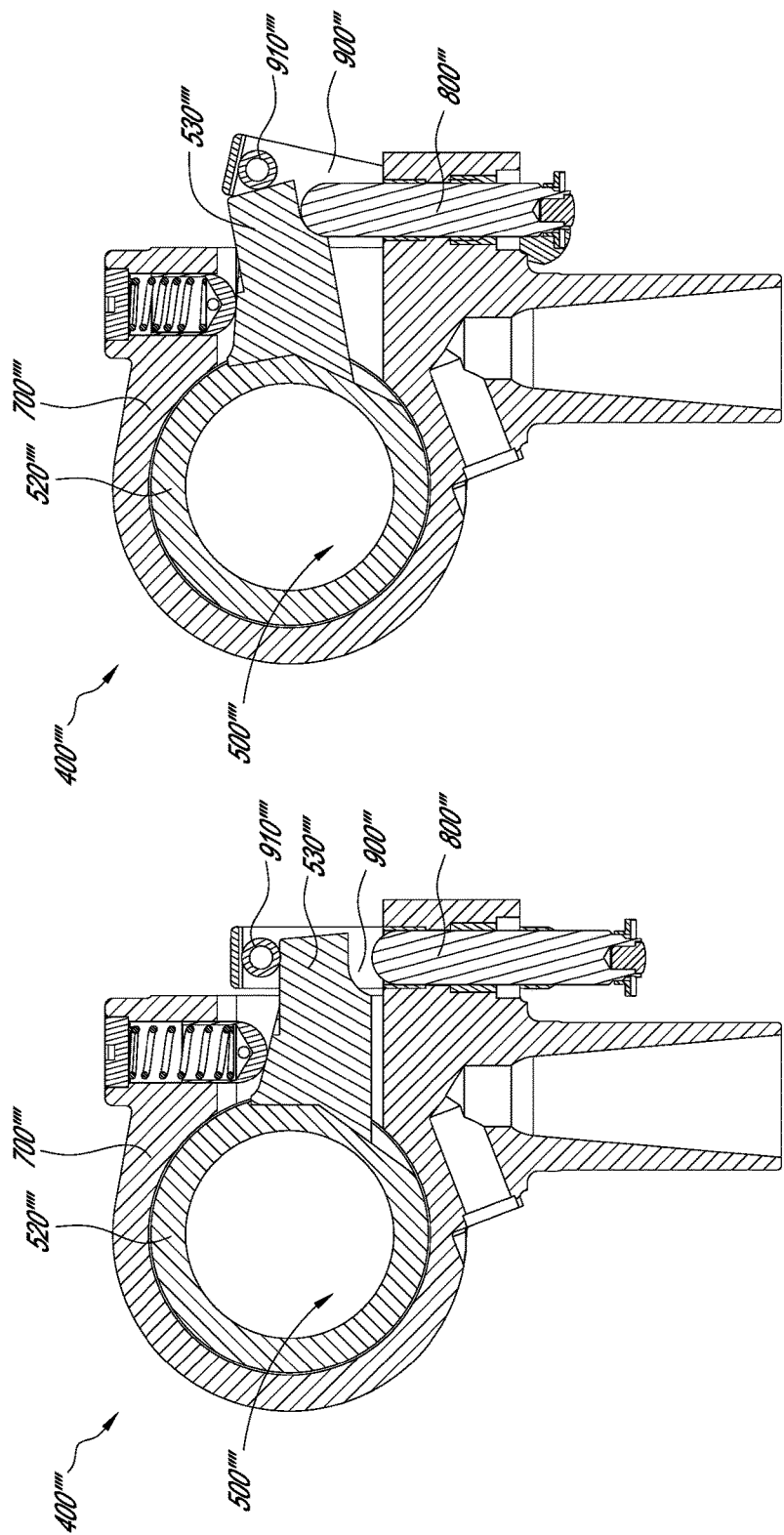

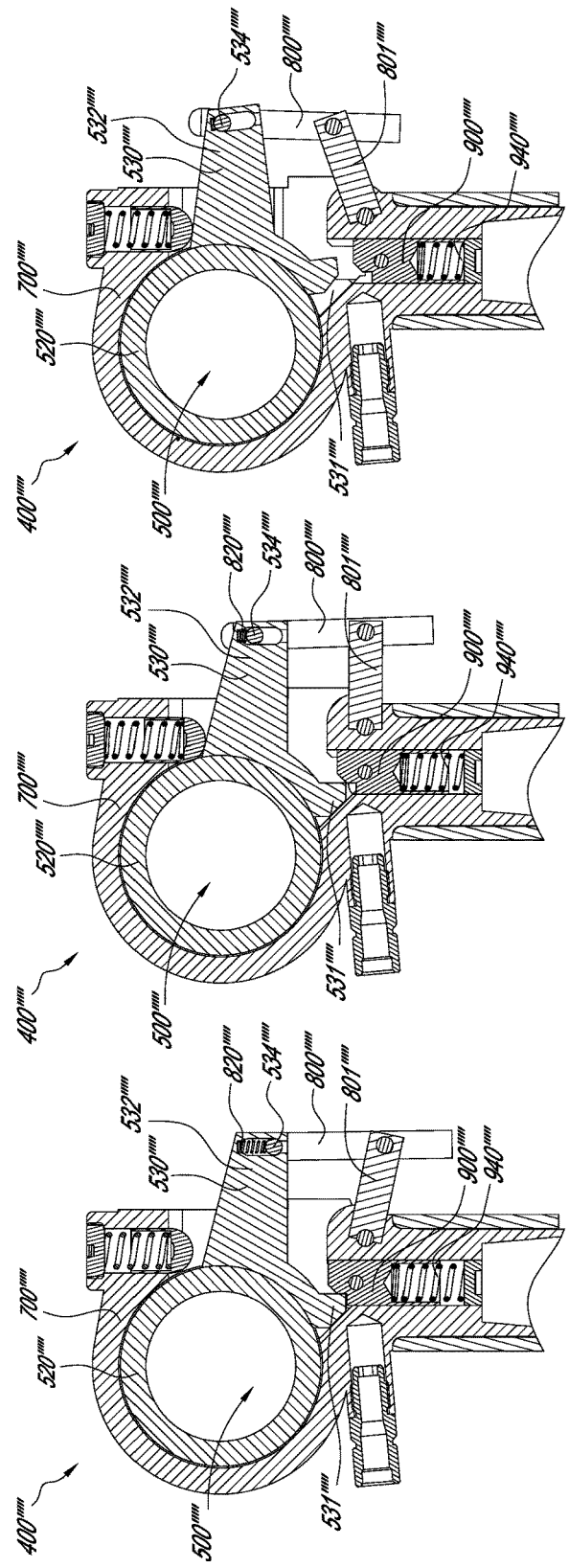

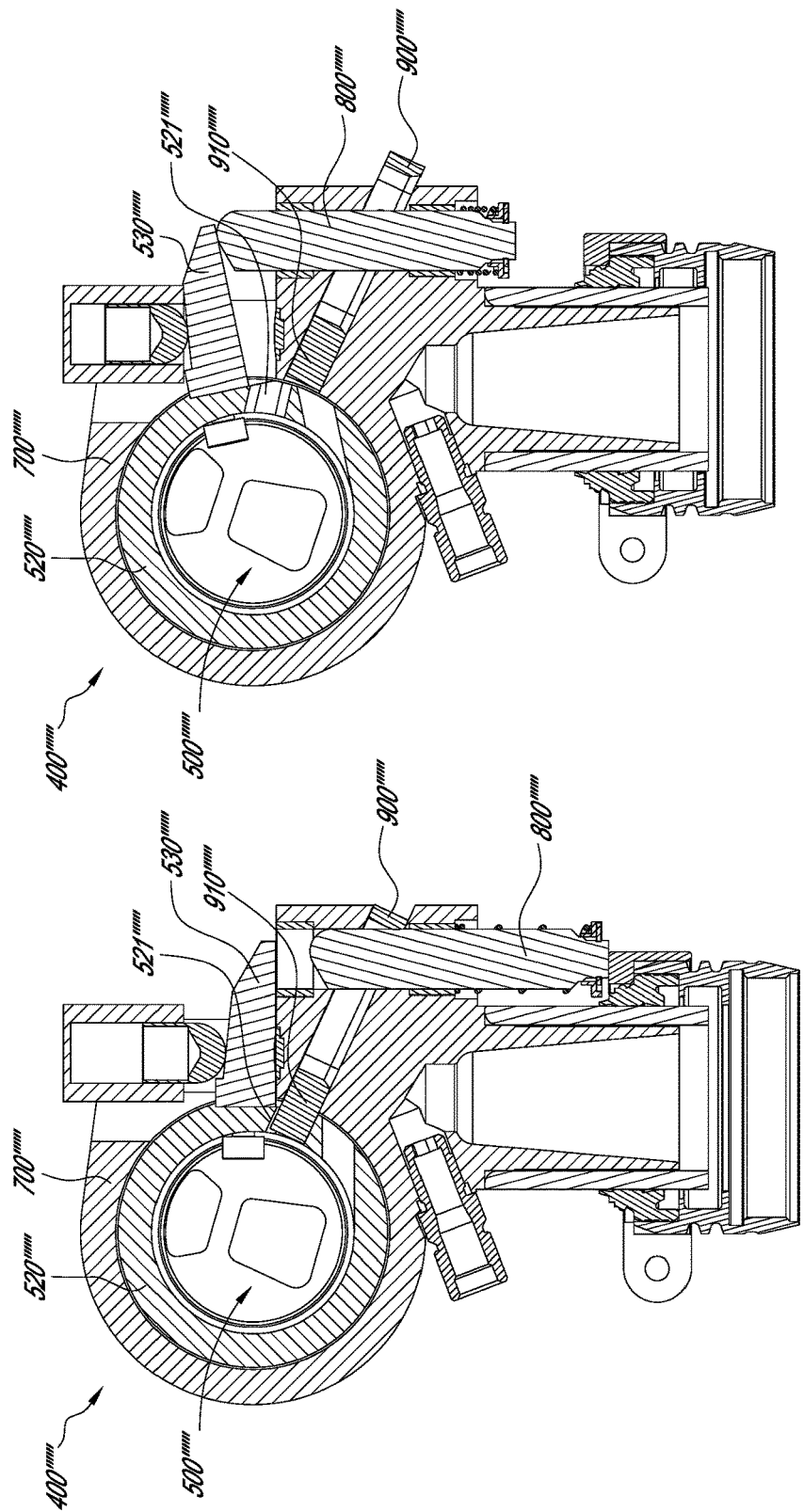

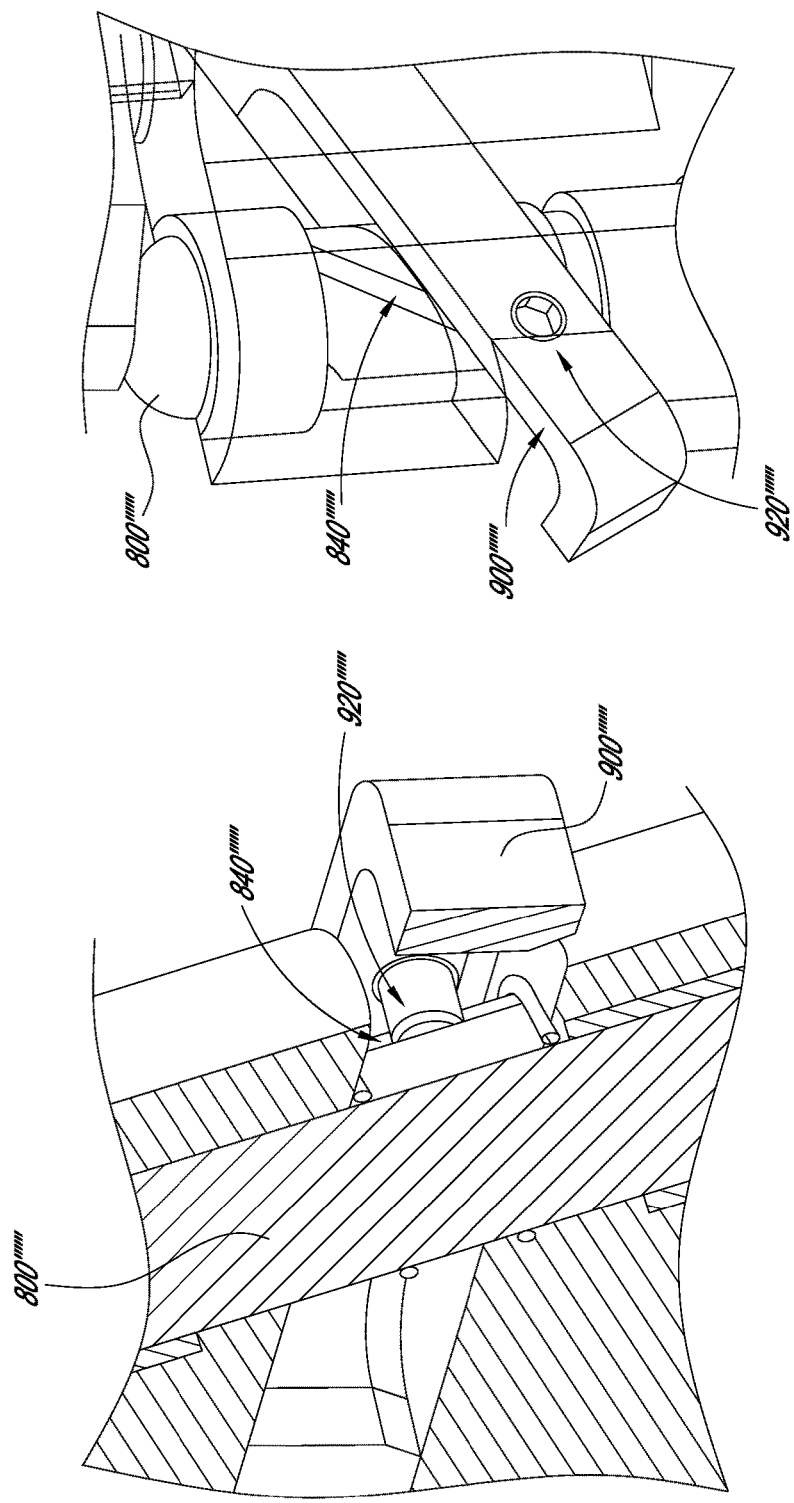

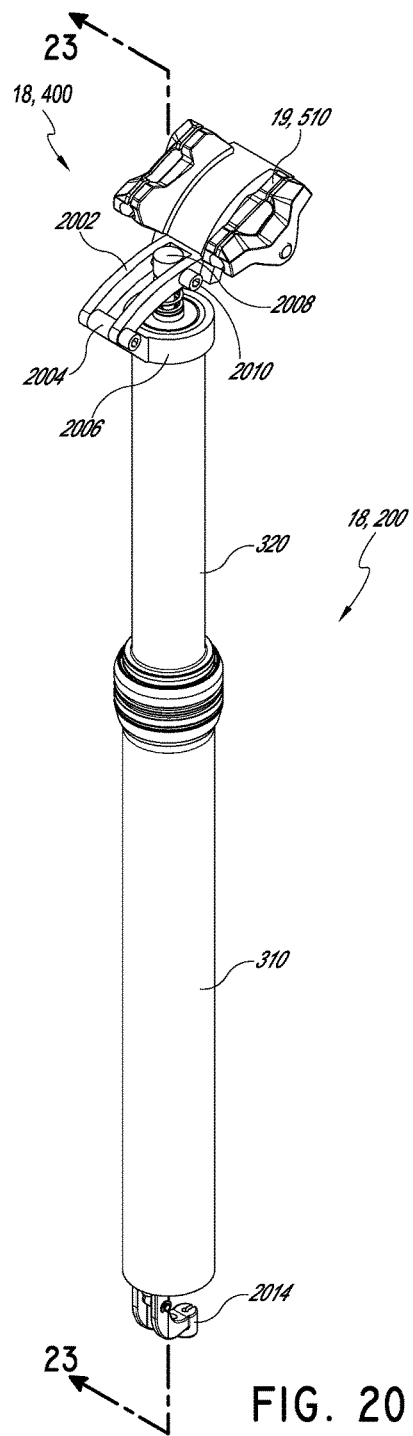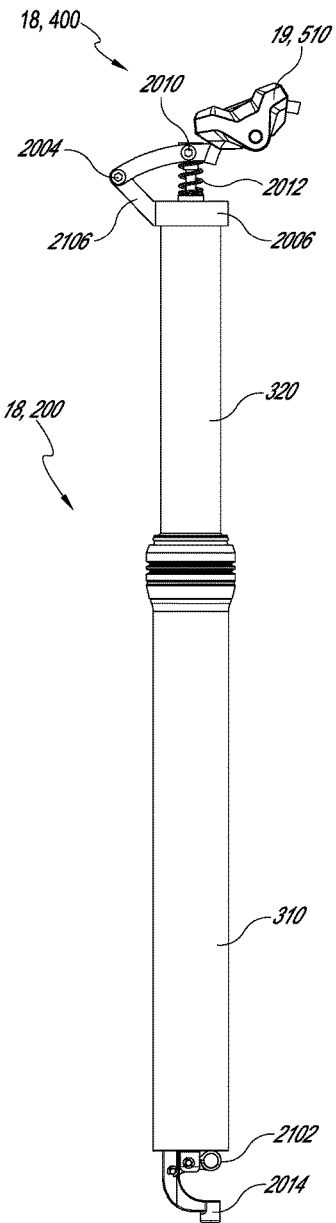
FIG. 20
FIG. 21

SADDLE ADJUSTMENT SYSTEM

CROSS-REFERENCE TO RELATED APPLICATIONS

This application is a continuation of U.S. patent application Ser. No. 15/635,759, titled SADDLE ADJUSTMENT SYSTEM, filed on Jun. 28, 2017, which is a continuation of U.S. patent application Ser. No. 15/339,207, titled SADDLE ADJUSTMENT SYSTEM, filed on Oct. 31, 2016, which is a continuation of U.S. patent application Ser. No. 14/446,173, titled SADDLE ADJUSTMENT SYSTEM, filed on Jul. 29, 2014, which claims the benefit of U.S. Provisional Application No. 61/861,348, titled SADDLE ADJUSTMENT SYSTEM, filed on Aug. 1, 2013. Each of the foregoing applications is hereby incorporated by reference herein in its entirety.

TECHNICAL FIELD

The present technology relates to bicycles and, in particular, saddle adjustment systems.

DESCRIPTION OF THE RELATED TECHNOLOGY

In certain situations, it may be desirable for a cyclist to selectively raise or lower a saddle while he or she is riding a bicycle. For example, it may be advantageous to lower the saddle when going downhill. Further, it may be advantageous to raise the saddle when climbing a hill. The height of the bicycle saddle may be important in determining a rider's power efficiency.

SUMMARY

The systems, methods and devices described herein have innovative aspects, no single one of which is indispensable or solely responsible for their desirable attributes. Without limiting the scope of the claims, some of the advantageous features will now be summarized.

One aspect of one embodiment is that it may be desirable for a cyclist to change the angle of a saddle while he or she is riding a bicycle. For example, it may be advantageous to angle the saddle forwards when the saddle is in a raised position and to angle the saddle rearwards when the saddle is in a lowered position.

In some embodiments, a bicycle assembly comprises a saddle adjustment assembly comprising: an adjustable height saddle post, the adjustable height saddle post including a first support and a second support, the second support configured to slidably move relative to the first support between at least a raised position and a lowered position, the first support configured to attach to a bicycle frame; a saddle angle adjustment mechanism coupled to the second support, the saddle angle adjustment mechanism comprising a body and a rotating assembly; wherein the rotating assembly is configured to couple to a bicycle saddle and wherein the rotating assembly is rotatably coupled to the body; wherein the saddle angle adjustment mechanism is configured to rotate the rotating assembly relative to the body as the first support moves relative the second support between a raised position and a lowered position.

According to some embodiments, a bicycle assembly comprises a saddle adjustment assembly which comprises an adjustable height saddle post, the adjustable height saddle post including a first support and a second support, the second support configured to slidably move relative to the first support between at least a raised position and a lowered position, the first support configured to attach to a bicycle frame, and a saddle angle adjustment mechanism coupled to the second support.

According to some embodiments, the saddle angle adjustment mechanism comprises a body.

According to some embodiments, the saddle angle adjustment mechanism comprises a rotating assembly.

According to some embodiments, the rotating assembly is configured to couple to a bicycle saddle and wherein the rotating assembly is rotatably coupled to the body, wherein the saddle angle adjustment mechanism is configured to rotate the rotating assembly relative to the body as the first support moves relative the second support between a raised position and a lowered position.

According to another embodiment, said saddle angle adjustment mechanism is configured to rotate between a predetermined first rotational position and a predetermined second rotational position.

According to another embodiment, said saddle angle adjustment mechanism rotates said rotating assembly relative the body as the second support moves relative the first support to the lowered position.

According to another embodiment, said bicycle assembly comprises a controller, the actuation of which permits the height of the adjustable height saddle post to be selectively adjusted while the bicycle is in motion.

According to another embodiment, said saddle adjustment assembly includes a first surface and said rotating assembly includes a second surface and wherein force exerted by said first surface on said rotating assembly causes said rotating assembly to rotate relative said body.

According to another embodiment, said bicycle assembly further comprising a bicycle frame.

According to another embodiment, a bicycle assembly comprises a saddle adjustment assembly which comprises a saddle angle adjustment mechanism configured to be supported by a bicycle seat post coupled to the second support, the saddle angle adjustment mechanism comprising a body and a rotating assembly, wherein the rotating assembly is configured to couple to a bicycle saddle and wherein the rotating assembly is rotatably coupled to the body, a controller, wherein the actuation of the controller enables the saddle adjustment assembly to permit the rotating assembly to rotate relative the body of the saddle angle adjustment mechanism, said controller configured to be manually actuated during riding.

According to another embodiment, the saddle adjustment assembly comprises an adjustable height saddle post having a first support and a second support movable relative one another and wherein movement of said first support and said second support relative one another permits the rotating assembly to rotate relative the body of the saddle angle adjustment mechanism. According to another embodiment, the saddle angle adjustment mechanism further comprises a stored energy device that rotates the rotating assembly. According to another embodiment, the stored energy device comprises at least one of the following: a mechanical spring, an air spring, a resilient member.

According to another embodiment, a method of adjusting a saddle angle of a bicycle saddle comprises affixing a first support of an adjustable height seat post to the seat tube of a bicycle, the adjustable height seat post having a second support slidably coupled to the first support and configured to adjust the saddle height of the bicycle saddle, the second support having a saddle angle adjustment mechanism affixed to the second support, the bicycle saddle rotatably coupled to the saddle angle adjustment mechanism; selectively adjusting the saddle height of the bicycle saddle while riding the bicycle, wherein adjusting the saddle height of the bicycle slides the second support relative to the first support permits the bicycle saddle to be rotated.

According to another embodiment, movement of the second support relative to the first support creates a force which rotates the saddle relative to said saddle angel adjustment mechanism.

According to another embodiment, a saddle angle adjustment mechanism for use with an adjustable height saddle post, the adjustable height saddle post including a first support and a second support, the second support configured to slidably move relative to the first support between a raised position and a lowered position, the first support adapted to attach to a bicycle frame, the saddle angle adjustment mechanism comprises a body comprising a support engaging portion, the support engaging portion adapted to be affixed to the second support of the adjustable height saddle post; a rotating assembly adapted to couple to a bicycle saddle, the rotating assembly rotatably coupled the body; wherein the saddle angle adjustment mechanism is configured to rotate the rotating assembly relative to the body between a first rotational position and a second rotational position; wherein the saddle angle adjustment mechanism is configured to lock the saddle receiver in the first rotational position when the second support is in the raised position, and wherein the saddle angle adjustment mechanism is configured to lock the saddle receiver in the second rotational position when the second support is in the lowered position.

According to another embodiment, the saddle adjustment mechanism is configured such that movement of the second support relative to the first support generates a force which locks the saddle receiver in the second rotational position when the second support is in the lowered position.

According to another embodiment, a saddle adjustment assembly comprises an adjustable height saddle post, the adjustable height saddle post including a first support and a second support, the second support configured to slidably move relative to the first support between a raised position and a lowered position, the first support adapted to attach to a bicycle frame; a saddle angle adjustment mechanism coupled to the second support, the saddle angle adjustment mechanism comprising a body and a rotating assembly; wherein the rotating assembly is adapted to couple to a bicycle saddle and wherein the rotating assembly is rotatably coupled to the body; wherein the saddle angle adjustment mechanism is configured to rotate the rotating assembly relative to the body between a first rotational position and a second rotational position; wherein the adjustable height saddle post is configured to selectably lock the first support in a raised position; wherein the adjustable height saddle post is configured to selectably lock the first support in a lowered position; wherein the saddle adjustment assembly is configured to lock the rotating assembly in the first rotational position when the second support is in the raised position, and wherein the saddle adjustment assembly is configured to lock the rotating assembly in the second rotational position when the second support is in the lowered position.

According to another embodiment, a method of adjusting the saddle angle of a bicycle saddle of a bicycle equipped with an adjustable height saddle post, the adjustable height saddle post including a first support and a second support, the second support configured to slidably move relative to the first support between a raised position and a lowered position, the first support adapted to attach to a bicycle frame, the saddle angle adjustment mechanism comprises providing a saddle angle adjustment mechanism coupled to the second support, the saddle angle adjustment mechanism comprising a rotating assembly, the saddle rotating assembly coupled to the saddle angle adjustment mechanism about a central axis substantially perpendicular to the second support of the adjustable height saddle post, adjusting the first support from the raised position to the lowered position, wherein the saddle angle adjustment mechanism is configured to rotate the rotating assembly relative to the second support from a first rotational position to a second rotational position when the second support is moved from the raised position to the lowered position.

According to another embodiment, a method of adjusting the saddle angle of a bicycle saddle of a bicycle equipped with an adjustable height saddle post, the adjustable height saddle post including a first support and a second support, the second support configured to slidably move relative to the first support between a raised position and a lowered position, the first support adapted to attach to a bicycle frame, the saddle angle adjustment mechanism comprises providing a saddle angle adjustment mechanism coupled to the second support, the saddle angle adjustment mechanism comprising a rotating assembly, the saddle receiver rotatably coupled to the saddle angle adjustment mechanism about a central axis substantially perpendicular to the second support of the adjustable height saddle post, adjusting the first support from the lowered position to the raised position, wherein the saddle angle adjustment mechanism is configured to rotate the rotating assembly relative to the second support from a second rotational position to a first rotational position when the second support is moved from the lowered position to the raised position.

According to another embodiment, the saddle angle adjustment mechanism is configured to rotate the rotating assembly from the first rotational position to the second rotational position when the second support is moved from the raised position to the lowered position.

According to another embodiment, the saddle angle adjustment mechanism is configured to rotate the rotating assembly from the second rotational position to the first rotational position when the second support is moved from the lowered position to the raised position.

According to another embodiment, the lowered position of the second support comprises the position within the adjustable range of the adjustable height saddle post at which the saddle angle adjustment mechanism is closest to the first support.

According to another embodiment, the raised position of the second support comprises all height positions of the second support significantly above the lowered position within the adjustable range of the adjustable height saddle post.

According to another embodiment, the rotating assembly comprises a saddle receiver, wherein the saddle receiver comprises a pair of rail receivers dimensioned to accept saddle rails of a bicycle saddle.

According to another embodiment, the rotating assembly comprises a drive yoke, the drive yoke configured to rotate within the body of the saddle angle adjustment mechanism along with the saddle receiver between a first rotational position and a second rotational position.

According to another embodiment, the saddle angle adjustment mechanism comprises a drive channel and a drive pin, the drive pin located within the drive channel and configured to slide within the drive channel.

According to another embodiment, the drive channel is substantially parallel to the second support.

According to another embodiment, the drive pin is configured to slide between a first pin position and a second pin position.

According to another embodiment, the drive pin is configured to contact a portion of the adjustable height saddle post when the second support is in a lowered position.

According to another embodiment, the drive pin is configured to slide from the first pin position to the second pin position when the adjustable height saddle post is adjusted to a lowered position.

According to another embodiment, the drive pin is configured to unlock the saddle angle adjustment mechanism when the drive pin moves from the first pin position to the second pin position.

According to another embodiment, the drive pin is configured to contact a portion of the drive yoke when the drive pin is in a second pin position.

According to another embodiment, the drive pin is configured to rotate the rotating assembly from a first rotational position to a second rotational position when the drive pin moves from the first pin position to the second pin position.

According to another embodiment, the saddle angle adjustment mechanism further comprises a drive spring configured to bias the drive pin towards the first pin position.

According to another embodiment, the saddle angle adjustment mechanism further comprises a return spring configured to bias the drive yoke towards the first rotational position.

According to another embodiment, the saddle angle adjustment mechanism further comprises a cam.

According to another embodiment, the drive pin includes a ramp to cooperate with the cam.

According to another embodiment, the cam is configured to lock the rotating assembly in a first rotational position when the drive pin is in a first pin position.

According to another embodiment, the cam is configured to unlock the rotating assembly when the drive pin moves from the first pin position to the second pin position.

According to another embodiment, the first rotational position is approximately 15 degrees from the second rotational position.

According to another embodiment, the first rotational position of the saddle receiver is configured to position the saddle substantially level to the ground.

According to another embodiment, the saddle angle adjustment mechanism has a saddle angle range of adjustment greater than 10 degrees.

According to another embodiment, the saddle angle adjustment assembly is configured to rotate the saddle as saddle height is adjusted.

According to another embodiment, the body comprises a central bore having a central axis substantially perpendicular to the second support of the adjustable height saddle post.

According to some embodiments, a bicycle assembly comprises a saddle adjustment assembly, the saddle adjustment assembly comprises: an adjustable height saddle post, the adjustable height saddle post comprising a first support and a second support, the second support configured to slidably move relative to the first support between at least a raised position and a lowered position, the first support configured to attach to a bicycle frame; a saddle angle adjustment mechanism coupled to the second support, the saddle angle adjustment mechanism comprising a rotatably coupled saddle support configured to couple to a bicycle saddle; wherein the saddle angle adjustment mechanism is configured to enable rotation of the saddle support relative to the second support as a result of the first support moving relative to the second support.

In some embodiments, the saddle angle adjustment mechanism further comprises an actuation surface positioned to contact a portion of the saddle post when the first and second supports are in a predetermined relative position, wherein movement of the actuation surface caused by the first support moving relative to the second support enables the rotation of the saddle support. In some embodiments, the predetermined relative position is at or near the lowered position. In some embodiments, the saddle angle adjustment mechanism is configured to enable rotation of the saddle support relative to the second support in a first direction when the second support is at or near the lowered position and in a second direction opposite the first direction when the second support is not at or near the lowered position. In some embodiments, rotation of the saddle support in the second direction is caused by a force generated by the saddle angle adjustment mechanism, and wherein rotation of the saddle support in the first direction is cause by an external force applied to the saddle support. In some embodiments, the saddle angle adjustment mechanism further comprises first and second stop surfaces, the first stop surface configured to limit an amount of rotation of the saddle support in the first direction, the second stop surface is configured to limit an amount of rotation of the saddle support in the second direction. In some embodiments, the saddle angle adjustment mechanism further comprises a damping mechanism that damps the rotation of the saddle support. In some embodiments, the saddle post further comprises a locking mechanism configured to lock the second support in position relative to the first support in the raised position, the lowered position, and a plurality of positions therebetween. In some embodiments, the locking mechanism comprises a collet positioned at least partially within an interior cavity of the second support. In some embodiments, said saddle support is configured to rotate between a predetermined first rotational position and a predetermined second rotational position. In some embodiments, said saddle angle adjustment mechanism rotates said saddle support relative the second support as the second support moves relative the first support to the lowered position. In some embodiments, the bicycle assembly further comprises a controller, the actuation of which permits the height of the adjustable height saddle post to be selectively adjusted while the bicycle is in motion. In some embodiments, said saddle adjustment assembly further comprises a piston and wherein force exerted by the piston on the saddle support causes the saddle support to rotate relative to the second support. In some embodiments, the bicycle assembly further comprises a bicycle frame.

According to some embodiments, a saddle angle adjustment mechanism for use with an adjustable height saddle post, the adjustable height saddle post including a first support and a second support, the second support configured to slidably move relative to the first support between a raised position and a lowered position, the first support adapted to attach to a bicycle frame, the saddle angle adjustment mechanism comprises: an actuating mechanism comprising a support engaging portion, the support engaging portion adapted to be affixed to the second support of the adjustable height saddle post; and a saddle support assembly adapted to couple to a bicycle saddle, the saddle support assembly rotatably coupled to the actuating mechanism; wherein the actuating mechanism is configured to enable rotation of the saddle support assembly in only a first direction relative to the second support when the second support is in the raised position, and wherein the actuating mechanism is configured to enable rotation of the saddle support assembly in only a second direction opposite the first direction when the second support is in the lowered position.

In some embodiments, the saddle angle adjustment mechanism further comprises a first stop surface that sets a maximum rotation of the saddle support in the first direction, the saddle support being in a first rotational position at the maximum rotation in the first direction, wherein the actuating mechanism is configured to retain the saddle support in the first rotational position when the saddle support is in the first rotational position and the second support is in the raised position. In some embodiments, the saddle angle adjustment mechanism further comprises a second stop surface that sets a maximum rotation of the saddle support in the second direction, the saddle support being in a second rotational position at the maximum rotation in the second direction, wherein the actuating mechanism is configured to retain the saddle support in the second rotational position when the saddle support is in the second rotational position and the second support is in the lowered position. In some embodiments, the actuating mechanism further comprises: a first body comprising a first cavity and a second cavity; and a second body slidably coupled to the first body and at least partially surrounding the first body, wherein, when the second body is in a first position relative to the first body, fluid in the first cavity is able to flow to the second cavity, enabling a piston coupled to the saddle support to move in a direction that rotates the saddle support in the first direction, and wherein, when the second body is in a second position relative to the first body, fluid in the second cavity is able to flow to the first cavity, enabling the piston to move in a direction that rotates the saddle support in the second direction. In some embodiments, when the second body is in the first position relative to the first body, a first fluid flow path is open, enabling the fluid in the first cavity to flow to the second cavity, and when the second body is in the second position relative to the first body, a second fluid flow path is open, enabling the fluid in the second cavity to flow to the first cavity. In some embodiments, the second body comprises an actuation surface configured to contact a mating surface to cause the second body to translate relative to the first body. In some embodiments, the mating surface is part of the adjustable height saddle post. In some embodiments, the mating surface is part of a collet used to adjust the height of the adjustable height saddle post. In some embodiments, the mating surface is part of a bicycle frame. In some embodiments, the actuating mechanism further comprises a damper to damp the rotation of the saddle support. In some embodiments, the actuating mechanism further comprises a stored energy device to rotate the saddle support in the first direction. In some embodiments, the stored energy device comprises at least one of the following: a mechanical spring, an air spring, a resilient member.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements.

FIG. 1A illustrates a side view of a bicycle including one embodiment of a saddle angle adjustment assembly in a raised position and the saddle at a first saddle angle.

FIG. 1B illustrates a side view of a bicycle including one embodiment of a saddle angle adjustment assembly in a lowered position and the saddle at a second saddle angle.

FIGS. 6A-6B illustrate an additional embodiment of a saddle angle adjustment mechanism.

FIGS. 8A-8B illustrate an additional embodiment of a saddle angle adjustment mechanism.

FIGS. 9A-9D illustrate an additional embodiment of a saddle angle adjustment mechanism.

FIGS. 10A-10D illustrate an additional embodiment of a saddle angle adjustment mechanism.

FIGS. 11A-11D illustrate an additional embodiment of a saddle angle adjustment mechanism.

FIG. 20 illustrates a perspective view of the saddle angle adjustment assembly of FIG. 18A.

FIG. 21 illustrates a side view of the saddle angle adjustment assembly of FIG. 18A.

DETAILED DESCRIPTION

Figure 2:
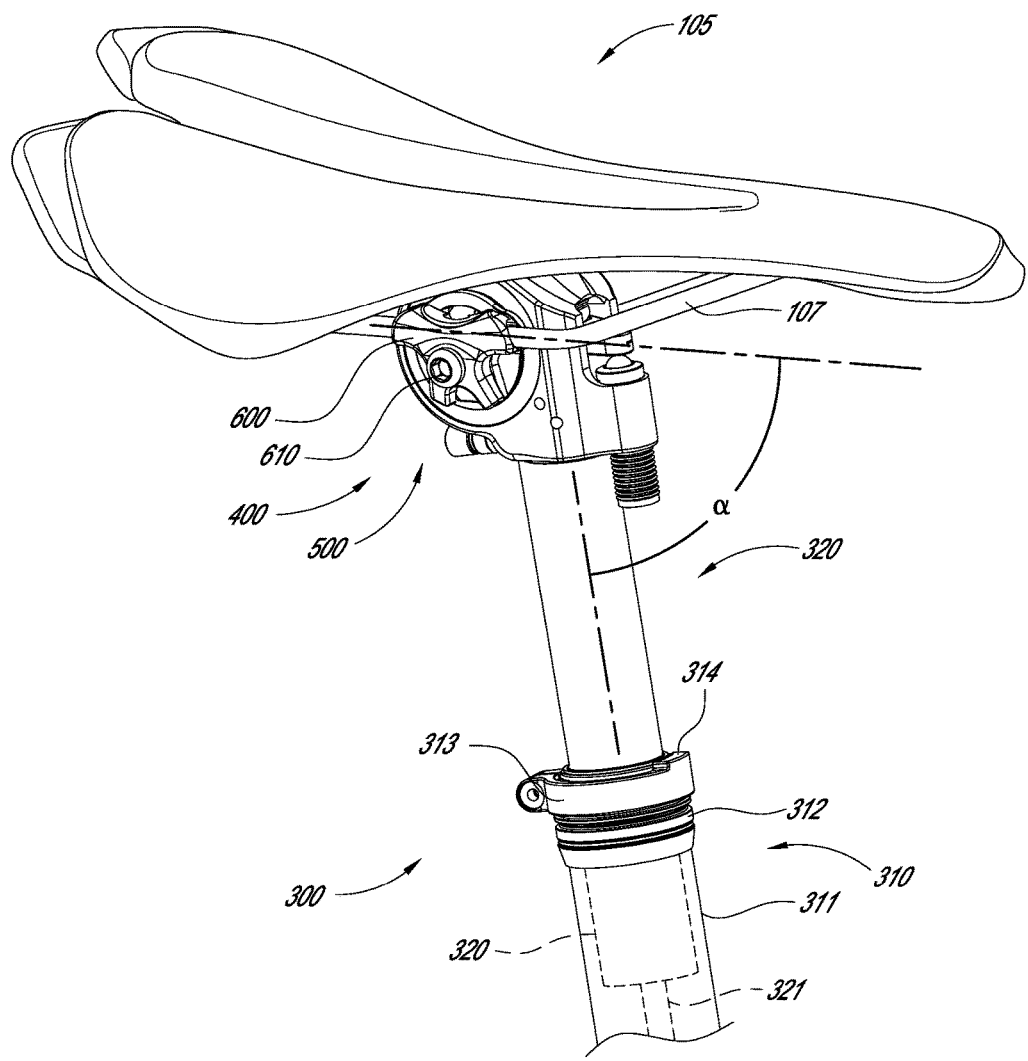
FIG. 2 illustrates a perspective view of a saddle coupled to one embodiment of a saddle angle adjustment assembly.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

This application is directed to embodiments of saddle angle adjustment assemblies, with one embodiment being a saddle angle adjustment assembly 200 for a bicycle 100 as shown in FIG. 1A. The saddle angle adjustment assembly 200 can include an adjustable height saddle post 300 and a saddle angle adjustment mechanism 400. U.S. Patent Application Publication No. 2012/0228906, which is hereby incorporated by reference in its entirety and made a part of the present application, and U.S. Patent Application Publication No. 2009/0324327, which is hereby incorporated by reference in its entirety and made part of the application, each describe one or more embodiments of an adjustable height saddle post. The adjustable height saddle post 300 can be desirably configured to enable the rider to selectively adjust the height of the saddle 105. The adjustable height saddle post 300 can be selectively adjusted by the rider via a controller 301, desirably mounted on the handlebars, while the rider is riding the bicycle. The saddle angle adjustment mechanism 400 can be desirably configured to cooperate with the adjustable height saddle post 300 to adjust the saddle angle α (See FIG. 2) when the rider selectively raises or lowers the saddle 105. In some embodiments, including the embodiments illustrated in FIGS. 2 and 3, the saddle angle adjustment mechanism 400 can be affixed to the top of the adjustable height saddle post 300 and be configured to automatically angle the saddle rearwards when the seat is lowered via the adjustable height saddle post 300.

Saddle angle adjustment mechanisms as disclosed herein have a variety of benefits. For example, when a rider is riding a bicycle, there may be different situations where the rider wishes his or her saddle to be at a different height. For example, when riding uphill, the rider may wish the saddle to be in a higher position than when riding downhill. Further, in some situations, such as when riding downhill, a rider may wish the saddle to be down and out of the way, because the rider may not even desire to use the saddle. However, if a saddle is merely dropped, such as by lowering an adjustable height saddle post, several things can occur. For example, when the rider goes to reengage the saddle, the rider's clothing, such as shorts, may catch on a back edge of the saddle. Further, the rider's body may strike the back edge of the saddle, potentially harming sensitive body parts.

The saddle angle adjustment mechanisms disclosed herein provide solutions to many of these problems. For example, in some embodiments, a saddle angle adjustment mechanism can be configured to rotate a saddle to a backward or lowered position when the saddle post is at a lowered position. For example, when a rider is riding downhill, the rider can operate a lever and use his or her body weight to lower the saddle post and tilt the seat backward. The rider can then lean backward off of the saddle (or otherwise disengage from the saddle) to ride the bicycle downhill without using the saddle. The saddle post and saddle will remain in their lowered and tilted back positions, respectively. When the rider wishes to reengage the saddle, such as when the downhill grade stops and the bike is again on level surface, the rider or rider can gently and comfortably reengage the saddle. With the saddle being tipped backward, there is a lower chance that the back edge of the saddle will catch on the rider's clothing. Further, a backward tilted saddle presents a larger surface area of contact for the rider in re-engaging the saddle, lessening a chance of injuring a rider by enabling the rider to gently reengage the saddle. This limits the risk that the back edge of the saddle roughly contacts a sensitive area of the rider's body.

Some embodiments of adjustable angle saddle mechanisms as disclosed herein further provide damping in the saddle angle adjustment. This can be advantageous for various reasons, such as to reduce injury and increase comfort. For example, when a rider reengages the saddle, the rider will likely wish for the saddle to tilt back forward and/or upward, and the saddle post to move upward into a raised position, sometimes known as the power position. However, without damping, the saddle may snap forward and/or upward and strike the rider, potentially injuring the rider. By including damping in the saddle angle adjustment mechanism, the saddle can return to the upper, forward, and/or power position in a comfortable and controlled manner.

In various embodiments, as will be appreciated by one of skill in the art from the forgoing disclosure, a saddle angle adjustment mechanism can be configured to rotate a saddle about an axis of rotation located at various locations. For example, an axis of rotation may be transverse or perpendicular to and centered on the saddle post and/or a central axis of the saddle post. In another embodiment, the axis of rotation may be perpendicular to and positioned behind the saddle post and/or central axis of the saddle post. In another embodiment, the axis of rotation may be perpendicular to and positioned in front of the saddle post and/or central axis of the saddle post. In various embodiments, the axis of rotation may be positioned in line with, in front of, or behind a midpoint of the saddle. In some embodiments, an axis of rotation being located in front of the saddle post and/or forward of a midpoint of the saddle may be advantageous. For example, such a configuration may provide a longer lever (e.g., bigger mechanical advantage) when a rider tilts the saddle backward by moving his or her weight to a rear of the saddle.

FIG. 1A illustrates a side view of a bicycle 100 including one embodiment of a saddle angle adjustment assembly 200 in a raised position and the saddle 105 at a first saddle angle. FIG. 1B illustrates a side view of a bicycle 100 including one embodiment of a saddle angle adjustment assembly 200 in a lowered position and the saddle 105 at a second saddle angle. The adjustable height saddle post 300 can include a first support, such as, for example a lower support 310 and a second support, such as, for example, an upper support 320. The lower support 310 can be adapted to attach to a bicycle frame 110 of a bicycle 100. In some embodiments, the lower support 310 can slide within a seat tube 115 of a bicycle frame 110 and be clamped in place such that the lower support 310 does not move relative to the seat tube 115 of the bicycle frame 110 while the bicycle 100 is ridden. The upper support 320 can be configured to slidably move relative to the lower support 310 between a raised position, as illustrated in FIG. 1A, and a lowered position, as illustrated in FIG. 1B. In some embodiments, the upper support 320 can be configured to slide within at least a portion of the lower support 310.

The adjustable height saddle post 300 can include an adjustable range. The "lowered position" of the upper support 320 comprises the position within the adjustable range of the adjustable height saddle post 300 at which the saddle angle adjustment mechanism 400 is closest to the lower support 310. The "raised position" of the upper support 320 comprises all height positions of the upper support 320 above the lowered position within the adjustable range of the adjustable height saddle post 300.

In some embodiments, the adjustable range of the adjustable height saddle post 300 can be greater than ¼". In some embodiments, the adjustable range of the adjustable height saddle post 300 can be greater than ½". In some embodiments, the adjustable range of the adjustable height saddle post 300 can be greater than 1". In some embodiments, the adjustable range of the adjustable height saddle post 300 can be greater than 2". In some embodiments, the adjustable range of the adjustable height saddle post 300 can be greater than 3". In some embodiments, the adjustable range of the adjustable height saddle post 300 can be greater than 4". In some embodiments, the adjustable range of the adjustable height saddle post 300 can be greater than 5". In some embodiments, the adjustable range of the adjustable height saddle post 300 can be greater than 6". In some embodiments, the adjustable range of the adjustable height saddle post 300 can be greater than 7". In some embodiments, the adjustable range of the adjustable height saddle post 300 can be greater than 8". In some embodiments, the adjustable range of the adjustable height saddle post 300 can be greater than 9". In some embodiments, the adjustable range of the adjustable height saddle post 300 can be greater than 10". In some embodiments, the adjustable range of the adjustable height saddle post 300 can be greater than 11". In some embodiments, the adjustable range of the adjustable height saddle post 300 can be greater than 12". In some embodiments, the adjustable range of the adjustable height saddle post 300 can be greater than 1" and less than 12". In some embodiments, the adjustable range of the adjustable height saddle post 300 can be greater than 2" and less than 10". In some embodiments, the adjustable range of the adjustable height saddle post 300 can be greater than 3" and less than 8". In some embodiments, the adjustable range of the adjustable height saddle post 300 can be greater than 4" and less than 6".

In some embodiments, the adjustable height saddle post 300 can include a spring configured to urge the upper support 320 towards a raised position relative to the first support 310. In some embodiments, the spring can be an air spring. In some embodiments, the adjustable height saddle post 300 can include a locking mechanism adapted to limit movement between the lower support 310 and upper support 320 when the locking mechanism is in a locked position and to allow relative movement between the lower support 310 and upper support 320 when the locking mechanism is in an unlocked position. In some embodiments, the locking mechanism can be located at the bottom of the adjustable height saddle post 300. In some embodiments, the locking mechanism can be located at the bottom of the upper support 320. In some embodiments, the locking mechanism can include a biasing member configured to default the locking mechanism to a locked position. When the locking mechanism is unlocked the spring can desirably urge the upper support 320 towards a raised position. The rider can overcome the force provided by the spring by applying a downward force on the saddle 105 with the weight of their body and urge the lower support 310 towards the lowered position when the rider selectively unlock the locking mechanism. Once the rider releases the controller 301, the locking mechanism can be configured to move to a locked position and limit movement between the lower support 310 and upper support 320.

In some embodiments, the locking mechanism can include a controller 301 such that the rider can selectively unlock the locking mechanism. In some embodiments, the locking mechanism is configured such that the rider can unlock the locking mechanism while the rider is riding the bicycle 100. The controller 301 can include a lever or button which the rider can push or rotate to unlock the locking mechanism. The controller 301 can be located in a convenient location for the rider, which may include for example, the handlebars as illustrated in FIG. 1A. In some embodiments, the controller 301 can be connected to the locking mechanism with a cable 321. The cable 321 can desirably be routed through the bicycle frame 110 from the controller 321 and engage the locking mechanism. In some embodiments, the locking mechanism is located at the bottom of the adjustable height seat post 300 located within the bicycle frame 110. In other embodiments, the cable 321 can be routed outside the frame.

In some embodiments, the saddle angle adjustment assembly 200 can be configured to manipulate the saddle angle α (See FIG. 2) of the saddle 105. In some embodiments, the saddle angle adjustment mechanism 400 can be affixed to the upper support 320 such that the saddle angle adjustment mechanism 400 moves up and down with the upper support 320. The saddle angle adjustment mechanism 400 can be configured to manipulate the saddle angle of the saddle 105 about a saddle rotation axis. The saddle rotation axis can be substantially parallel to an axis defined by the rear dropout of the bicycle frame, which corresponds to the rear axle 120 of the rear wheel assembly 125 of the bicycle 100 as illustrated in FIG. 1A. In some embodiments, the saddle angle adjustment mechanism 400 can be configured to rotate the saddle 105 between a first saddle angle, as illustrated in FIG. 1A, and a second saddle angle, as illustrated in FIG. 1B. In some embodiments, the saddle 105 can be arranged substantially parallel to the ground plane when the saddle 105 is positioned at a first saddle angle. In some embodiments, the saddle angle adjustment mechanism 400 can rotate the saddle 105 rearwards, counterclockwise when viewed from the perspective of FIGS. 1A and 1B, from the first saddle angle to the second saddle angle. In some embodiments, the saddle angle adjustment mechanism 400 can rotate the saddle 105 forwards, clockwise when viewed from the perspective of FIGS. 1A and 1B, from the second saddle angle to the first saddle angle.

In some embodiments, the saddle angle adjustment mechanism 400 is configured to rotate the saddle 105 rearwards when the adjustable height saddle post 300 is adjusted from a raised position to a lowered position. The saddle angle adjustment mechanism 400 can be configured to rotate the saddle 105 forwards when the adjustable height saddle post 300 is adjusted from a lowered position to a raised position. The saddle angle adjustment mechanism 400 can be configured to lock the saddle 105 at a first saddle angle when the adjustable height saddle post 300 is in a raised position. In some embodiments, the saddle angle adjustment mechanism 400 can be configured to lock the saddle 105 at a second saddle angle when the adjustable height saddle post 300 is in a lowered position. In some embodiments, the saddle angle adjustment mechanism 400 can be configured to unlock the saddle when the adjustable height saddle post 300 is adjusted from a lowered position to a raised position, allowing the saddle 105 to rotate from a second saddle angle to a first saddle angle.

FIG. 2 illustrates a perspective view of a saddle 105 coupled to one embodiment of a saddle angle adjustment assembly 200. In some embodiments, the lower support 310 can include a tube portion 311 and a sealing portion 312. In some embodiments, the adjustable height saddle post 300 can include an impact surface 314. In some embodiments, the lower support 310 can include an impact surface 314. In some embodiments, the sealing portion 312 of the lower support 310 can include an impact surface 314. In some embodiments, the saddle angle adjustment assembly 200 can include an optional actuating unit 313 configured to be releasably coupled to the lower support 310. In some embodiments, the actuating unit 313 can be configured to couple to the sealing portion 312 of the lower support 310. In some embodiments, the actuating unit 313 can include an impact surface 314. The impact surface 314 can be configured to contact a portion of the main unit of the saddle angle adjustment mechanism 400, which may include for example, a drive pin 800, when the adjustable height saddle post 300 is lowered to a lowered position.

Figure 3:
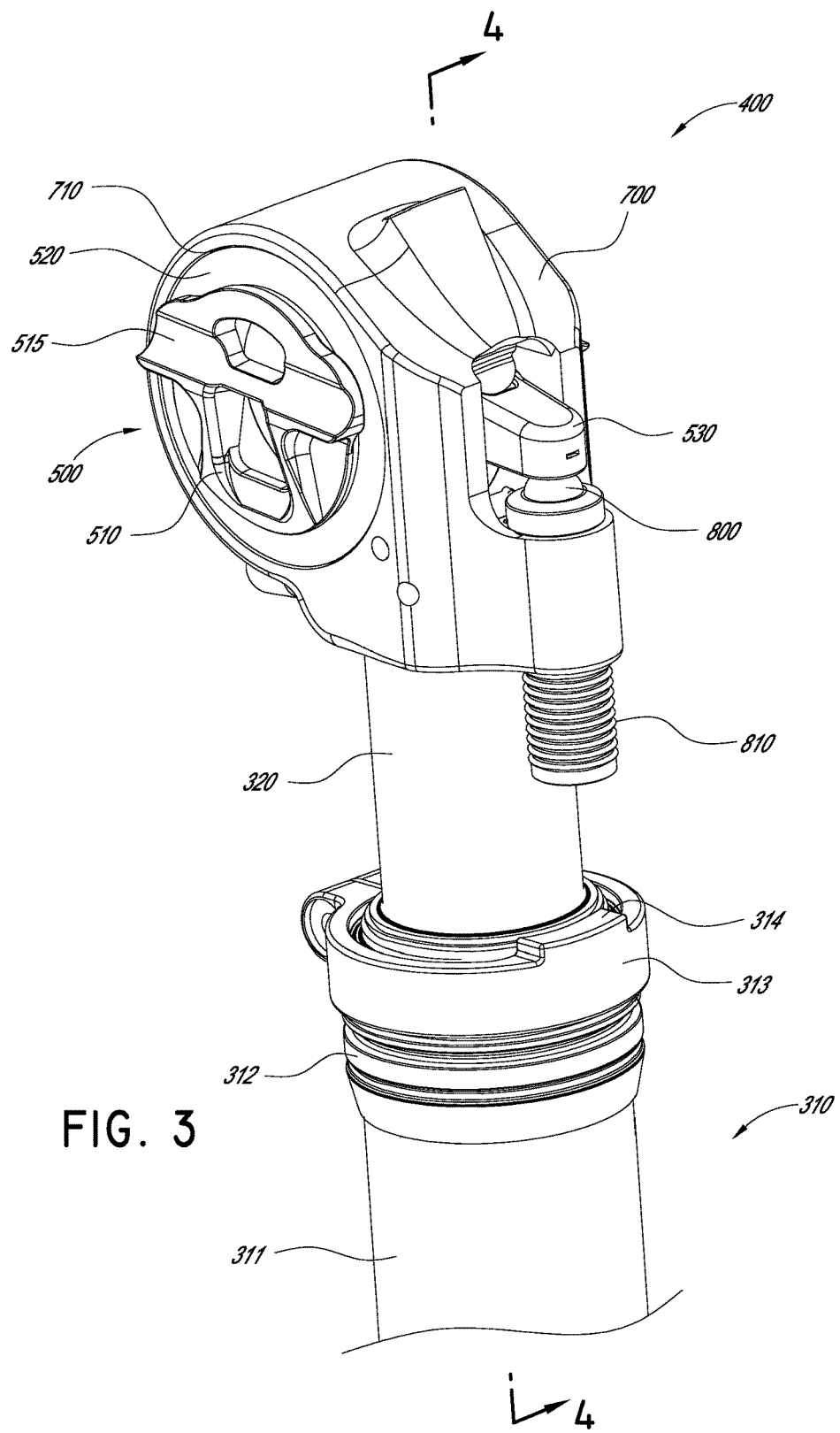
FIG. 3 illustrates a perspective view of the saddle angle adjustment assembly of FIG. 2.

In some embodiments, including the embodiment illustrated in FIG. 2, the saddle angle adjustment mechanism 400 can be affixed to a top portion of the upper support 320 of the adjustable height saddle post 300. In some embodiments, the saddle angle adjustment mechanism 400 can include a saddle receiver 510 configured to couple to the saddle 105. Some bicycle saddles 100 incorporate saddle rails 107 as part of a mounting system between the saddle 105 and a main body of a conventional saddle post. In some embodiments, the saddle receiver 510 can incorporate at least one rail receiving feature such as a rail receiver 515, as illustrated in FIG. 3, configured to accept a saddle rail 107 of the saddle 105. In some embodiments, the saddle receiver 510 can include a rail retaining member 600, such as a rail cap, adapted to be positioned adjacent the rail 107 and opposite the saddle receiver 510 to lock the rail 107 of the saddle 105 to the saddle receiver 510.

The rail receiver 515 of the saddle receiver 510, as illustrated in FIG. 3, defines a partially cylindrical surface which defines a rail receiving axis which is collinear with the central axis of the portion of the rail 107 engaging the saddle angle adjustment mechanism 400, as illustrated in FIG. 2. The saddle angle "a" is defined by the angle between the rail receiving axis and the central axis of the upper support 320 of the adjustable height seat post.

In some embodiments, the saddle angle adjustment mechanism 400 can have a saddle angle $\alpha$ range of adjustment between the first saddle angle and the second saddle angle. In some embodiments, the saddle angle $\alpha$ range of adjustment can be greater than 5 degrees. In some embodiments, the saddle angle $\alpha$ range of adjustment can be greater than 10 degrees. In some embodiments, the saddle angle $\alpha$ range of adjustment can be greater than 15 degrees. In some embodiments, the saddle angle $\alpha$ range of adjustment can be greater than 20 degrees. In some embodiments, the saddle angle $\alpha$ range of adjustment can be greater than 30 degrees. In some embodiments, the saddle angle $\alpha$ range of adjustment can be greater than 35 degrees. In some embodiments, the saddle angle $\alpha$ range of adjustment can be greater than 40 degrees. In some embodiments, the saddle angle $\alpha$ range of adjustment can be greater than 45 degrees. In some embodiments, the saddle angle $\alpha$ range of adjustment can be between 5 and 45 degrees. In some embodiments, the saddle angle $\alpha$ range of adjustment can be between 5 and 35 degrees. In some embodiments, the saddle angle $\alpha$ range of adjustment can be between 10 and 25 degrees. In some embodiments, the saddle angle $\alpha$ range of adjustment can be between 15 and 20 degrees.

In some embodiments, an adjustment of the adjustable height saddle post 300 of at least ½" can result in an adjustment of the saddle angle $\alpha$ of at least 5 degrees. In some embodiments, an adjustment of the adjustable height saddle post 300 of at least ½" can result in an adjustment of the saddle angle $\alpha$ of at least 10 degrees. In some embodiments, an adjustment of the adjustable height saddle post 300 of at least ½" can result in an adjustment of the saddle angle $\alpha$ of at least 15 degrees. In some embodiments, an adjustment of the adjustable height saddle post 300 of at least ½" can result in an adjustment of the saddle angle $\alpha$ of at least 20 degrees.

In some embodiments, an adjustment of the adjustable height saddle post 300 of at least 1" can result in an adjustment of the saddle angle $\alpha$ of at least 5 degrees. In some embodiments, an adjustment of the adjustable height saddle post 300 of at least 1" can result in an adjustment of the saddle angle $\alpha$ of at least 10 degrees. In some embodiments, an adjustment of the adjustable height saddle post 300 of at least 1" can result in an adjustment of the saddle angle $\alpha$ of at least 15 degrees. In some embodiments, an adjustment of the adjustable height saddle post 300 of at least 1" can result in an adjustment of the saddle angle $\alpha$ of at least 20 degrees.

In some embodiments, an adjustment of the adjustable height saddle post 300 of at least 2" can result in an adjustment of the saddle angle $\alpha$ of at least 5 degrees. In some embodiments, an adjustment of the adjustable height saddle post 300 of at least 2" can result in an adjustment of the saddle angle α of at least 10 degrees. In some embodiments, an adjustment of the adjustable height saddle post 300 of at least 2" can result in an adjustment of the saddle angle α of at least 15 degrees. In some embodiments, an adjustment of the adjustable height saddle post 300 of at least 2" can result in an adjustment of the saddle angle α of at least 20 degrees.

In some embodiments, an adjustment of the adjustable height saddle post 300 of at least 3" can result in an adjustment of the saddle angle α of at least 5 degrees. In some embodiments, an adjustment of the adjustable height saddle post 300 of at least 3" can result in an adjustment of the saddle angle α of at least 10 degrees. In some embodiments, an adjustment of the adjustable height saddle post 300 of at least 3" can result in an adjustment of the saddle angle α of at least 15 degrees. In some embodiments, an adjustment of the adjustable height saddle post 300 of at least 3" can result in an adjustment of the saddle angle α of at least 20 degrees.

FIG. 3 illustrates a perspective view of the saddle angle adjustment assembly 200 of FIG. 2. In some embodiments, the rail receiver 515 of the saddle receiver 510 can include a curved surface adapted to engage the rail 107 of the saddle. In some embodiments, the saddle angle adjustment mechanism 400 can include a rail retaining fastener configured to couple the rail retaining members 600 to the saddle adjustment assembly. In some embodiments, the saddle receiver 510 can include an aperture configured such that a rail retaining fastener 610 can pass through the saddle receiver 510 and engage the opposite retaining member, coupling each rail retaining member 600 to the saddle angle adjustment mechanism 400 and coupling the saddle 105 to the saddle angle adjustment mechanism 400. The rail retaining fastener 610 can include a head portion and a shank portion. The head portion can include a surface adapted to engage a portion of the rail retaining member 600 and force the rail retaining member 600 against the rotating assembly 500 of the saddle angle adjustment mechanism 400. The shank portion can include external threads configured to engage a rail retaining member 600 or a nut which includes internal threads. In some embodiments, the rail retaining member 600 can include a threaded bore configured to engage one or more rail retaining fasteners 610. In some embodiments, the saddle angle adjustment mechanism 400 can include a nut including a surface adapted to engage a portion of a rail retaining member 600 and force the rail retaining member 600 against the rotating assembly 500 of the saddle angle adjustment mechanism 400. In other embodiments, the saddle receiver 510 can include a threaded bore configured to engage one or more rail retaining member fasteners 610. In some embodiments, the saddle receiver 510 can include other means for coupling to the saddle 105 which may include for example, a snap fit, a clamp assembly, a quick release clamp, a cam lock assembly, etc.

In some embodiments, including the embodiment illustrated in FIG. 3, the saddle angle adjustment mechanism 400 can include a rotating assembly 500. The rotating assembly 500 can include the saddle receiver 510. In some embodiments the rotating assembly 500 can include an outer member 520. In some embodiments, the outer member 520 can be cylindrical in shape having an inner surface and an outer surface. In some embodiments, the outer member 520 is affixed to the saddle receiver 510 such that the saddle receiver 510 and outer member 520 rotate together. In some embodiments, the saddle receiver 510 can be formed in one integral piece. In some embodiments, the saddle receiver 510 can comprise a plurality of pieces. In some embodiments, the saddle receiver 510 can comprise a left portion and a right portion, the left portion configured to engage the left saddle rail of the saddle 105 and the right portion configured to engage the right saddle rail 107 of the saddle 105. In some embodiments, the left portion and right portion can be affixed to one another. In some embodiments, the left portion and right portion can each be affixed to the outer member 520. In some embodiments, the left portion and right portion can be formed integrally. In other embodiments, the saddle receiver 510 can be affixed to the outer member 520. In some embodiments, the left portion and right portion of the saddle receiver 510 can include a tapered portion configured to engage tapered portions of the inner surface of the outer member 520. In some embodiments, the left portion and right portion of the saddle receiver 510 can be free to rotate relative to the rest of the rotating assembly until the rail retaining fastener 610 is tightened down, pulling the left portion toward the right portion and causing the tapered portion of the left portion and right portion to engage the tapered portions of the inner surface of the outer member 520. The friction between the tapered portions can prevent the saddle receiver 510 from rotating relative to the rest of the rotating assembly. In some embodiments, the tapered portions can include protrusions or recesses to prevent rotation between the saddle receiver 510 and the outer member 520, which may include for example, ridges, ribs, slots, splines, etc. In other embodiments, the saddle receiver 510 can be affixed to the outer member 520 via a friction fit. In other embodiments, the saddle receiver 510 can be affixed to the outer member 520 via an interference fit. In other embodiments, the saddle receiver 510 can be affixed to the outer member 520 via more permanent means which may include, for example, bonding, adhesives, welding, etc. In other embodiments, the saddle receiver 510 and outer member 520 are formed integrally.

In some embodiments, including the embodiment illustrated in FIG. 3, the saddle angle adjustment mechanism 400 can include a body 700. The body 700 can include a central bore 710 formed through the body 700. The central bore 710 has a "central axis" substantially perpendicular to the upper support 320 of the adjustable height saddle post 300. The rotating assembly 500 can share the saddle rotation axis with the saddle 105. The saddle rotation axis can be collinear with the central axis of the central bore 710. The central bore 710 can be configured to rotatably receive the rotating assembly 500. The rotating assembly 500 can be configured to rotate within the central bore 710 of the saddle angle adjustment mechanism 400. In some embodiments, at least a portion of the rotating assembly 500 can comprise a different material than the body 700 to minimize friction and galling between the rotating assembly 500 and the body 700. In some embodiments, at least one bearing or bushing 530 can be used between the rotating assembly 500 and the inside surface of the central bore 710 of the body 700. In some embodiments, the rotating assembly 500 can be retained axially within the central bore 710 via one or more axial retaining members, which may include for example, circlips, fasteners, internally threaded nuts, externally threaded nuts, etc. In some embodiments, the rotating assembly 500 can include one or more thrust washers.

In some embodiments, including the embodiment illustrated in FIG. 3, the saddle angle adjustment mechanism 400 is configured to rotate the saddle receiver 510 relative to the body 700. In some embodiments, the saddle angle adjustment mechanism 400 is configured to rotate the rotating assembly 500 between a first rotational position and a second rotational position. In some embodiments, the first rotational position of the rotating assembly 500 corresponds to the first saddle angle of the saddle 105 discussed herein, and illustrated in FIG. 1A. In some embodiments, the second rotational position of the rotating assembly 500 corresponds to the second saddle angle of the saddle 105 discussed herein, and illustrated in FIG. 1B.

In other embodiments, not illustrated in the figures, the saddle receiver 510 can include an offset angular adjustment feature allowing the saddle receiver 510, and thus the saddle angle α, to be locked at different angles with respect to the rest of the rotating assembly 500, such that the saddle receiver 510 and saddle 105 still rotate with the rotating assembly 500, but providing for the adjustment of the first saddle angle corresponding to the first rotational position of the rotating assembly 500 and the second saddle angle corresponding to the second rotational position of the rotating assembly 500. In other embodiments, the offset angular adjustment feature can adjust the angle between the drive yoke 530 and the rest of the rotating assembly 500.

In some embodiments, including the embodiment illustrated in FIG. 3, the saddle angle adjustment mechanism 400 can include a drive pin 800. The drive pin 800 can move relative to the body 700 of the saddle angle adjustment mechanism 400. In some embodiments, the drive pin 800 can translate linearly relative to the body 700 of the saddle angle adjustment mechanism 400. In other embodiments, the drive pin 800 can rotate around a drive pin axis (not illustrated). In some embodiments, the impact surface 314 can be configured to contact the drive pin 800 of the saddle angle adjustment mechanism 400 when the adjustable height saddle post 300 is lowered to a lowered position. In some embodiments, the drive pin can include a drive button 830 configured to contact the impact surface 314. In some embodiments, the impact surface 314 can force the drive pin 800 to move upwards relative to the body 700 of the saddle angle adjustment mechanism 400. The drive pin 800 moving upwards can desirably unlock the saddle angle adjustment mechanism 400 from the first rotational position. The drive pin 800 moving upwards can cause the rotating assembly 500 to rotate from a first rotational position to a second rotational position. In some embodiments, the rotating assembly 500 can include a drive yoke 530. In some embodiments, the drive yoke 530 can be affixed to the saddle receiver 510. In some embodiments, the drive yoke 530 can be affixed to the outer member 520. In some embodiments, the drive yoke 530 can rotate together with the outer member 520 and the saddle receiver 510. In some embodiments, the drive pin 800 can contact the drive yoke 530 when it moves upwards. In some embodiments, the drive pin 800 can force the drive yoke 530 and the rest of the rotating assembly 500 including the saddle receiver 510 to rotate relative to the body 700 of the saddle angle adjustment mechanism 400 when the drive pin 800 moves from a first position to a second position. In some embodiments, at least a portion of the drive pin 800 can be at least partially surrounded by a drive seal 810. The drive seal 810 can be configured to limit fluids, solids, or any other materials from entering the interior of the saddle angle adjustment mechanism 400. In some embodiments, the drive seal 810 can be an accordion seal such that the height of the drive seal 810 can change depending on the movement of the drive pin 800 relative to the body 700 of the saddle angle adjustment mechanism 400.

Figure 4:
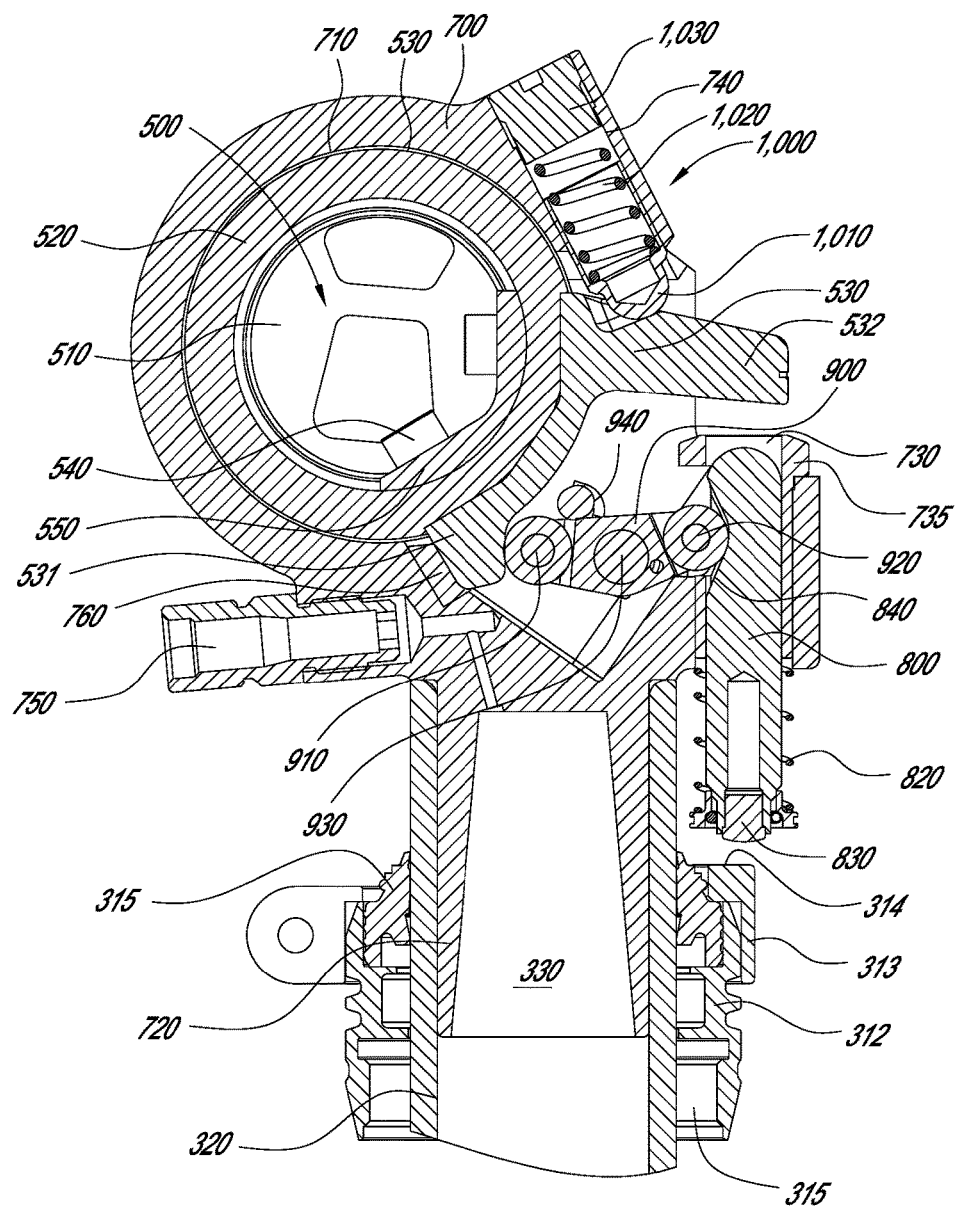
FIG. 4 illustrates a cross section view of the saddle angle adjustment assembly of FIG. 2.

FIG. 4 illustrates a cross section view of the saddle angle adjustment assembly 200 of FIG. 2. In some embodiments, the saddle angle adjustment mechanism 400 can include a support engaging portion 720. The support engaging portion 720 can be adapted to affix the saddle angle adjustment mechanism 400 to the upper support 320 of the adjustable height saddle post 300. In some embodiments, the support engaging portion 720 can be configured to engage the inner surface of the upper support 320. In some embodiments, the support engaging portion 720 can include a shoulder adapted to abut the top portion of the upper support 320. Methods of affixing the support engaging portion 720 to the upper support 320 can include, for example, threading, bonding, adhesives, etc.

In some embodiments, including the embodiment illustrated in FIG. 4, the support engaging portion 720 can be formed integrally with the body 700 of the saddle angle adjustment mechanism 400. In other embodiments, the support engaging portion 720 can be affixed to the body 700 of the saddle angle adjustment mechanism 400. The support engaging portion 720 can be configured to form an air tight seal with the second member. The support member and the adjustable height saddle post 300 can form a pressure chamber 330. The pressure chamber 330 can form part of the air spring discussed herein. In some embodiments, the saddle angle adjustment mechanism 400 can include a valve 750 in fluid communication with the pressure chamber 330 and configured to adjust the pressure within pressure chamber 330 and thus the force at which the adjustable height saddle post 300 urges the upper support 320 upwards when the locking mechanism of the adjustable height saddle post 300 is in an unlocked position.

In some embodiments, including the embodiment illustrated in FIG. 4, the sealing portion 312 can be located at or near the upper end of the lower support 310. In some embodiments, the tube portion 311 (See FIGS. 2 and 3) of the lower support 310 can be affixed within the tube recess 315 of the sealing portion 312. In some embodiments, the sealing portion 312 can be advantageously configured to limit fluids, solids, or any other materials from entering the interior of the lower support 310. In some embodiments, the sealing portion 312 can prevent air or other fluids from escaping internal portions of the adjustable height saddle post 300, which may include for example, the pressure chamber 330. In some embodiments, the sealing portion 312 of the lower support 310 can include a circumferential seal 315 that generally abuts and contacts an outer surface of the upper support 320. The seal 315 can comprise one or more elastomeric, thermoplastic, or other flexible, righted, or semi-rigid materials.

In some embodiments, including the embodiment illustrated in FIG. 4, the saddle angle adjustment mechanism 400 can include a drive channel 730 configured to slidably receive the drive pin 800. In some embodiments, the drive channel 730 can be formed in a drive sleeve 735 which is affixed to the body 700 of the saddle angle adjustment mechanism 400. In other embodiments, the drive channel 730 can be formed in the body 700 of the saddle angle adjustment mechanism 400. The drive channel 730 can be substantially parallel to upper support 320 of the adjustable height saddle post 300. The drive channel 730 and drive pin 800 can be adapted such that the drive pin 800 can slide between a first pin position, as illustrated in FIG. 4, and a second pin position, as illustrated in FIG. 5D. The saddle angle adjustment mechanism 400 can include a drive spring 820 configured to force the drive pin 800 towards the first pin position.

In some embodiments, including the embodiment illustrated in FIG. 4, the drive pin 800 is configured to contact a portion of the adjustable height saddle post 300, which may include for example, the impact surface 314, when the upper support 320 is in a lowered position. In some embodiments, the relative motion between the saddle angle adjustment mechanism 400 and the lower support 310 when the upper support 320 is lowered from a raised position to a lowered position can cause the impact surface 314 to force the drive pin 800 from a first position to a second position. In some embodiments, the drive pin 800 is configured to cooperate with the drive yoke 530 when the drive pin 800 slides from a first position to a second position. In some embodiments, the drive pin 800 is configured to rotate the rotating assembly 500 from a first rotational position to a second rotational position when the drive pin 800 slides from a first position to a second position. The drive seal 810 of FIG. 3 has been left out in FIG. 4 for clarity. In some embodiments, the drive seal 810 can prevent external contaminants from interfering with the motion of the drive pin 800 within the drive channel 730.

In some embodiments, including the embodiment illustrated in FIG. 4, the drive pin 800 is configured to cooperate with the cam 900. In some embodiments, the drive pin 800 is configured to unlock the saddle angle adjustment mechanism 400 when it slides from a first position to a second position. In some embodiments, the drive pin 800 can include a ramp 840 configured to cooperate with the cam 900. In some embodiments, the ramp 840 can be a recess formed in the drive pin 800. In other embodiments, the ramp 840 could be a protrusion from the drive pin 800.

In some embodiments, including the embodiment illustrated in FIG. 4, the drive yoke 530 can be affixed to the outer member 520 of the rotating assembly 500. In some embodiments, one or more fasteners 540 can pass through the outer member 520 and engage the drive yoke 530, affixing the drive yoke 530 to the outer member 520. In some embodiments, the outer surface of the outer member 520 can include a recess configured to accept the drive yoke 530. In some embodiments, the rotating assembly 500 can include a backing plate 550 configured to abut the inside surface of the outer member 520 opposite the drive yoke 530. In some embodiments, one or more fasteners 540 can pass through the backing plate 550 and engage the drive yoke 530. In some embodiments, the backing plate 550 can include a flat fastener engaging surface. In some embodiments, the drive yoke 530 can be configured to cooperate with a cam 900 to lock the rotating assembly 500 in a first rotational position. In some embodiments, drive yoke 530 can be configured to cooperate with the drive pin 800 to rotate the rotating assembly 500 from a first rotational position to a second rotational position. In some embodiments, the drive yoke 530 can be configured to cooperate with a return assembly 1000 to rotate the rotating assembly 500 from a second rotational position to a first rotational position. In some embodiments, the drive yoke 530 can include a first arm 531 and a second arm 532. The first arm 531 and second arm 532 can each protrude outward from the saddle rotation axis. The first arm 531 can be configured to cooperate with a cam 900. The first arm 531 can be configured to lock the rotating assembly 500 in a first rotational position. The second arm 532 can be configured to cooperate with the drive pin 800. The second arm 532 can be configured to cooperate with a return member 1010. In some embodiments, the second arm 532 can include a recess configured to accept a portion of the return member 1010. In other embodiments, the drive yoke 530 can include a single arm. In other embodiments, the drive yoke 530 can include a plurality of arms. In other embodiments, the return assembly 1000, drive pin 800, and cam 900 can each be configured to manipulate the drive yoke 530 by cooperating with the first arm 531, second arm 532, or another portion of the drive yoke 530.

In some embodiments, including the embodiment illustrated in FIG. 4, the saddle angle adjustment mechanism 400 can include a return assembly 1000. In some embodiments, the return assembly 1000 can be configured to rotate the rotating assembly 500 from the second rotational position to the first rotational position. The return assembly 1000 can be configured to cooperate with the drive yoke 530 to rotate the rotating assembly 500 from the second rotational position to the first rotational position. The return assembly can include a return member 1010 and a return spring 1020. In some embodiments, the saddle angle adjustment mechanism 400 can include a return channel 740 configured to accept the return member 1010 of the return assembly 1000. In some embodiments, the return channel 740 can be formed in the body 700 of the saddle angle adjustment mechanism 400. The return member 1010 can be configured to slidably move within the return channel 740. The return spring 1020 can force the return member 1010 against a portion of the drive yoke 530, urging the rotational assembly towards the first rotational position. In some embodiments, the return member 1010 can cooperate with the second arm 532 of the drive yoke 530 to rotate the rotating assembly 500. In some embodiments, the return member 1010 can incorporate a return bump stop 1030. In some embodiments, the return bump stop 1030 can be configured to limit rotation of the rotating assembly 500 past the second rotational position. In some embodiments, the return bump stop 1030 can be at least partially deformable. The return bump stop 1030 can be made of rubber. The return bump stop 1030 can have a significantly higher spring rate than the return spring 1020. In some embodiments, the return member 1010 can be configured to contact and deform the return bump stop 1030 when the rotating assembly 500 is rotated from a first position to a second position. In some embodiments, the return member 1010 can be configured to contact the drive yoke 530 at one end of the return member 1010 and the bump stop at the other end of the return member 1010 when the rotating assembly 500 has reached the second rotational position. In some embodiments, the return assembly 1000 can be adjustable via adjusting the preload on the return spring 1020. In some embodiments, adjusting the preload on the return spring 1020 can be adjusted via a threaded adjustment member. In other embodiments, the return assembly 1000 can rotate. In some embodiments, the return assembly 1000 can include a torsional spring.

In some embodiments, including the embodiment illustrated in FIG. 4, the saddle angle adjustment mechanism 400 can include a cam 900. The cam 900 can include a pivot 930, such as a shaft, about which the cam 900 can rotate. The cam 900 can rotate between a locked position, as illustrated in FIG. 4, and an unlocked position, as illustrated in FIG. 5D. In some embodiments, the cam 900 is configured to lock the rotating assembly 500 in a first rotational position. In other embodiments, the cam 900 can be configured to lock the rotating assembly 500 in a second rotational position. The cam 900 can include a first portion 910 and a second portion 920. In some embodiments, the first portion 910 can include a first roller. In some embodiments, the second portion 920 can include a second roller. The cam 900 can include a cam spring 940 configured to force the cam 900 towards the locked position.

In some embodiments, as illustrated in FIG. 4, the cam spring 940 can be adapted to rotate the cam 900 towards a locked position (in a clockwise direction when viewed from the perspective of FIG. 4). The cam spring 940 can be a torsional spring. In some embodiments, the cam 900 can be configured to cooperate with the drive yoke 530 to limit rotation of the rotating assembly 500. In some embodiments, the first arm 531 of the cam 900 can be configured to cooperate with the drive yoke 530. In some embodiments, the cam 900 can be configured to cooperate with the first arm 531 of the drive yoke 530 to lock the rotating assembly 500 in a first rotational position. In some embodiments, the cam 900 can lock the rotating assembly 500 in a first rotational position when the adjustable height saddle post 300 is in a raised position. In some embodiments, the saddle angle adjustment mechanism 400 can include a locking bump stop 760. In some embodiments, the locking bump stop 760 can be configured to limit rotation of the rotating assembly 500 past the first rotational position. In some embodiments, the locking bump stop 760 can be at least partially deformable. The locking bump stop 760 can be made of rubber.

In some embodiments, including the embodiment illustrated in FIG. 4, the drive yoke 530 can be configured to contact the locking bump stop 760 when the rotating assembly 500 rotates from a second rotational position to a first rotational position. In some embodiments, the drive yoke 530 and cam 900 can be configured such that the cam 900 goes "over-center" as it locks the rotating assembly 500 in the first rotational position. In some embodiments, as the cam 900 is rotating from an unlocked position to a locked position, the drive yoke 530 can compress the locking bump stop 760. The drive yoke 530 can rotate past the first rotational position when compressing the locking bump stop 760 as the cam 900 engages the first arm 531 of the drive yoke 530. As the cam 900 rotates into a locked position, the "center" configuration can be defined as the arrangement at which the drive yoke 530 has rotated furthest and the bump stop has been compressed the most. The cam 900 can then rotate further into the locked position wherein the bump stop expands and rotates the drive yoke 530 back to the first rotational position. In some embodiments, the cam 900 can be held in the locked position due to the "over-center" position of the cam 900 wherein the locking bump stop 760 is forcing the first arm 531 to engage the first portion 910 of the cam 900 and lock the cam 900 in place. In other embodiments, the cam 900 can enter the locked position without the rotating assembly 500 rotating past the first rotational position.

In some embodiments, including the embodiment illustrated in FIG. 4, the return member 1010 can incorporate a return bump stop 1030. In some embodiments, the return bump stop 1030 can be configured to limit rotation of the rotating assembly 500 past the second rotational position. In some embodiments, the return bump stop 1030 can be at least partially deformable. The return bump stop 1030 can be made of rubber. The return bump stop 1030 can have a significantly higher spring rate than the return spring 1020. In some embodiments, the return member 1010 can be configured to contact and deform the return bump stop 1030 when the rotating assembly 500 is rotated from a first position to a second position. In some embodiments, the deformed locking bump stop 760 can force the rotating assembly 500 towards a second rotational position and retain the cam 900 in a locked position due to the arrangement of the drive yoke 530 and cam 900. In some embodiments, the cam 900 can unlock the rotating assembly 500 and allow the rotating assembly 500 to rotate from a first rotational position to a second rotational position. In some embodiments, the cam 900 can unlock the rotating assembly 500 when the adjustable height saddle post 300 is lowered from a raised position to a lowered position.

In some embodiments, including the embodiment illustrated in FIG. 4, motion of the drive pin 800 can cause the cam 900 to rotate. In some embodiments, the drive pin 800 moving from a first position to a second position can cause the cam 900 to rotate from a locked position to an unlocked position. In some embodiments, the ramp 840 of the drive pin 800 can cooperate with the second portion 920 of the cam 900 to rotate the cam 900 from a locked position to an unlocked position when the drive pin 800 moves from a first position to a second position.

Figure 5A:
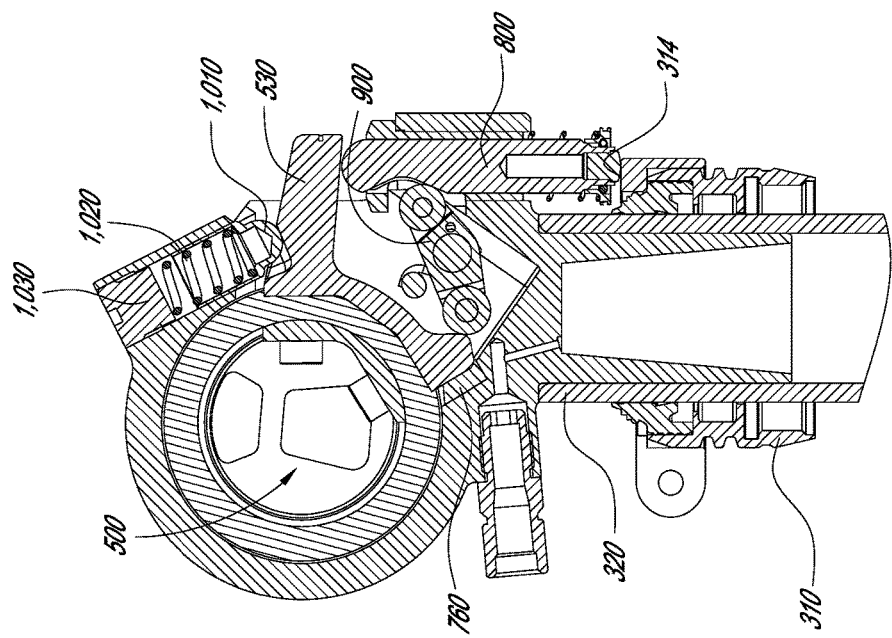
FIGS. 5A-5H illustrates cross section views of the saddle angle adjustment assembly of FIG. 2 in various stages of motion.
Figure 5B:
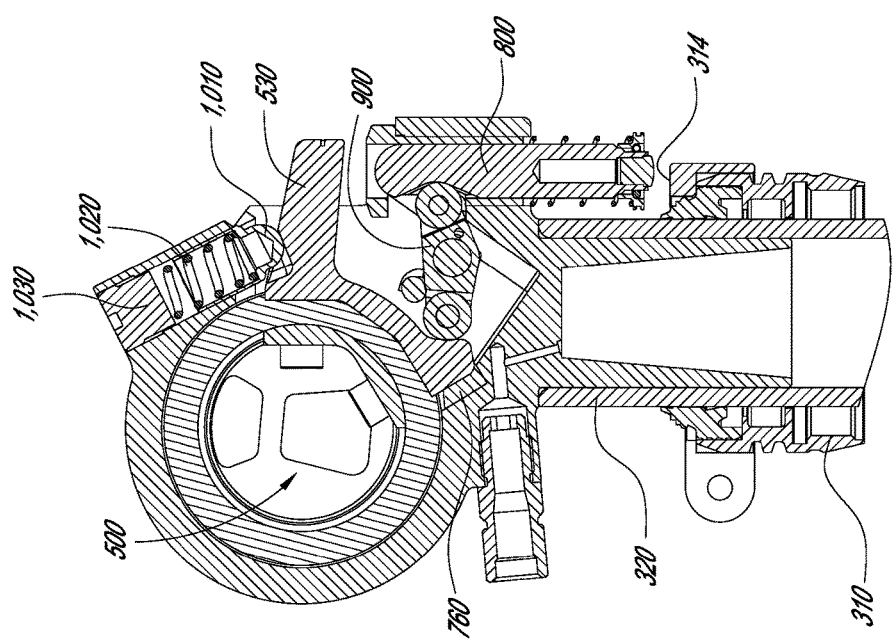
Figure 5D:
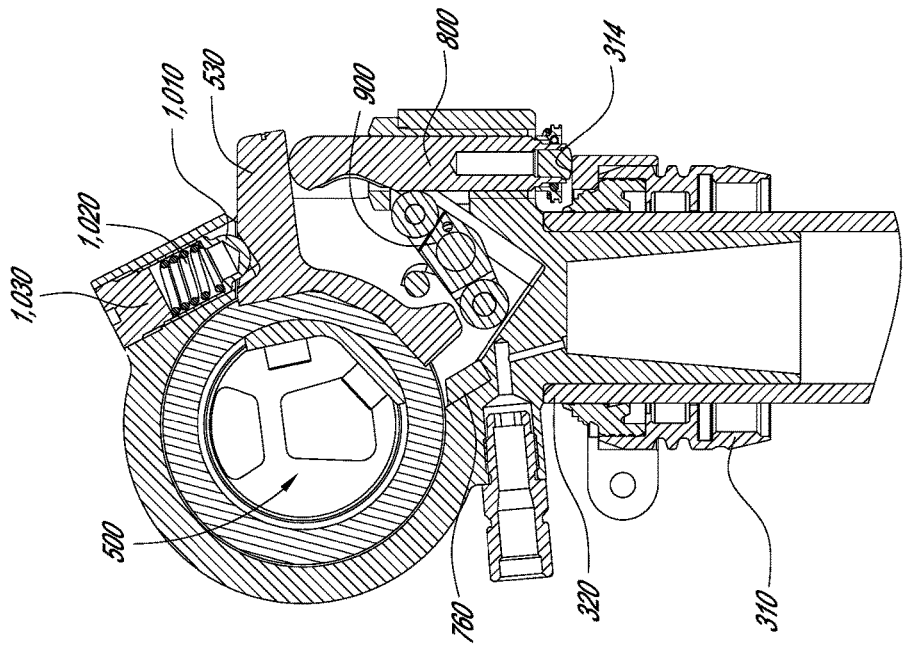

FIGS. 5A-5H illustrates cross section views of the saddle angle adjustment assembly 200 of FIG. 2 in various stages of motion. The stages of motion depicted in FIGS. 5A-5H and the description of FIGS. 5A-5H are intended to illustrate one embodiment of the possible stages of motion the saddle angle adjustment assembly 200 and are intended to be non-limiting. The description of each figure below describes the current orientation and movement of the various parts of the saddle angle adjustment mechanism 400 in relation to the preceding figure. FIGS. 5A-5D illustrate one embodiment of the sequential steps of lowering the adjustable height saddle post 300 from a raised position to a lowered position and the saddle angle adjustment mechanism 400 rotating the rotating assembly 500 from a first rotational position to a second rotational position. In FIG. 5A, the adjustable height saddle post 300 is in a raised position. The rotating assembly 500 is locked in the first rotational position. The drive pin 800 is located in the first position. The second portion 920 of the cam 900 is located within the ramp 840 of the drive pin 800. The cam 900 is in a locked position. The locking bump stop 760 is compressed and the cam 900 has rotated "over-center". The first portion 910 of the cam 900 is locked in place against the first arm 531 of the drive yoke 530.

In FIG. 5B, the adjustable height saddle post 300 has moved from a raised position towards the lowered position. The rider has unlocked the locking mechanism (not illustrated) of the adjustable height saddle post 300 and the upper support 320 has moved downwards relative to the lower support 310. The drive pin 800 has contacted the impact surface 314 and the drive pin 800 has been forced upwards from the first position towards the second position. The ramp 840 of the drive pin 800 has cooperated with the second portion 920 of the cam 900 and has rotated the cam 900 from a locked position to an unlocked position. The drive pin 800 has contacted the second arm 532 of the drive yoke 530 but has not rotated the rotating assembly 500 from the first rotational position.

Figure 5C:
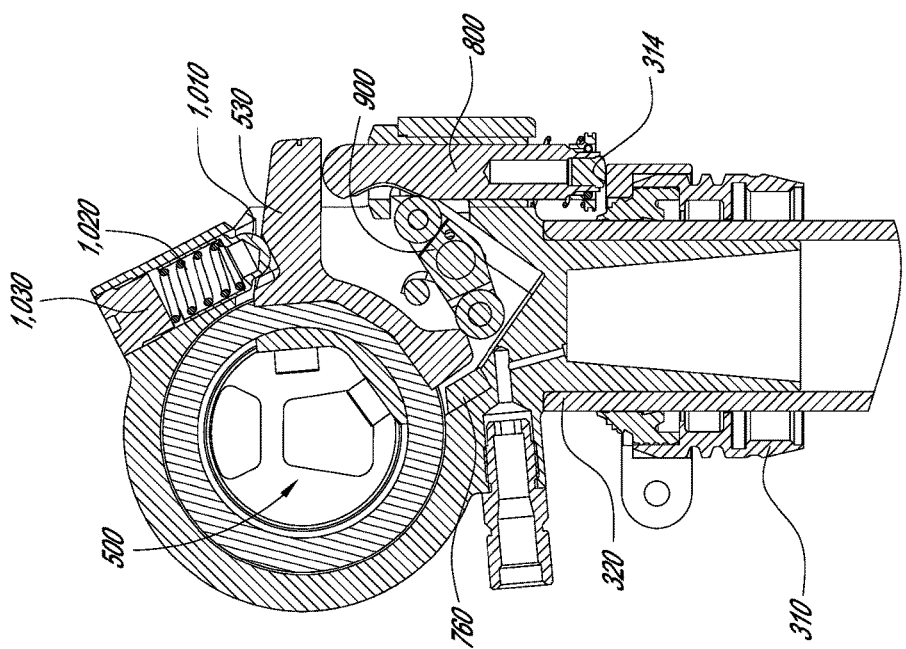

In FIG. 5C, the adjustable height saddle post 300 has moved from a raised position towards the lowered position. The adjustable height saddle post 300 is nearly in the lowered position. The drive pin 800 has been forced further upwards and is nearly in the second position. The drive pin 800 has forced the drive yoke 530 and rotating assembly 500 to rotate from the first rotational position towards the second rotational position. The drive yoke 530 has forced the return member 1010 to slide through the return channel 740 and compress the return spring 1020. The cam 900 has rotated completely out of the way of the first arm 531 of the drive yoke 530.

In FIG. 5D, the adjustable height saddle post 300 in a lowered position. The drive pin 800 has been forced upwards by the impact surface 314 into the second position. The drive pin 800 has forced the drive yoke 530 and rotating assembly 500 to rotate to the second rotational position. The drive yoke 530 has forced the return member 1010 into the return bump stop 1030. The return spring 1020 has been compressed by the return member 1010. The locking mechanism of the adjustable height saddle post 300 is now in the locked position (not illustrated) and limiting movement between the lower support 310 and upper support 320, locking the saddle angle adjustment mechanism 400 in place and the rotating assembly 500 in the second rotational position.

Figure 5F:
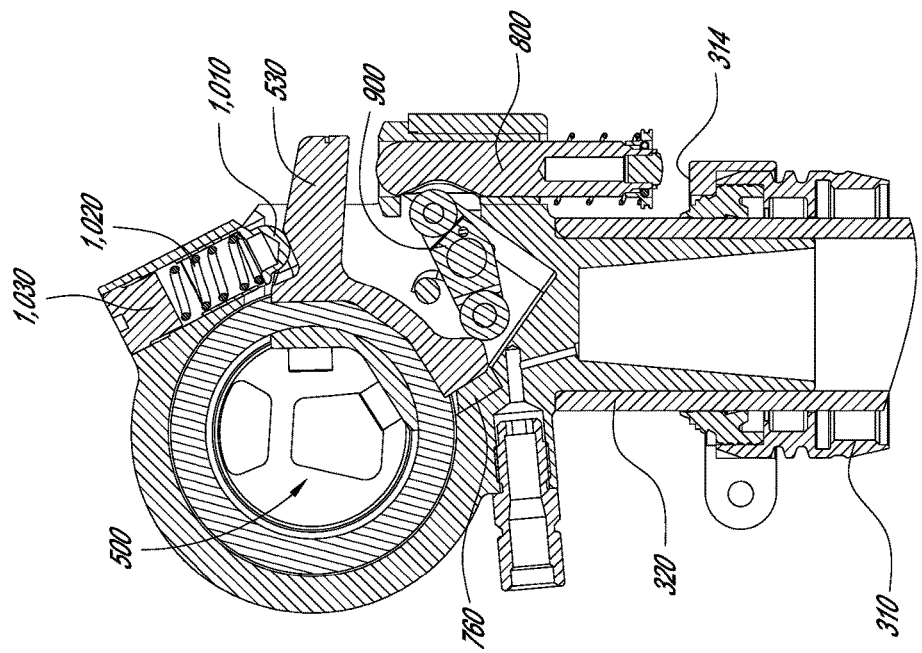
Figure 5E:
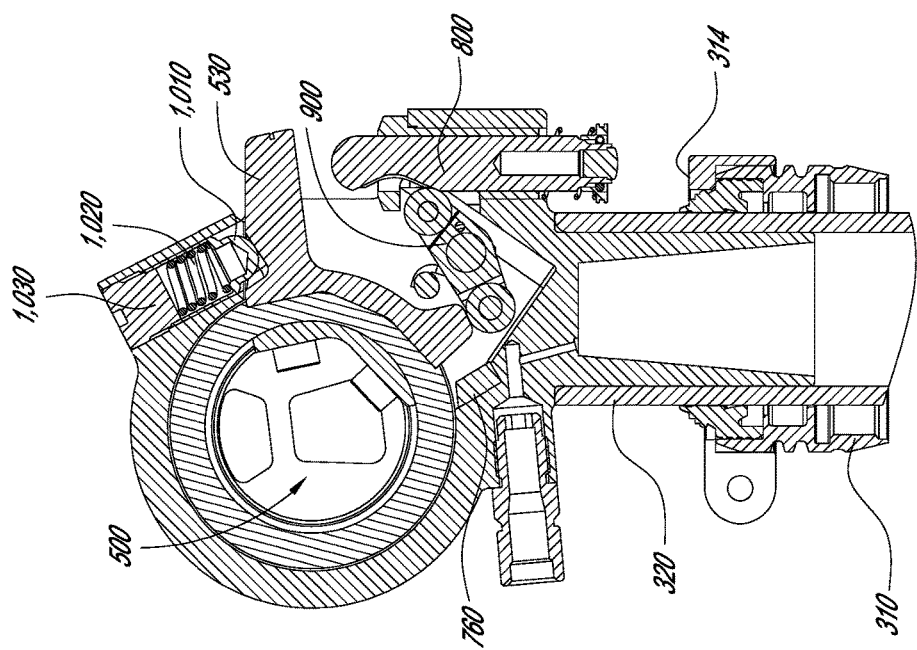

FIGS. 5D-5H illustrate one embodiment of the sequential steps of raising the adjustable height saddle post 300 from the lowered position to a raised position and the saddle angle adjustment mechanism 400 rotating the rotating assembly 500 form a second rotational position to a first rotational position and locking the rotating assembly 500 in the first rotational position. In FIG. 5E, the adjustable height saddle post 300 is in a raised position. The rider has unlocked the locking mechanism of the adjustable height saddle post 300 and the upper support 320 has moved upwards relative to the lower support 310 and into a raised position. The impact surface 314 is no longer forcing the drive pin 800 upwards into the second position and the drive spring 820 has begun to move the drive pin 800 from the second position to the first position. The second portion 920 of the cam 900 has begun to enter the ramp 840 of the drive pin 800 due at least in part to the force of the cam spring 940. The return member 1010 is abutting the return bump stop 1030 and the return spring 1020 is compressed. The rotating assembly 500 is in the second rotational position.

In FIG. 5F, the adjustable height saddle post 300 is in a raised position. The return spring 1020 has extended and the return member 1010 moved away from the return bump stop 1030. The rotating assembly 500 has rotated from the second rotational position towards the first rotational position. The rotating assembly 500 is nearly in the first rotational position. The drive pin 800 has moved further towards the first position. The ramp 840 of the drive pin 800 has moved down with the drive pin 800 and allowed the cam 900 to rotate towards the locked position and the first portion 910 of the cam 900 has engaged the first arm 531 of the drive yoke 530.

Figure 5H:
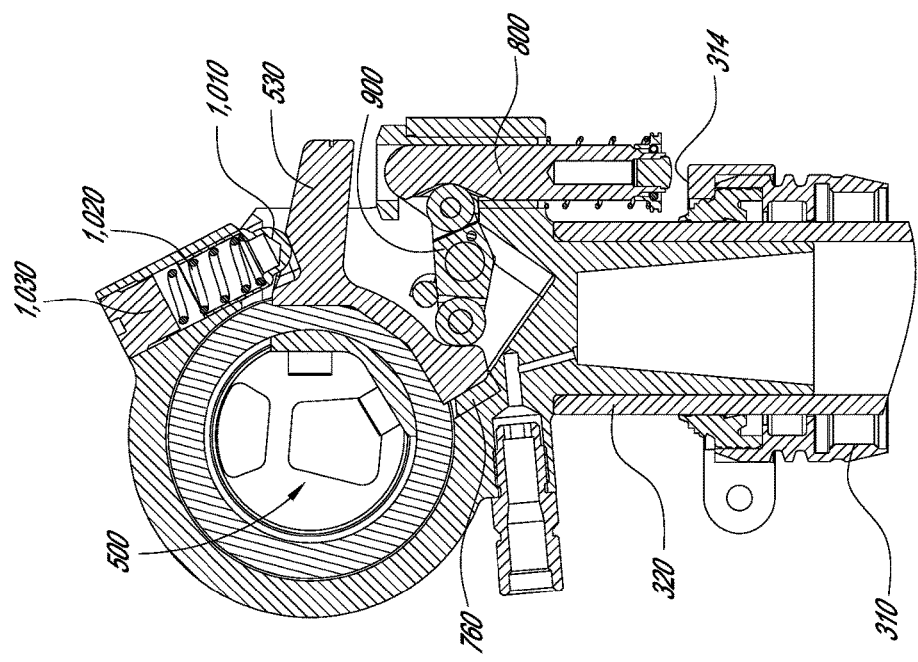
Figure 5G:
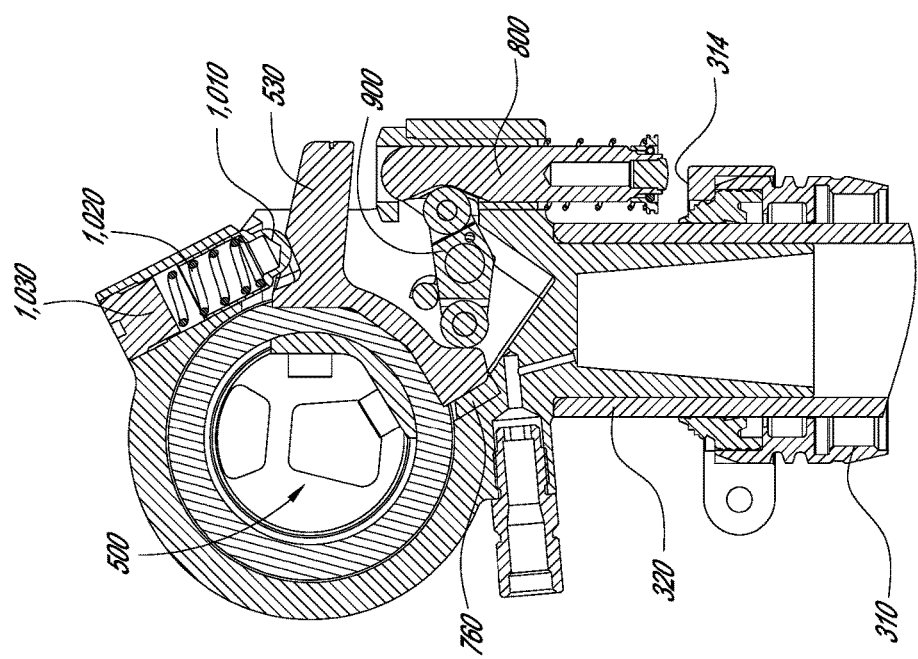

In FIG. 5G, the adjustable height saddle post 300 is in a raised position. The rotating assembly 500 has rotated past the first rotational position, the locking bump stop 760 is compressed, and the cam 900 is now in the "center" configuration. The drive pin 800 has moved further towards the first position and is nearly in the first position.

In FIG. 5H, the adjustable height saddle post 300 is in a raised position. The rotating assembly 500 is now in the first rotational position. The cam 900 has rotated "over-center" and is now in the locked position. The locking bump stop 760 is compressed, forcing the drive yoke 530 towards the second rotational position and holding the cam 900 in the locked position due to the arrangement of the drive yoke 530 and the cam 900. The drive pin 800 is now in the first position.

In some embodiments, the weight of the rider on the saddle 105 can help to rotate the rotating assembly 500 towards the first rotational position. In some embodiments, the weight of the rider on the saddle 105 can help to compress the locking bump stop 760 and allow the cam 900 to rotate into the locked position. In other embodiments, the weight of the rider on the saddle 105 can help to rotate the rotating assembly 500 towards the second rotational position. In some embodiments, the weight of the rider on the saddle 105 can help to compress the return spring 1020.

Figure 7:
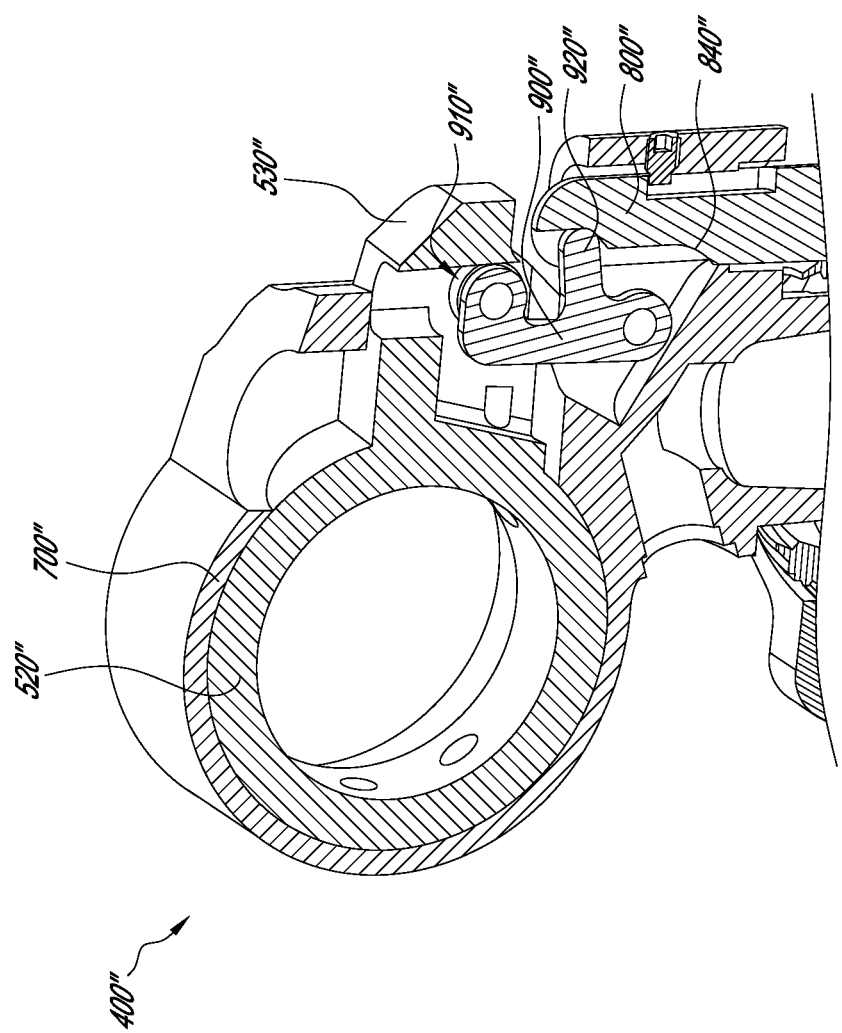
FIG. 7 illustrates an additional embodiment of a saddle angle adjustment mechanism.

FIGS. 6A-B illustrate an additional embodiment of a saddle angle adjustment mechanism 400'. In some embodiments, the drive yoke 530' can include a locking portion 533' configured to accept a portion of the cam 900'. The locking portion 533' can include a recess configured to accept a first portion 910' of the cam 900'. The locking portion 533' can include a protrusion configured to engage a first portion 910' of the cam 900'. The cam 900' can be biased by the cam spring 940' such that the first portion 910' rotatably engages the locking portion 533' of the drive yoke 530' and locks the rotating assembly 500' in a first rotational position, as illustrated in FIG. 6A. The second portion 920' of the cam 900' can be configured to cooperate with the ramp 840' of the drive pin 800' such that the cam 900' rotates from a locked position to an unlocked position when the drive pin 800' moves upwards from a first position to a second position, as illustrated in FIG. 6B. In some embodiments, the first portion 910" of the cam 900" can include a roller to engage the locking portion 533" as illustrated in FIG. 7.

FIGS. 8A-B illustrate an additional embodiment of a saddle angle adjustment mechanism 400'''. In some embodiments, the cam 900''' can be configured to slide linearly within the body 700''' of the saddle angle adjustment mechanism 400''' between a locked position and an unlocked position. The first portion 910''' of the cam 900''' can be configured to slidably engage the locking portion 533''' of the drive yoke 530''' and lock the rotating assembly 500''' in a first rotational position, as illustrated in FIG. 8A. The second portion 920''' of the cam 900''' can be configured to cooperate with the ramp 840''' of the drive pin 800''' such that the cam 900''' slides from a locked position to an unlocked position when the drive pin 800''' moves upwards form a first position to a second position, as illustrated in FIG. 8B.

Figure 9D:
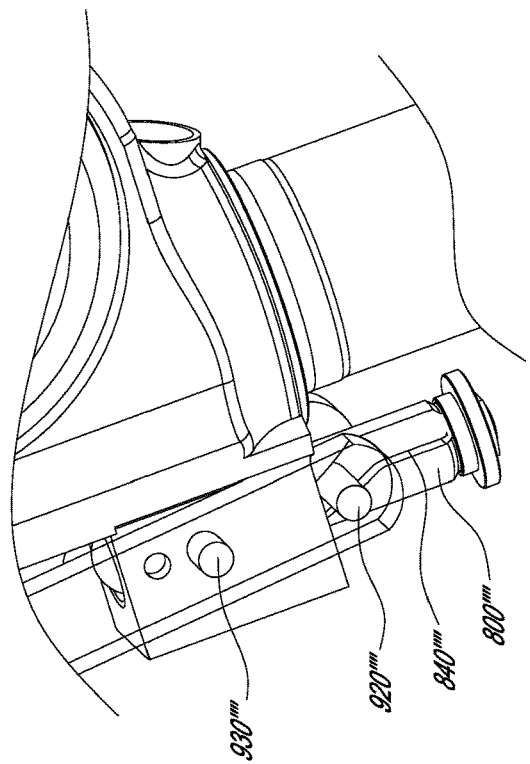
Figure 9C:
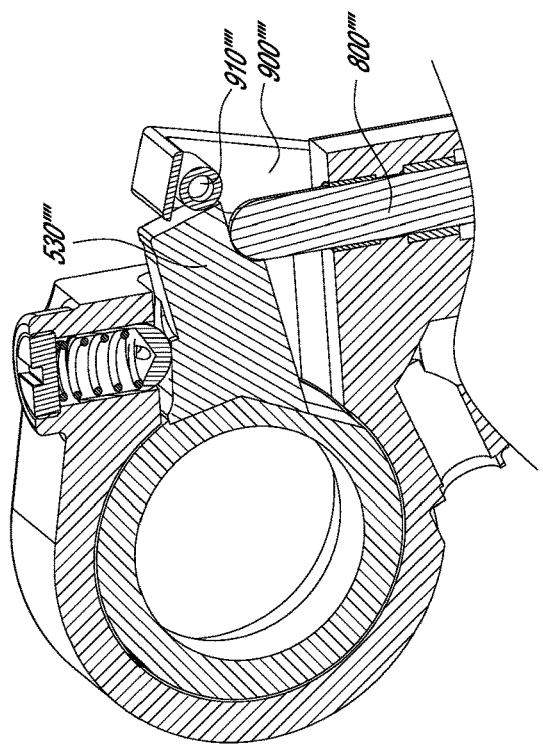

FIGS. 9A-D illustrate an additional embodiment of a saddle angle adjustment mechanism 400''''. In some embodiments, the cam 900'''' can include a first portion 910'''' configured to engage a surface of the drive yoke 530'''' opposite the surface of the drive yoke 530'''' configured to engage the drive pin 800'''' when the cam 900'''' is in a locked position, as illustrated in FIG. 9A. The drive pin 800'''' can include a ramp 840'''' configured to engage the second portion 920'''' of the cam 900'''', as illustrated in FIG. 9D, and rotate the cam 900'''' from a locked position to an unlocked position, as illustrated in FIGS. 9B and 9C.

Figure 10D:
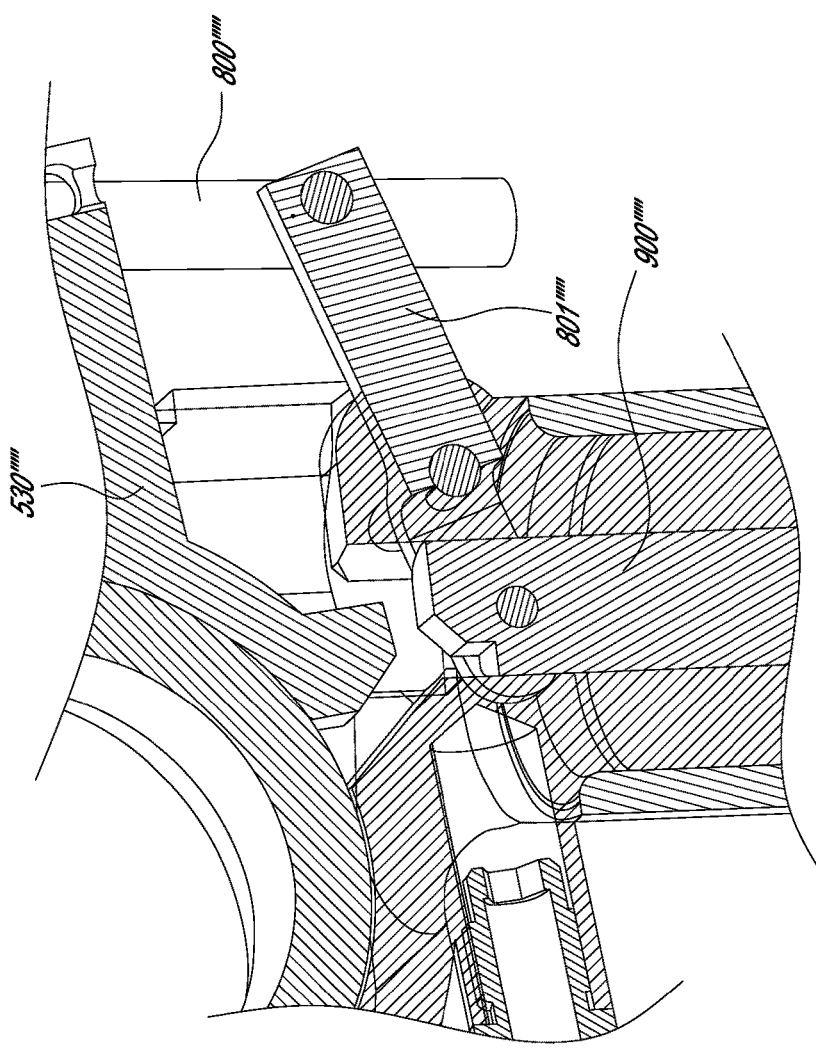

FIGS. 10A-D illustrate an additional embodiment of a saddle angle adjustment mechanism 400'''''. In some embodiments, as illustrated in FIG. 10A, the drive pin 800''''' can be pivotally coupled to a lever arm 801''''', wherein the lever arm is also pivotally coupled to the body 700''''' of the saddle angle adjustment mechanism 400''''' and the cam 900'''''. The drive pin 800''''' can also be pivotally and slidably coupled to the drive yoke 530''''' as illustrated in FIG. 10A. The lever arm 801''''' can be configured such that the lever arm 801''''' rotates when the drive pin 800''''' moves form a first position, as illustrated in FIG. 10A, to a second position as illustrated in FIG. 10C. The lever arm 801''''' can be configured such that the cam 900''''' slidably moves relative to the body 700''''' from a locked position, as illustrated in FIG. 10A, to an unlocked position, as illustrated in FIGS. 11B-D, when the drive pin 800''''' moves from a first position to a second position. The drive pin 800''''' can be configured to slide within a channel 534''''' in the drive yoke 530''''' for a portion the range of travel of the drive pin 800''''' and then hit the end of the channel 534''''' as the drive pin 800''''' moves from a first position to a second position. The drive pin 800''''' can force the rotating assembly 500''''' to rotate from a first rotational position to a second rotational position as the drive pin 800''''' moves from a first position to a second position. The channel 534''''' can include a drive spring 820'''''' configured to force the drive pin 800'''''' towards the first position.

FIGS. 11A-D illustrate an additional embodiment of a saddle angle adjustment mechanism 400''''''. In some embodiments, the rotating assembly 500'''''' can include a locking channel 521''''''. The locking channel can be formed in the outer member 520'''''' as illustrated in FIG. 11A. In other embodiments, the locking channel 521'''''' can be formed in the drive yoke 530'''''' or another part of the rotating assembly 500''''''. The cam 900'''''' can be configured to slide within the body 700'''''' between a locked position, as illustrated in FIG. 11A, and an unlocked position, as illustrated in FIGS. 11B-D. The cam 900'''''' can be disposed within the locking channel 521'''''' when the cam 900'''''' is in a locked position and not disposed within the locking channel 521'''''' when the cam 900'''''' is in an unlocked position. The drive pin 800'''''' can include a ramp 840'''''' configured to slidably engage a second portion 920'''''' of the cam 900'''''' and force the cam 900'''''' to slide from the locked position to the unlocked position when the drive pin 800'''''' moves from a first position, as illustrated in FIG. 11A, to a second position, as illustrated in FIG. 11B.

Figure 12:
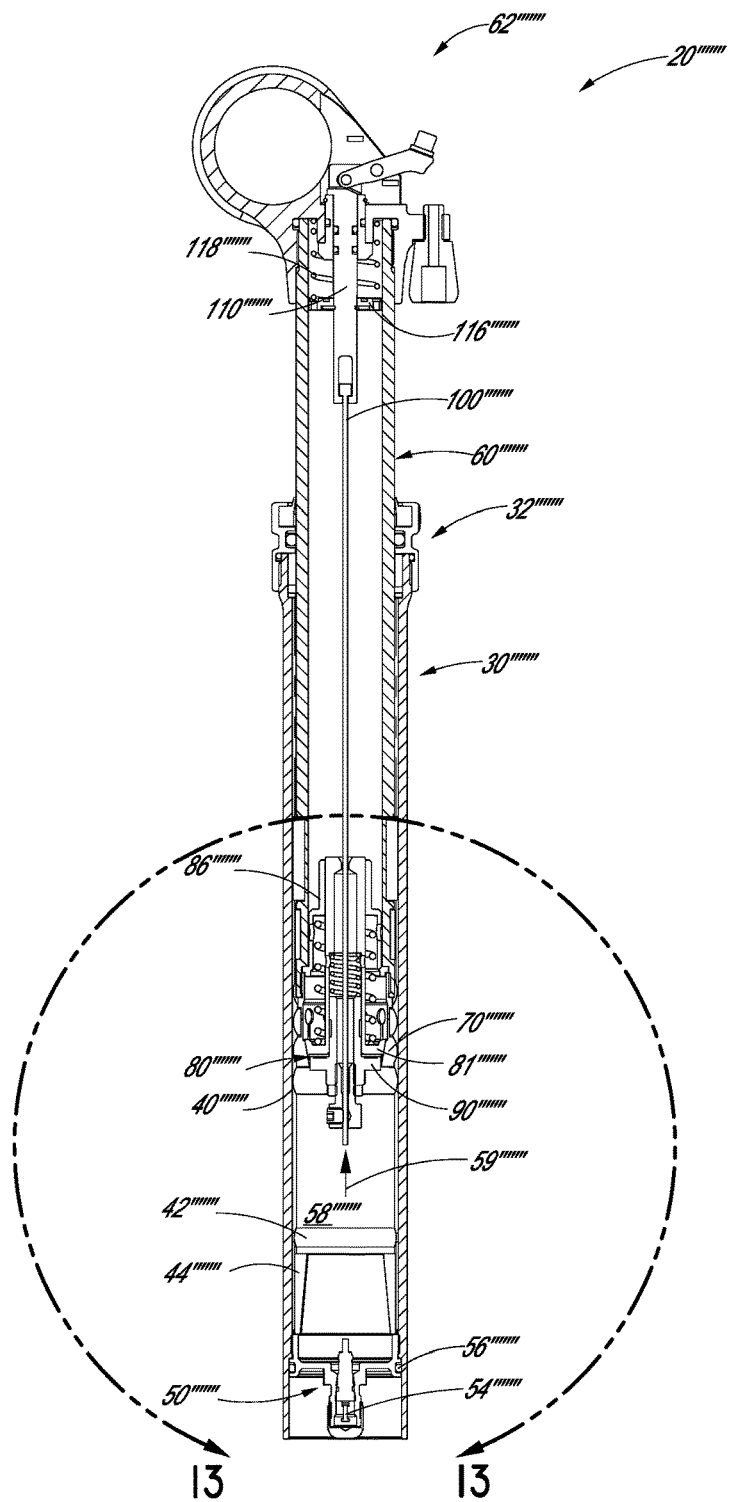
FIG. 12 illustrates a cross-sectional view of one embodiment of an adjustable saddle post assembly.
Figure 13:
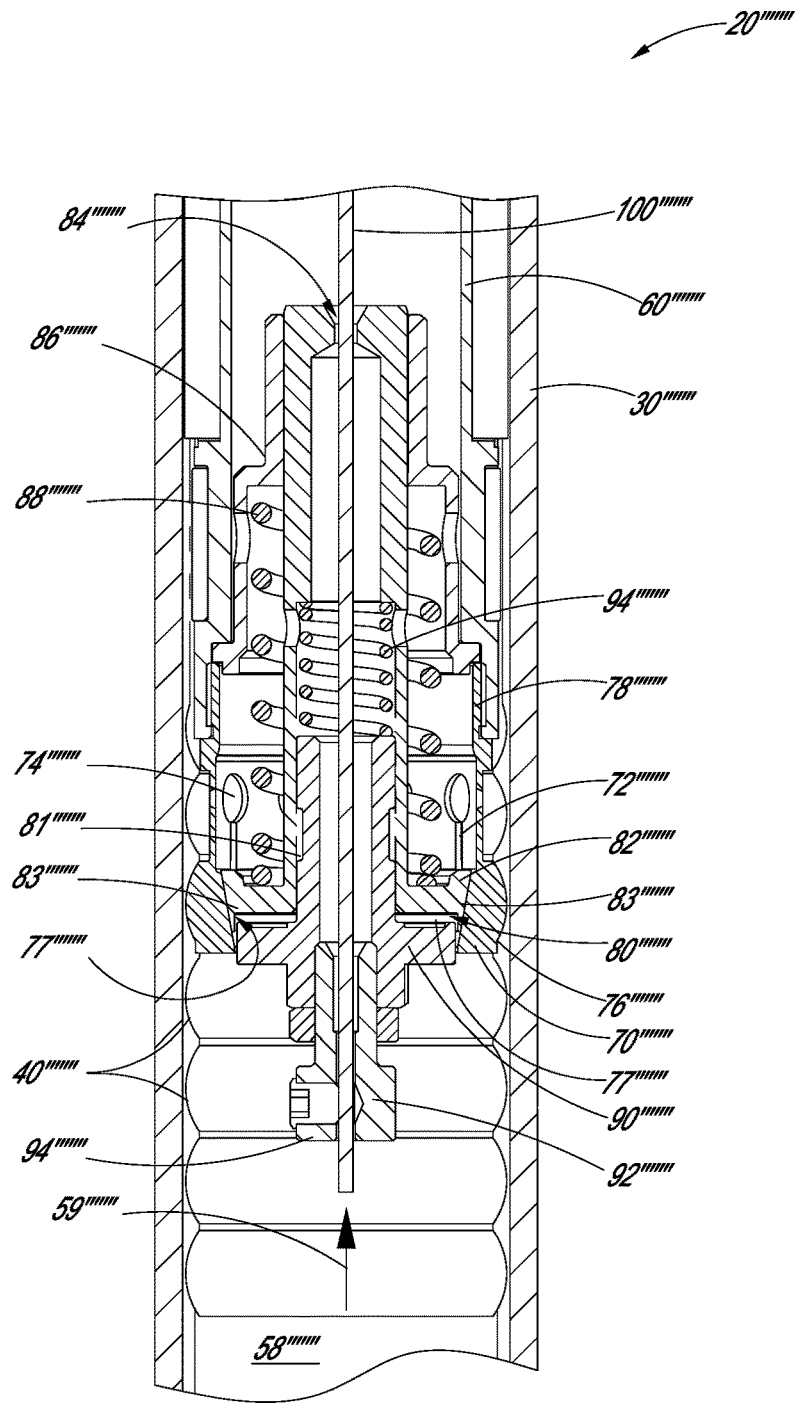
FIG. 13 illustrates a detailed cross-sectional view of the adjustable saddle post of FIG. 12.
Figure 14:
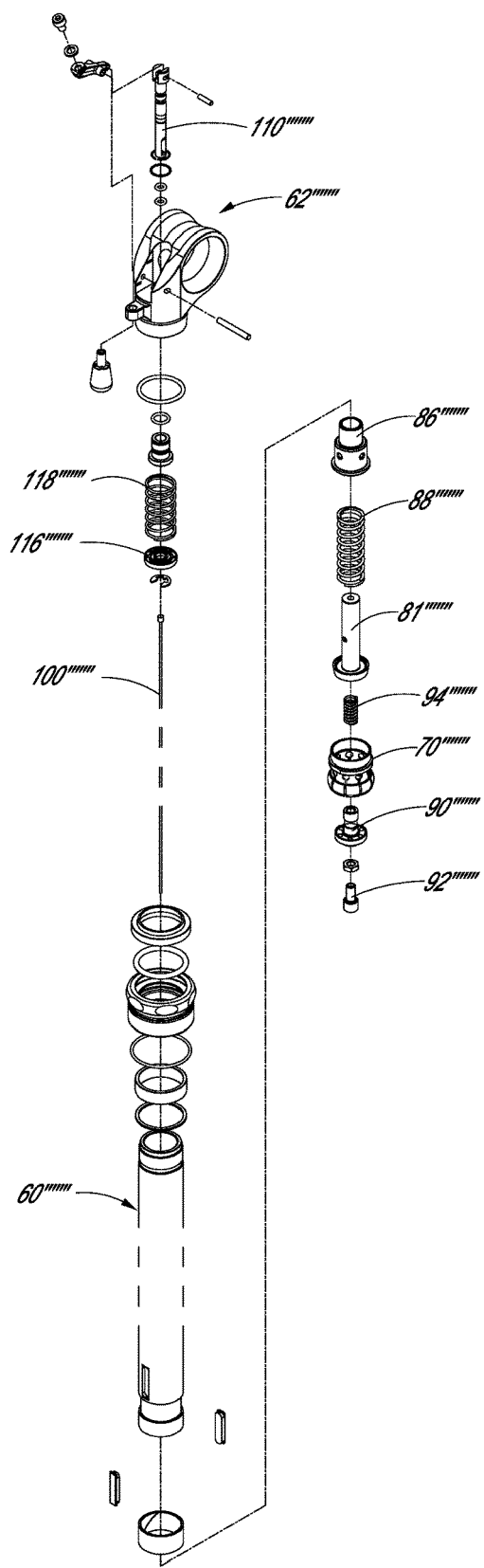
FIG. 14 illustrates an exploded perspective view of the inner support of the adjustable saddle post assembly of FIGS. 12-13.

In some embodiments, with reference to the cross-sectional views illustrated in FIGS. 12 and 13, and the exploded view illustrated in FIG. 14, the adjustable height saddle post 300 of FIG. 2 can be referred to as a seat post assembly 20''''''. In some embodiments, the seat post assembly 20'''''' can include a first support, such as, for example an outer support 30'''''' and a second support, such as, for example, an inner support 60''''''. The outer support 30'''''' can comprise a plurality of circumferential grooves 40'''''', recesses or other features along its interior surface. As discussed in greater detail herein, the grooves 40'''''' along the interior of the outer support 30'''''' are preferably sized, shaped and otherwise adapted to be engaged by a collet or other expansion portion of the inner support 60''''''. In the depicted arrangement, the outer support 30'''''' includes a total of eight grooves 40'''''' that are situated immediately adjacent to each other. In addition, each of the illustrated grooves 40'''''' can include an identical or substantially identical curved shape. However, in other embodiments, the quantity, size, shape, spacing, location and/or other details of the grooves 40'''''' can vary, as desired or required by a particular application or use. For example, the radius of curvature of the grooves 40'''''' can be greater or less than illustrated herein. In addition, the grooves 40'''''' can extend along a greater or lesser portion of the interior of the outer support 30''''''.

The outer support 30'''''', the inner support 60'''''' and/or any other portion of the seat post assembly 20'''''' can comprise one or more materials, such as, for example, aluminum, titanium, steel, other metals or alloys, carbon fiber, thermoplastics and/or the like. Regardless of the exact materials or combination of materials used, the outer and inner supports 30'''''', 60'''''' are preferably designed to withstand the various forces, moments and other stresses to which they may be subjected. The grooves 40' along the interior of the outer support 30'''''' and/or any other feature along the inside or outside of the outer or inner supports 30'''''', 60'''''' can be formed at the same time that such supports are manufactured. Alternatively, the grooves 40'''''' or any other feature can be machined or otherwise formed subsequent to the manufacture of the supports 30'''''', 60'''''' using one or more forming methods.

With continued reference to FIG. 12, the lower portion of the outer support 30'''''' can include a pad 44'''''' or other bottom portion that prevents the inner support 60'''''' from being lowered beyond a desired threshold location. As shown, the lower portion of the outer support 30'''''' can also include a lower groove 42'''''', which the collet 70'''''' or other expansion portion of the inner support 60'''''' can generally engage when the inner support 60'''''' is moved to or near such lower threshold position or other lowest setting relative to the outer support 30''''''.

As illustrated in FIG. 12, the lower portion of the outer support 30'''''' can comprise a spring or air plug assembly 50''''''. In some embodiments, the air plug assembly 50'''''' is situated below the pad 44'''''' or other portion or member which vertically restricts the further lowering of the inner support 60'''''' within the outer support 30''''''. The air plug assembly 50'''''' can be configured to maintain a volume of pressurized air or other fluid within the interior of the outer support 30''''''. For example, in the depicted arrangement, the air plug assembly 50'''''' extends across the entire cross-sectional area of the outer support 30''''''. One or more O-rings 56'''''' or other sealing members can be generally positioned between the circumferential edges of the air plug assembly 50'''''' and the interior wall of the outer support 30'''''' to help maintain air or other fluids within the interior of the outer support 30''''''. Further, a seal head portion 32'''''' can also help maintain a desired air spring.

With continued reference to FIG. 12, the air plug assembly 50'''''' can include a Schrader valve 54'''''' or other air regulating device. The Schrader valve 54'''''' or other air regulating device can be configured to permit a rider to inject air or other fluids within the cavity 58'''''' in the outer support formed above the air plug assembly 50''''''. As discussed in greater detail herein, the cavity 58'''''' can be pressured using air or other fluids in order to create an air spring that effectively exerts a force on the inner support 60'''''' (e.g., the portions of the inner support 60'''''' that are immediately adjacent to the cavity 58''''''). In the illustrated embodiment, the Schrader valve is accessible from the bottom, open end of the outer support 30''''''. However, in other arrangements, the Schrader valve or air regulating device can be positioned along a different part of the seat post assembly 20''''''. Further, a coiled spring, a different type of resilient member or another type of device or method can be used to exert a force on the inner support 60'''''', either in lieu of or in addition to an air spring.

As illustrated in FIG. 12, the adjustable seat post assembly 20'''''' can comprise an inner support 60'''''' that is slidably positioned relative to the outer support 30''''''. In some embodiments, as illustrated herein, the outer and inner supports 30'''''', 60'''''' comprise generally hollow, cylindrical tube shapes. However, in other arrangements, the shape, size, thickness and/or other details of the support 30'''''', 60'''''' can vary, as desired or required. In the depicted arrangement, the inner support is configured to be placed within the top end of the outer support 30''''''. However, as discussed herein, the seat post assembly 20'''''' can be differently configured so that the positions of the inner support 60'''''' and the outer support 30'''''' can be reversed (e.g., the inner support can be placed within a bottom end outer support).

With continued reference to FIGS. 12, 13, and 14, the inner support 60'''''' can include a collet or other expansion portion 70'''''' along its lower end. The expansion portion 70'''''' can comprise a slotted collet, another type of resilient member or other nonresilient expandable member. In the depicted embodiment, the expansion portion 70'''''' is a separate member that is secured to the inner support 60''''''. The expansion portion 70'''''' and the adjacent surfaces of the inner support 60'''''' can be machined to include one or more features (e.g., grooves, other recesses, protrusions, etc.) that can be used to mechanically engage each other. Alternatively, the expansion portion 70'''''' and the inner support 60'''''' can be connected using one or more other attachment devices or methods, such as, for example, tabs, screws, welds, rivets, fasteners, flanges, adhesives, friction-fit connections and/or the like. In other arrangements, the inner support 60'''''' is integrally formed with the expansion portion 70''''''. In FIGS. 12 and 13, the collet 70'''''' is generally secured at the end of the inner support 60''''''. However, the collet 70'''''' or other expansion portion can be positioned along any other location of the inner support 60''''''.

Figure 15A:
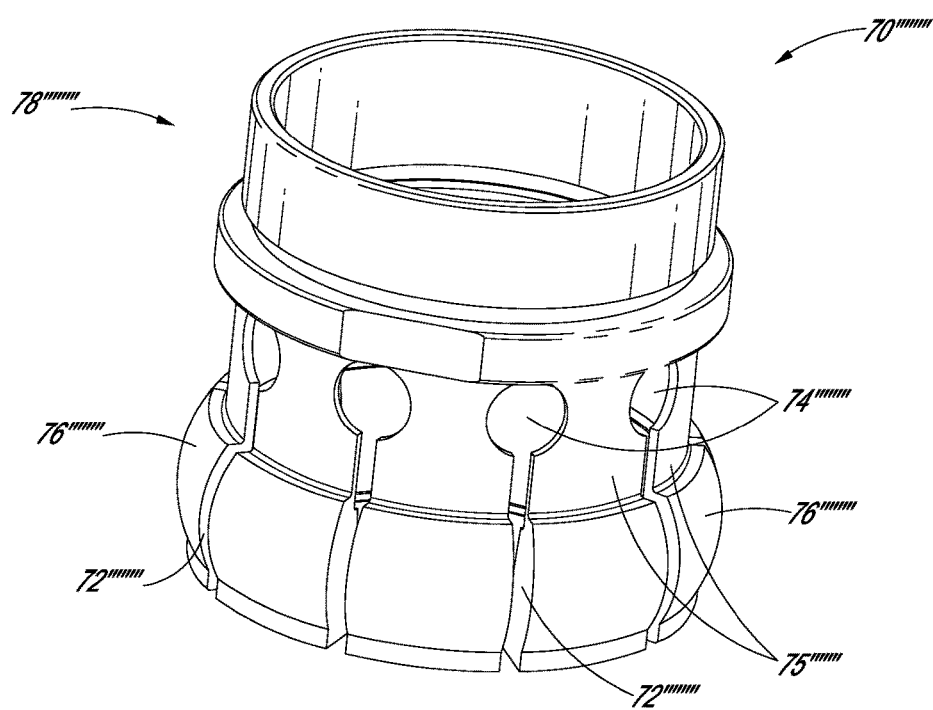
FIG. 15A illustrates a perspective view of a collet configured for use in an adjustable saddle post assembly as disclosed herein according to one embodiment.
Figure 15B:
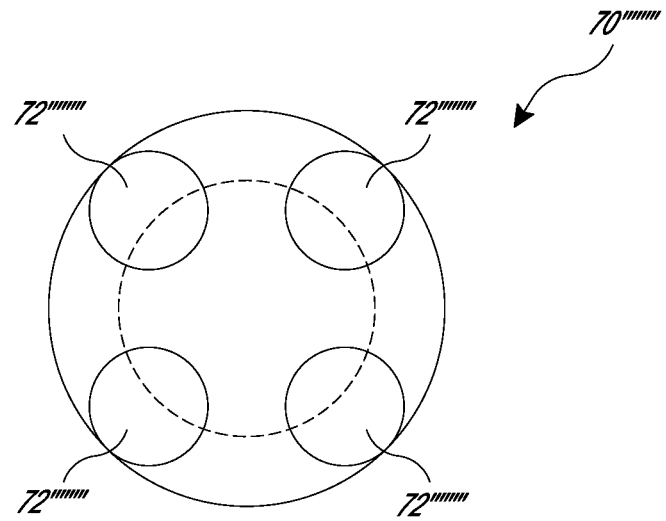
FIGS. 15B and 15C illustrate different views of an expansion portion comprising a plurality of balls according to one embodiment.

FIG. 15A illustrates a perspective view of one embodiment of a collet 70'''''' adapted to be attached to the inner support 60'''''' of the seat post assembly 20''''''. As shown, the collet 70'''''' can include one or more slots 72'''''' and/or other features that permit it to resiliently contract inwardly. In the depicted arrangement, each of the slots 72'''''' is vertically oriented and terminates at a circular opening 74'''''' located along the collet body. The slots 72'''''' desirably divide the collet 70'''''' into a series of collet sections or arms 75''''''.

With continued reference to FIGS. 12-15A, the collet 70'''''' can include a projecting portion 76'''''' that is configured to engage one of the grooves 40'''''' positioned along the interior wall of the outer support 30''''''. However, one or more other areas of the collet 70'''''' or other expansion portion of the inner support 60'''''' can be adapted to engage a groove 40'''''' of the outer support 30''''''. In other embodiments, the collet 70'''''' or other expansion portion is configured to engage an interior of the outer support 30'''''' along an area that does not include any grooves 40' or other distinguishing features (e.g., a generally smooth surface of the internal surface of the outer support 30'''''').

The quantity, size, shape, spacing and/or other details of the slots 72'''''', openings 74'''''', and/or arms 75'''''' of the collet 70'''''' can vary, as desired or required. For example, in some embodiments, the collet 70'''''' may not include any slots or openings at all. Instead, the collet 70'''''' can be configured so that one or more of its portions can be resiliently contracted and expanded (e.g., circumferentially). Alternatively, the slots between certain collet arms could be very wide, such that there is a large angular portion of the circumference of the collet 70'''''' which does not have a physical structure which mates with the grooves of the outer support. Desirably, however, the arms define projecting portions which extend at least 180 degrees, at least 240 degrees, at least 270 degrees, at least 300 degrees, at least 320 degrees and preferably substantially entirely around the 360 degree circumference of the collet.

As illustrated in FIGS. 12-15A, the projecting portion 76'''''' of the collet 70'''''' or other expansion portion of the inner support 60'''''' can be shaped, sized and otherwise configured to match or substantially match the shape of the grooves 40 positioned along the interior wall of the outer support 30''''''. Accordingly, the projecting portion 76'''''' can generally snugly engage one of the grooves when in its circumferentially expanded state. As discussed in greater detail herein, the projecting portion 76'''''' of the collet 70'''''' can be selectively permitted to retract inwardly in order for the collet 70'''''' to engage a different groove 40'''''' or other area along the interior wall of the outer support 30''''''. Consequently, the vertical position of the inner support 60'''''' can be selectively varied relative to the outer support 30''''''.

In certain arrangements, the collet 70'''''' or other expansion portion comprises spring steel and/or another resilient material. As is discussed in greater detail herein, the use of such materials permits the collet 70'''''' or other expansion portion to retract and expand as different portions of the contoured interior wall of the outer support 30'''''' are engaged. In one arrangement, the collet 70'''''' is configured to remain in an expanded position (as illustrated in FIGS. 12-15A) when no forces are acting on it.

As discussed in greater detail herein, for example, with reference to FIGS. 12-15C, the expansion portion of the inner support can include one or more other devices or features to engage an interior wall of the outer support. In some embodiments, the expansion portion comprises one or more pawls, balls and/or other sections, portions or features that engage corresponding features or portions of the outer support. For example, such pawls, balls or other items can swing, slide, roll or otherwise move radially outwardly (e.g., from a retracted or non-expanded orientation).

The inner support 60'''''' can include a retention assembly 80'''''', which in some embodiments, is normally biased to at least partially fit within an interior of the collet 70'''''' or other expansion portion (e.g., pawls, balls, over movable features, etc.). In some embodiments, as discussed in greater detail herein, the retention assembly 80'''''' comprises a bearing portion 81'''''' and a locking portion 90''''''. In other arrangements, however, the retention assembly 80'''''' can include only the bearing portion 81'''''' or only the locking portion 90''''''. In addition, a retention assembly 80 can include one or more other portions or members, either in addition to or in lieu of the bearing portion 81'''''' and/or the locking portion 90''''''. Regardless of its exact configuration, the retention assembly 80'''''' is preferably adapted to maintain the collet 70'''''' or other expansion portion of the inner support 60'''''' in an expanded position so that the collet 70'''''' or other expansion portion remains engaged to a groove 40'''''' or other interior portion of the outer support 30''''''. As discussed in greater detail herein, this prevents relative movement between the inner support 60'''''' and the outer support 30'''''', thereby maintaining the vertical position of the bicycle saddle.

As illustrated in FIG. 13, the bearing portion 81'''''' can comprise a generally tubular upper portion and a circumferentially enlarged lower portion 82''''''. In some arrangements, the enlarged lower portion 82'''''' includes a tapered outer surface 83'''''' that is sized, shaped, sloped and otherwise configured to correspond and generally mate with an adjacent tapered inner surface 77'''''' along the projecting portion of the collet 70'''''' when the enlarged lower portion 82'''''' is resiliently biased thereagainst. An exploded view of one embodiment of an inner support 60 comprising a retention assembly 80'''''' is illustrated in FIG. 14.

According to some embodiments, the inner support 60 includes one or more coil springs or other biasing members that help urge the retention assembly 80'''''' (e.g., the bearing portion 81'''''', the locking portion 90'''''', etc.) toward the interior of the collet 70''''''. For example, as shown in FIG. 13, a spring housing 86'''''' or another similar member (e.g., plate, other abutting surface, etc.) can be used to maintain a desired biasing force against the bearing portion 81'''''' of the retention assembly 80''''''. As is discussed in greater detail herein, the bearing portion 81'''''' and/or any other portion of the retention assembly 80'''''' can be selectively moved against the biasing force of one or more springs 88'''''' or other resilient members in order to move the enlarged lower portion 82'''''' of the bearing portion 81'''''' and/or any other portion of the retention assembly 80'''''' upwardly, generally out of the interior of the projecting portion 76'''''' of the collet 70'''''' or other expansion portion of the inner support 60''''''. This can advantageously permit the projecting portion 76'''''' of the collet 70'''''' to be retracted when a sufficiently large upwardly or downwardly oriented force is applied to the inner support 60''''''. Consequently, the inner support 60'''''' can be slidably moved relative to the outer support 30''''''. Thus, the vertical position of a saddle or other seating member attached to the inner support 60'''''' can be selectively changed.

As discussed, the retention assembly 80'''''' can help to maintain or "lock" the projecting portion 76'''''' of the collet 70'''''' in its normally expanded state to prevent relative movement between the outer and inner supports 30'''''', 60''''''. To further ensure that the projecting portion 76'''''' remains expanded, the retention assembly 80'''''' can include a locking portion 90'''''' or other similar portion, feature or device. In the embodiment depicted in FIGS. 12 and 13, the locking portion 90'''''' is generally positioned underneath and immediately adjacent to the bearing portion 81''''''. As shown, the locking portion 90'''''' can be slidably positioned within a center cavity of the bearing portion 81''''''. In other arrangements, however, the relative position of the bearing portion 81'''''' and the locking portion 90'''''', the manner in which such components interact and/or other details of these components can vary, as desired or required.

Similar to the bearing portion 81'''''', the locking portion 90'''''' can be resiliently biased toward an interior portion of the projecting portion 76'''''' of the collet 70'''''' using one or more coil springs 94'''''' or other resilient members. For example, as shown, a spring 94'''''' can be positioned within an interior cavity portion of the bearing portion 81'''''' so that it exerts a downwardly-directed force on the locking portion 90''''''. In the illustrated arrangement, the locking portion 90'''''' is configured to contact the enlarged lower portion 82'''''' of the bearing portion 81'''''' if it is moved sufficiently far against the urging force of the spring 94'''''' (e.g., upwardly as depicted). Therefore, in order to move the lower portion 82'''''' of the bearing portion 81'''''' out of the projecting portion 76'''''' of the collet 70'''''', the locking portion 90'''''' is moved (e.g., upwardly as illustrated in FIG. 13) until it contacts the enlarged lower portion 82'''''' of the bearing portion 81''''''. Then, the continued movement of the locking portion 90'''''' will cause the locking portion 90'''''' and bearing portion 81'''''' to simultaneously move against the biasing force of one or more springs 88'''', 94''''''. If the retention assembly 80'''''' (e.g., the locking portion 90'''''', the bearing portion 81'''''', etc.) are moved far enough away from the interior of the projecting portion 76'''''' of the collet 70'''''' (or other expansion portion), the collet 70'''''' can be allowed to retract inwardly so that the inner support 60'''''' may be moved relative to the outer support 30''''''.

Although in the embodiments illustrated and discussed herein the retention assembly 80'''''' includes a bearing portion 81'''''' and a locking portion 90'''''', it will be appreciated that the retention assembly 80'''''' may only have a bearing portion 81'''''' or similar device to prevent the collet 70'''''' or other expansion portion of the inner support 60'''''' from retracting inwardly. Alternatively, the retention assembly 80'''''' may only include a locking portion 90'''''' and no bearing portion 81''''''. However, in some embodiments, the use of an expanding portion or other portion having sloped exterior surfaces, such as, for example, the bearing portion 81'''''', is preferred, because such a portion helps ensure that the secure mating of the collet 70'''''' with the grooves, despite wear or manufacturing. In addition, in other arrangements, the adjustable post assembly 20'''''' can comprise a completely different method of ensuring that the collet 70'''''' or other expansion portion of the inner support 60'''''' remains engaged with a groove 40'''''' or other portion of the outer support. For example, the retention assembly 80'''''' that is configured to maintain the collet 70 or other expansion portion of the inner support 60'''''' can comprise a less or more complicated design. In some embodiments, the retention assembly 80'''''' comprises only a single portion and/or component (e.g., a bearing portion 81'''''', a locking portion, any other portion or member, etc.). In other arrangements, the retention assembly 80'''''' includes two, three, four or more different portions and/or components.

Figure 15C:
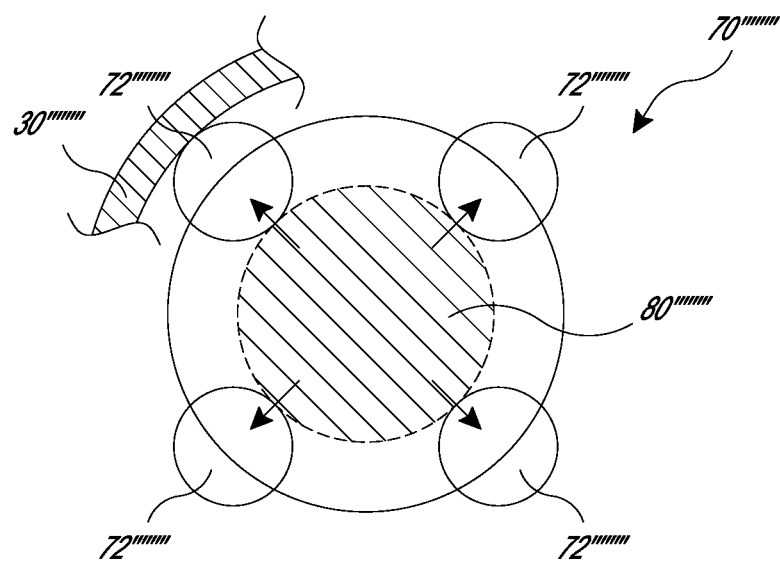

As noted above, an expansion portion can include any one of a plurality of movable members that can selectively engage an interior wall of the outer support. By way of example, with reference to the embodiment illustrated in FIGS. 15B and 15C, the expansion portion 70'''''' can comprise one or more balls 72'''''' that roll between a radially contracted position (FIG. 15B) and a radially expanded position (FIG. 15C). In other configurations, pawls, tabs or other items can swing, slide, roll or otherwise move between such radially contracted and expanded positions. As with the collet arrangements disclosed herein, such movable members can be configured to maintain a normally radially expanded position or other outward orientation (e.g., so that the movable members are able to contact and engage with a corresponding feature or portion of the outer support). In some embodiments, the pawls, balls or other members of an expandable or movable portion are resiliently biased in a radially expanded configuration (e.g., using one or more springs, other resilient devices, etc.). Alternatively, a desired outwardly-orientation configuration can be maintained for such components or features using one or more other devices or methods, such as, for example, sleeves, levers, cams, pins and/or the like.

The pawls, balls or other movable members that are included in an expansion portion can be locked in a radially expanded orientation using a retention assembly. The retention assembly can be similar to those discussed herein with reference to FIGS. 12-14 for the collet embodiments and enjoying certain advantages. Alternatively, however, other types of designs can be used to ensure that the movable members are safely and adequately maintained in a desired orientation (e.g., radially outward).

For example, for an expansion portion comprising one or more balls, which are adapted to roll outwardly in order to engage corresponding features along the adjacent interior wall of the outer support, a sleeve or other portion of a retention assembly can be moved within an interior portion of the expansion portion to help urge and maintain (e.g., lock) the balls along an outer periphery of the expansion portion. In some embodiments, the sleeve or other portion of a retention assembly ensures that the balls or other movable members remain in the outwardly expanded orientation as long as the position of the sleeve or other portion of a retention assembly is adequately maintained relative to the expansion portion. In FIG. 15C, for instance, a sleeve 80'''''' or other portion of a retention assembly can be moved within an interior portion of the expansion portion 70'''''' to ensure that the balls 72'''''' are moved and retained in a radially outward orientation.

Regardless of their exact configuration, the movable components or features (e.g., pawls, balls, etc.) of an expansion portion desirably can be moved between a radially expanded and a radially contracted position to selectively adjust the vertical position of an inner support relative to an outer support. Accordingly, as discussed herein with reference to the collet embodiments, the vertical position of a seat post, a fork and/or other portion of a bicycle can be advantageously adjusted by a rider.

In some embodiments, an actuation device or system can be used to move the retention assembly 80'''''' (e.g., the bearing portion 81'''''', the locking portion 90'''''', etc.) and/or any other portion of the seat post assembly 20''''''. With reference to FIGS. 12 and 13, a cable 100'''''', rod, connector or other movable portion that extends through the interior of the inner support 60'''''' is operatively connected to a cable lock member 92'''''' situated below the bearing portion 81'''''' and the locking portion 90''''''. In the illustrated arrangement, the cable lock member 92'''''' is secured to the adjacent locking portion 90'''''' using one or more connection devices or methods, such as, for example, threaded fasteners, rivets, other type of fasteners, welds, pins, adhesives and/or the like. Alternatively, the cable lock member 92'''''' can be attached to the bearing portion 81'''''' and/or any other portion of the retention assembly 80'''''', either in addition to or in lieu of simply being attached to the locking portion 90''''''.

With continued reference to the cross-sectional views of FIGS. 12 and 13, the cable 100'''''', rod, connector or other movable member can be inserted within a passage of the cable lock member 92''''''. Further, the cable 100'''''' can be secured to the cable lock member 92'''''' by inserting and tightening a set screw or other fastener within one or more lateral openings 94''''''. However, one or more alternative devices or methods may be used to secure the cable 100'''''' to the cable lock member 92''''''. The cable 100'''''', rod, connector or other movable member preferably comprises one or more durable materials configured to withstand the forces and stresses to which it may be exposed during use of the adjustable seat post assembly 20''''''. For instance, the cable 100'''''' can comprise one or more metals (e.g., steel), thermoplastics, composites and/or the like.

In the embodiments of the adjustable seat post assembly illustrated herein, the cable 100'''''' is configured to be routed through or near the axial center of the inner support 60''''''. Accordingly, one or more of the components of the inner support 60'''''' may need to be configured to accommodate the unobstructed passage of the cable therethrough. As shown, for example, the upper cylindrical portion of the retention assembly 80'''''' (e.g., bearing portion 81'''''', locking portion 90'''''', etc.) can include an opening 84'''''' through which the cable 100'''''' is routed. In addition, the cable 100'''''' can be routed through one or more other components of the seat post assembly 20'''''', including, but not limited to, springs 88'''''', 94'''''', the spring housing 86'''''', the collet 70'''''' or other expansion portion and/or the like.

In FIG. 12, the cable 100'''''', rod or other movable member is attached to a pull rod assembly 110'''''' located at or near the upper end of the inner support 60''''''. As discussed herein with respect to the connection between the cable 100'''''' and the cable lock member 92'''''', one or more devices or methods can be used to secure the cable 100'''''' to the pull rod assembly 110''''''. In some embodiments, a desired amount of tension can be maintained in the cable 100'''''' situated within the seat post assembly 20''''''. In the illustrated arrangement, such tension in the cable 100'''''' is created by positioning a spring 118'''''' or other resilient member between a top interior surface of the inner support 60'''''' and a spring plate 116'''''' that is attached to the pull rod assembly 110''''''. In turn, the pull rod assembly 110'''''' can be mechanically connected to another cable (not shown), rod or other member that is configured to operatively connect the pull rod assembly 110'''''' and the cable 100'''''' to a lever, switch, button and/or other actuation device. In some embodiments, such a lever or other actuation device is positioned at or near the handlebar area of a bicycle to permit a rider to conveniently manipulate the seat post assembly. Alternatively, the pull rod assembly 110'''''' and the cable 100'''''' can be operatively connected to a lever or other actuation device located at a different location of the bicycle (e.g., underneath the saddle, along one or more of the frame members, etc.).

As discussed, when the cable 100'''''' is retracted from its resting position (e.g., moved upwardly as illustrated in FIGS. 12 and 13), a retention assembly 80'''''' (e.g., the bearing portion 80'''''', the locking portion 90'''''', sleeve and/or any other portions or components of the retention assembly 80'''''') may be moved away from the interior of the projecting portion 76'''''' of the collet 70'''''' or other expansion portion (e.g., balls, pawls, other movable members, etc.) formed with or attached to the inner support 60''''''. Consequently, the collet 70'''''' or other expandable member can be permitted to retract or otherwise move (e.g., slide, roll, etc.) inwardly so that the expansion portion (e.g., the projecting portion 76'''''' of the collet, balls, pawls, etc.) can selectively engage another groove 40'''''' or another interior surface or portion of the inner support 60''''''. Likewise, when the cable 100'''''' is permitted to resiliently revert to its resting position (e.g., with the assistance of one or more springs 88'''''', 94'''''', 118'''''' or other biasing members), the retention assembly 80'''''' can move within the interior of the projecting portion of the collet 70'''''', thereby restricting or limiting the collet's ability to retract inwardly. As discussed in greater detail herein, this can help prevent or reduce relative movement between the outer support 30'''''' and the inner support 60''''''.

By way of example, FIGS. 16A-16D illustrate various views of one embodiment of a mechanically-actuated adjustable assembly 920''''''. In the depicted arrangement, the control cable C is configured to pass through the seal head portion of the assembly 920''''''. As discussed with reference to other arrangements disclosed herein, the assembly 920'''''' can include an inner support or tube 960'''''' that is sized, shaped and otherwise configured to be slidably disposed within at least a portion of an outer support or tube 930''''''. In some embodiments, the outer support 930'''''' is configured to secure to the bicycle frame and to remain substantially stationary relative to the bicycle frame. In contrast, the inner support 960'''''', which may be secured to a bicycle saddle, will be permitted to move relative to the adjacent outer support 930'''''' and the bicycle frame, allowing a rider to advantageously adjust the height of the saddle during use. Thus, the need to provide a minimum amount of slack in the control cable length that exits the adjustable assembly is eliminated or reduced.

Figure 16A:
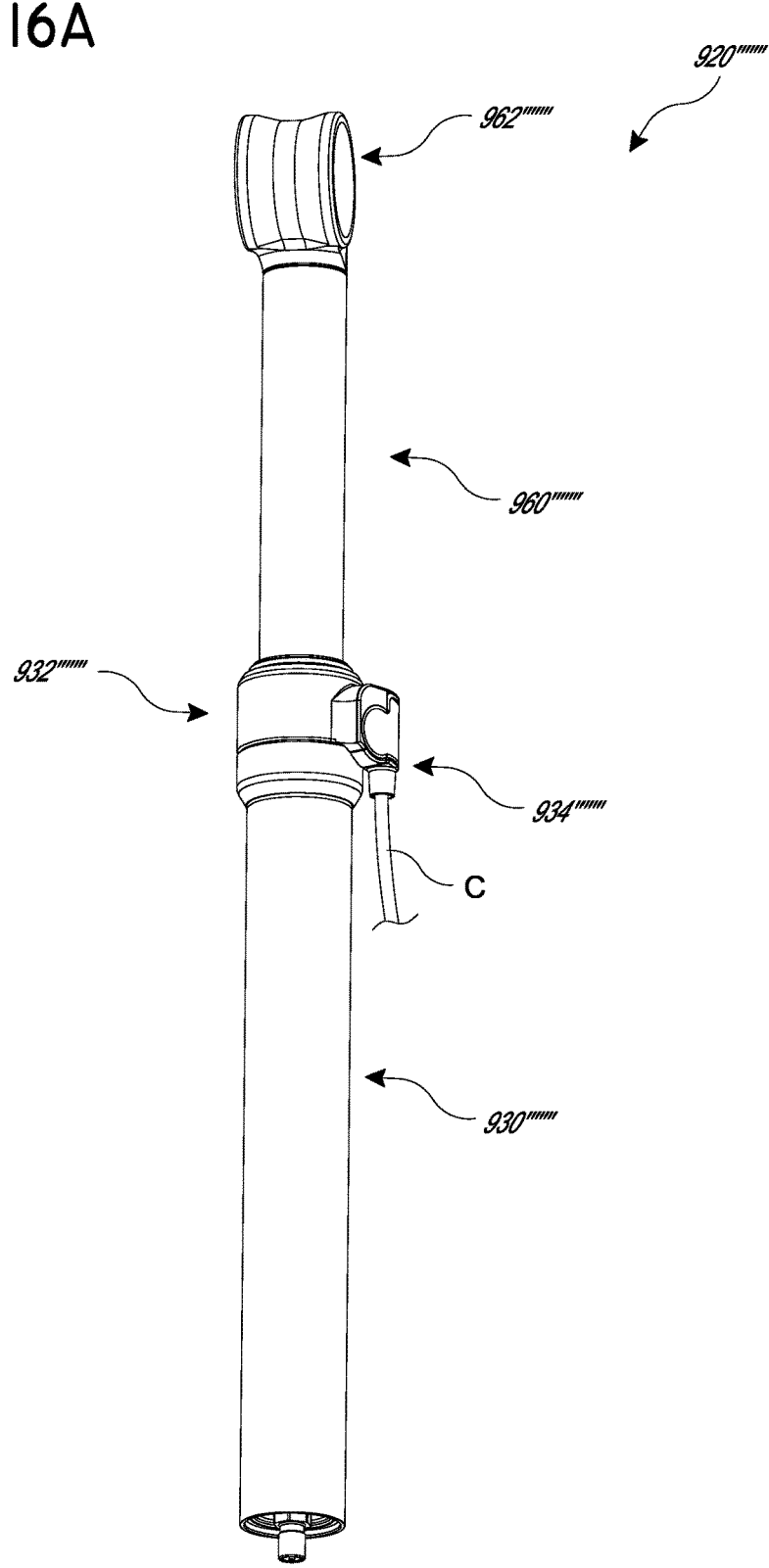
FIG. 16A illustrates a perspective view of an adjustable assembly according to another embodiment.
Figure 16B:
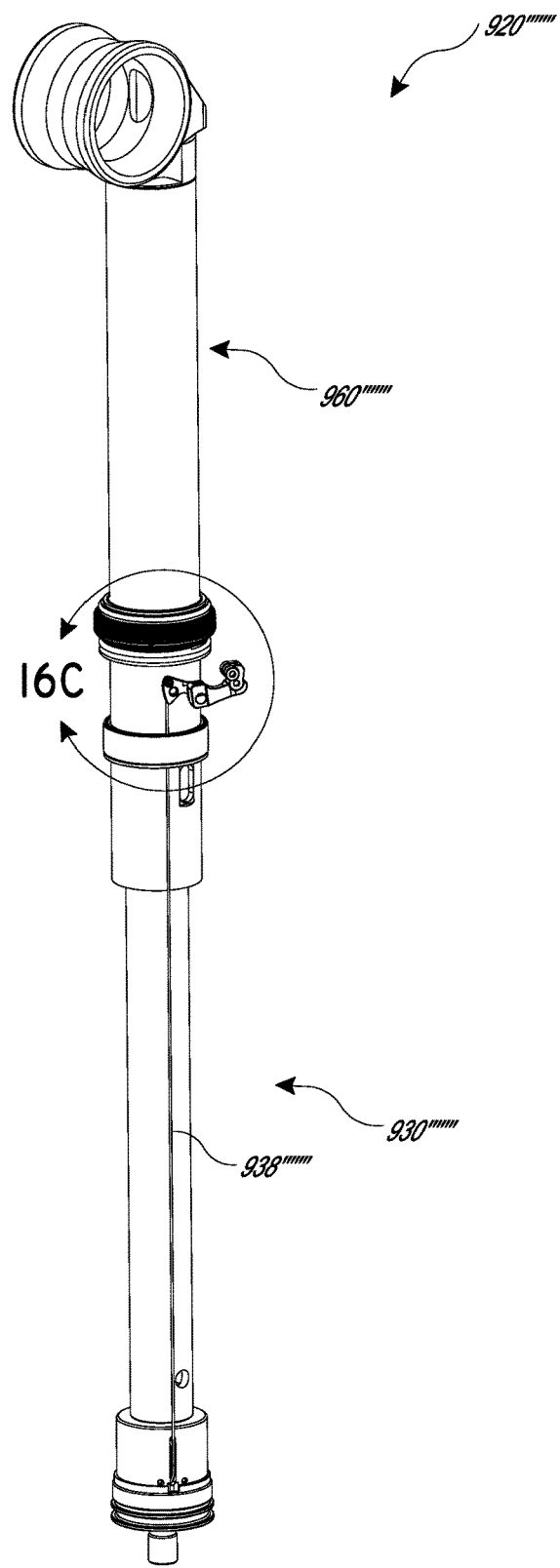
FIGS. 16B and 16C illustrate different perspective views of the adjustable assembly of FIG. 16A with a portion of the assembly hidden or removed for clarity.
Figure 16C:
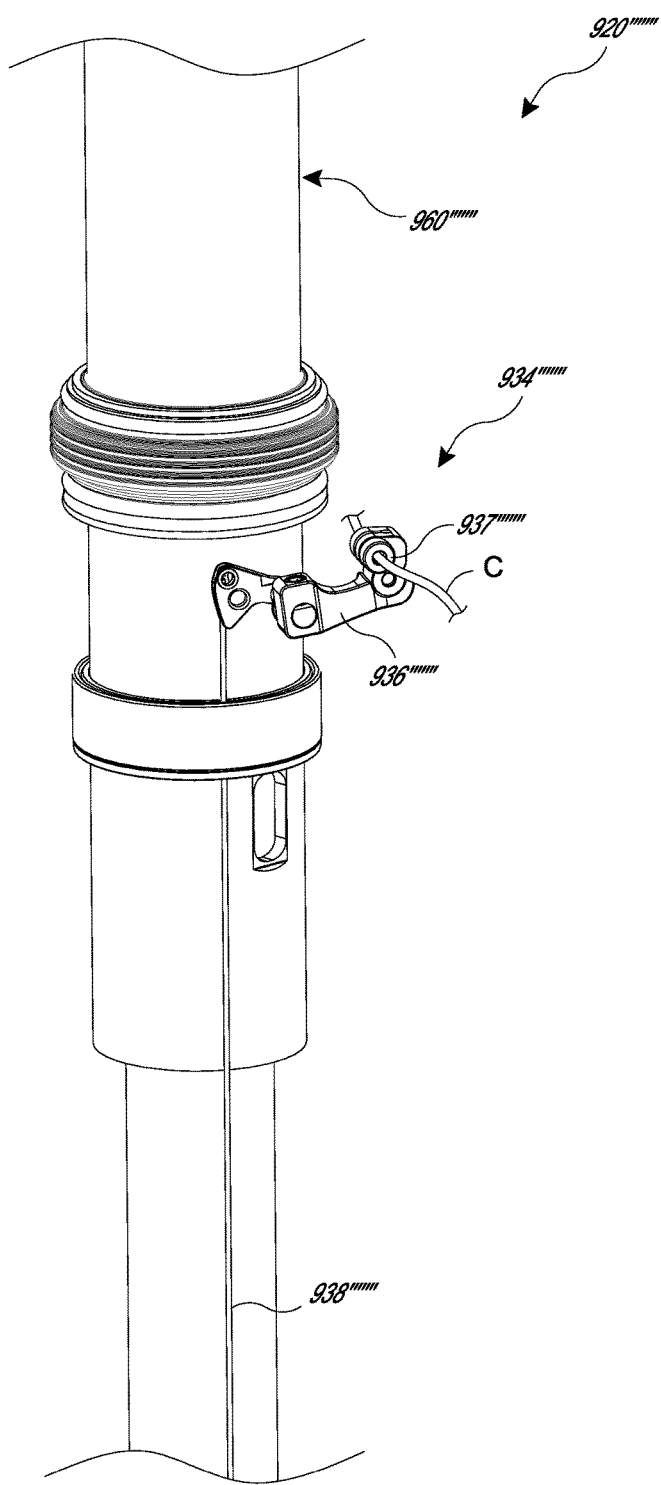

With reference to the perspective views of FIGS. 16B and 16C, the mechanically-actuated control cable C can be removably or permanently secured to a hinge assembly 936'''''' located at or near the seal head portion 932'''''' of the assembly 920''''''. In some embodiments, the cable C is connected to a cable retention member 937'''''' that is operatively coupled to the hinge assembly 936''''''. For clarity, one or more components of the assembly, such as the outer tube and certain components of the seal head portion 932'''''', have been hidden in these figures to more clearly view the manner in which mechanical actuation of the cables is accomplished. As shown, a cable 938'''''' can extend from the hinge assembly 936'''''' of the seal head portion 932'''''' and downwardly along the interior of the outer tube (not shown in FIGS. 16B and 16C for clarity).

Figure 16D:
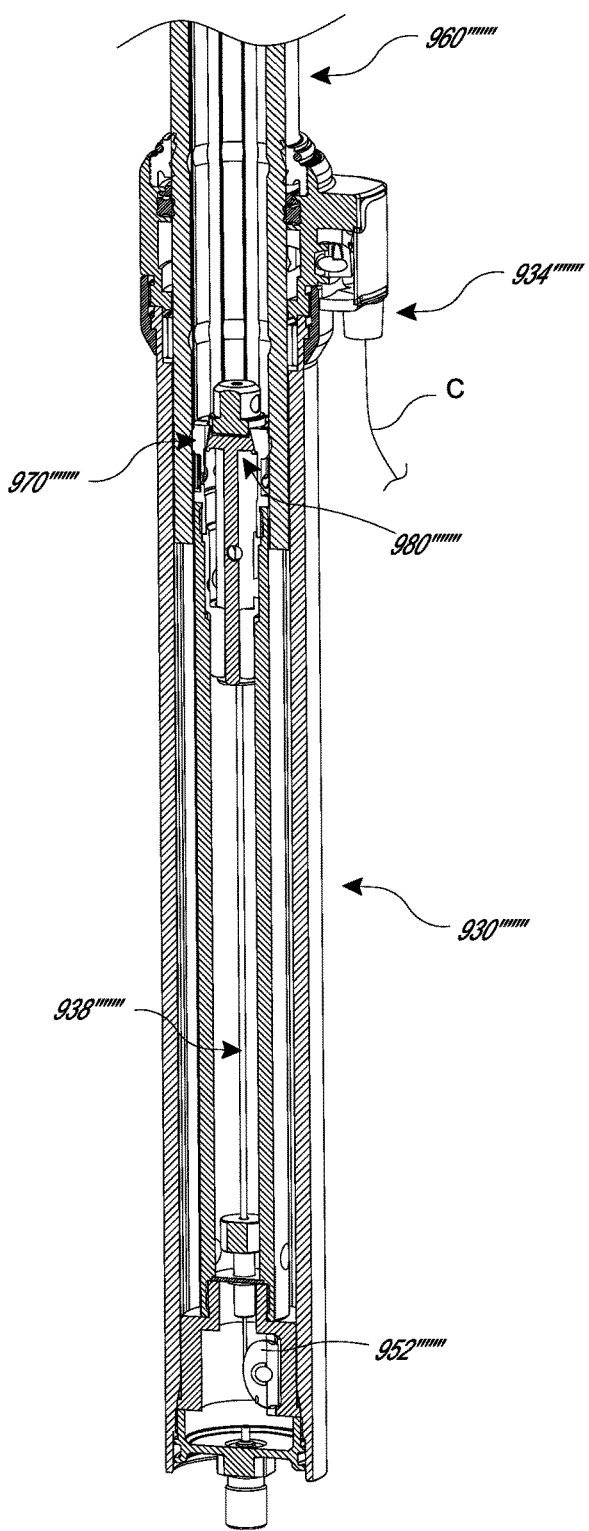
FIG. 16D illustrates a cross-sectional view of the adjustable assembly of FIG. 16A.
Figure 17A:
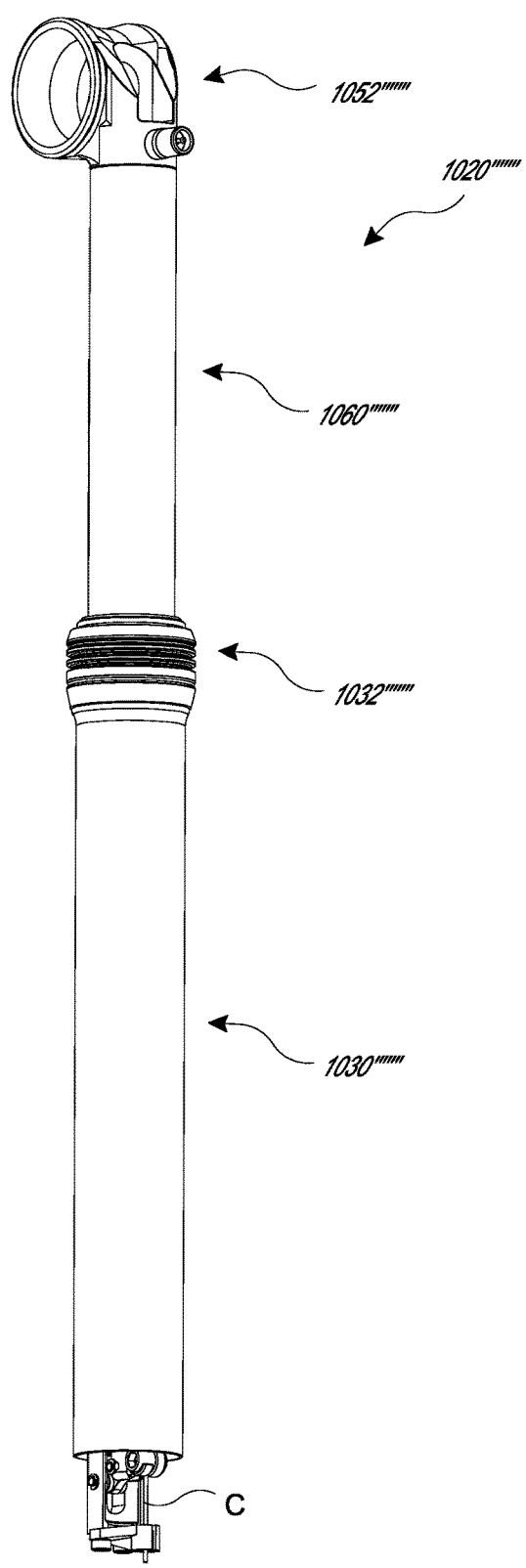
FIG. 17A illustrates a perspective view of an adjustable assembly according to another embodiment.
Figure 17B:
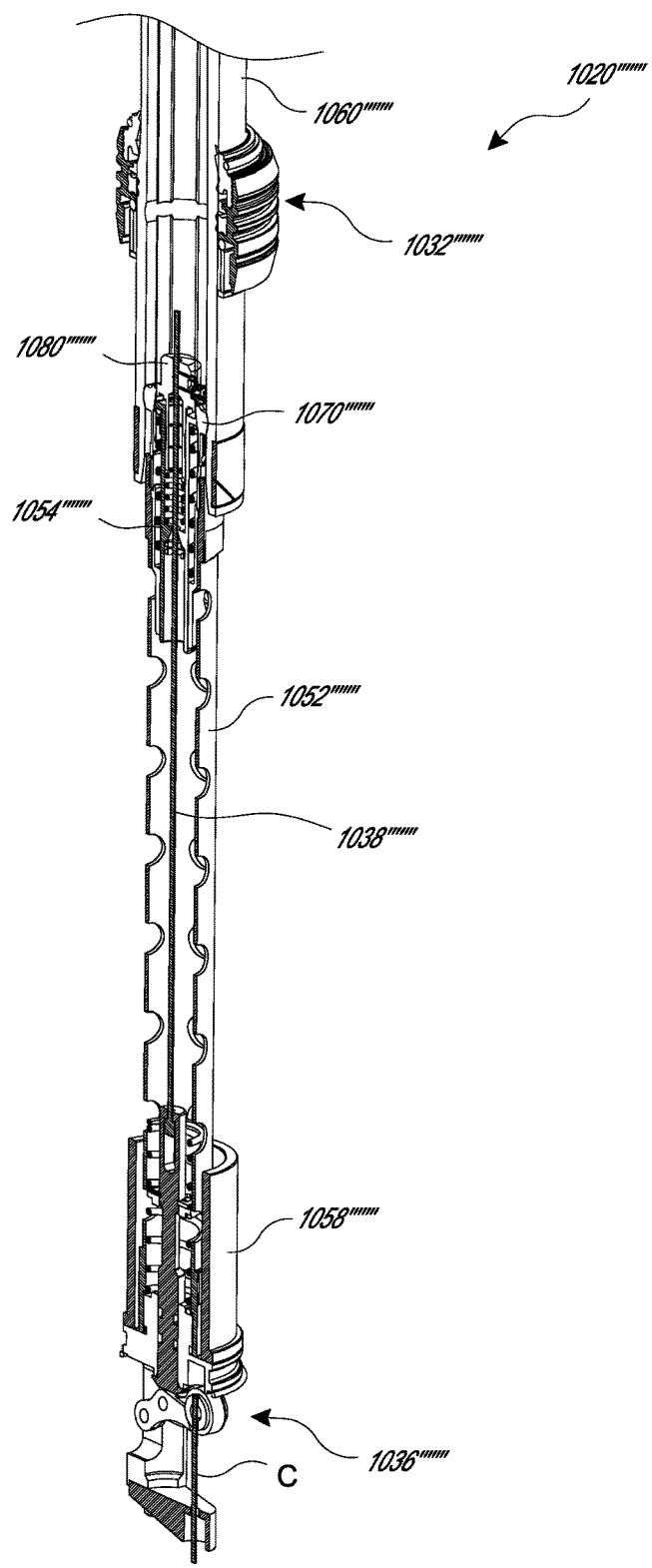
FIGS. 17B-17D illustrate different cross-sectional views of the adjustable assembly of FIG. 17A.
Figure 17C:
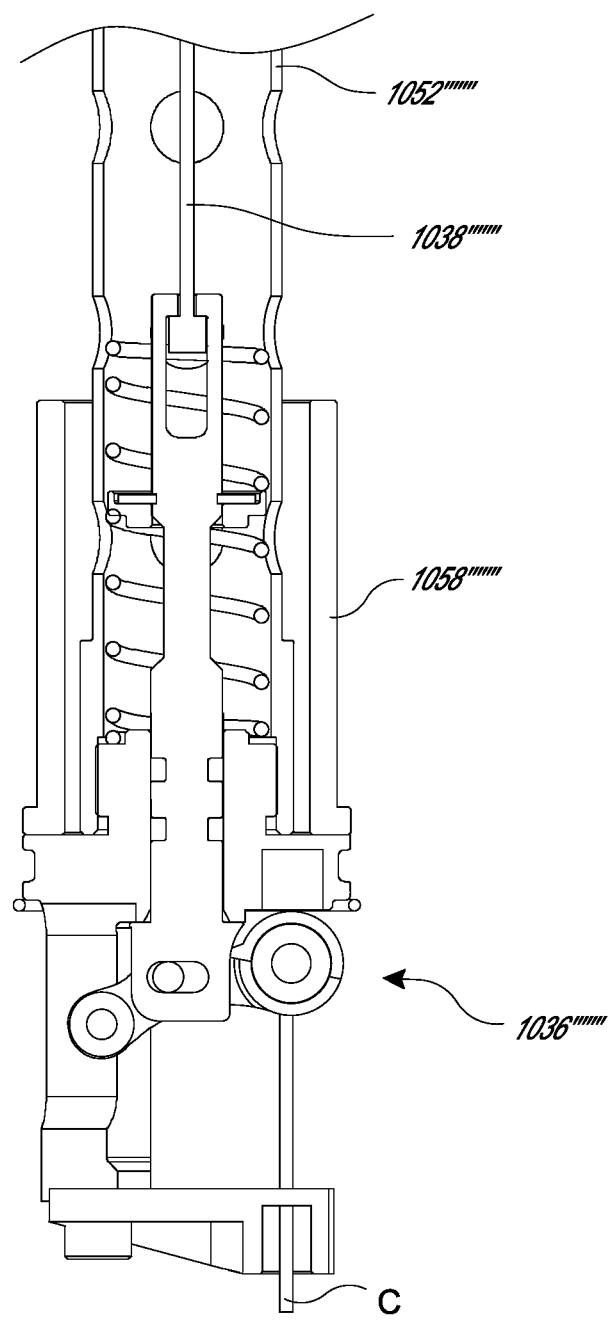
Figure 17D:
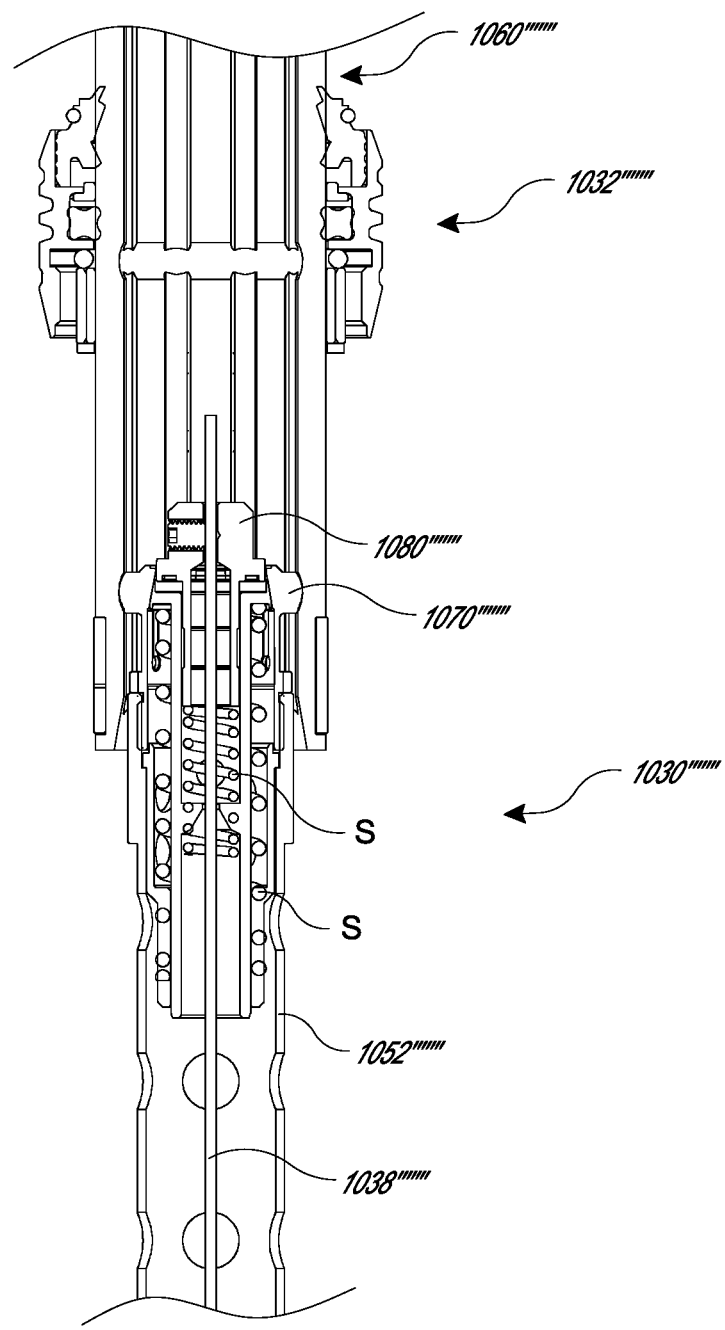

With continued reference to the cross-sectional view provided in FIG. 16D, the cable 938'''''' can be routed to or near the bottom of the assembly's outer tube or support 930'''''' where the cable's direction is reversed using a pulley 952'''''' or similar device. As shown, the pulley 952'''''' can advantageously align the cable 938'''''' with the radial centerline of the assembly, such that the cable is routed upwardly through the interior of the outer tube (and possible one or more of the outer tube's internal components). According to some embodiments, the cable 938'''''' is mechanically coupled to a retention assembly 980'''''' that is resiliently biased, at least partially, within an interior of a collet or other expansion member or portion 970''''''. As discussed herein with reference to other embodiments, the expansion portion 970'''''' is sized, shaped and otherwise configured to engage a corresponding groove, recess and/or other surface of the inner tube 960'''''' to maintain a desired relative orientation between the inner and outer tubes 960'''''', 930''''''. In addition, when the retention assembly 980'''''' is positioned within an interior region or space of the collet or other expansion portion 970'''''', the expansion portion is not permitted to retract inwardly, thereby further assuring that the expansion portion 970'''''' will remain in engaging contact with the inner tube.

In some embodiments, the control cable C which is secured to the cable retention member 937'''''' and which exits the seal head portion 932'''''' is the same cable 938'''''' routed within an interior of the outer tube 930'''''' (e.g., around the pulley) that ultimately couples to the retention assembly 980''''''. However, in other arrangements, the interior cable 938'''''' is different than the control cable C that exits the assembly. In such an embodiment, the separate cables 938'''''', C can be operatively coupled to each other at or near the seal head portion 932'''''' (e.g., by the cable retention member 937'''''', the hinge assembly 936'''''' and/or one or more other components or devices).

Accordingly, in order to avoid the need for slack in the control cable C, the collet or other expansion portion 970'''''' may be secured to the outer or lower tube or support 930'''''', and the grooves or recesses (and/or other surfaces) that are engaged by the expansion portion 970'''''' are located along an interior surface of the inner or upper tube or support 960''''''. This is generally opposite of at least some of the adjustable assembly embodiments illustrated and discussed herein (e.g., see FIGS. 12-14). Thus, regardless of the exact location and orientation of the expansion portion, the grooves or recess and/or the like, the adjustable assembly can function in a similar manner. For example, in the embodiment of FIGS. 16A-16D, an air spring (and/or some other type of spring or resilient member) can be provided within the upper or lower tube to ensure that an upwardly directed force is applied to the upper tube.

FIGS. 17A-17D illustrate an embodiment of an adjustable assembly 1020'''''' wherein the mechanically-actuated control cable C, an additional embodiment of the cable 321'''''' of FIG. 2, exits at or near the bottom of the assembly. As best depicted in the cross-sectional views of FIGS. 17B-17D, the control cable C exits the assembly at or near the bottom of the outer tube 1030''''''. For clarity, at least a portion of the outer tube 1030'''''' is hidden in these figures. The cable C can be coupled to a pivot or hinge assembly 1036'''''', such that when the cable is pulled downwardly (e.g., generally away from the assembly), the pivot or hinge assembly 1036'''''' will be moved against a resilient or other biasing force to also move the interior cable 1038'''''' downwardly (e.g., toward the bottom of the assembly). Such a downward movement of the cable 1038'''''' will cause the retention assembly 1080'''''' that is directly or indirectly coupled to the cable 1038'''''' to also move downwardly against a biasing force created by one or more springs S or other resilient members. As discussed herein with regard to other embodiments, movement of the retention assembly 1080'''''' relative to the interior of the collet or other expansion portion or member 1070'''''' can permit the expansion portion to retract inwardly. Accordingly, the expansion portion 1070'''''' can disengage from a corresponding groove, recess and/or other portion of the interior wall of the inner tube 1060'''''', allowing the rider to conveniently and reliably adjust the vertical position of the adjustable assembly.

With continued reference to the embodiment illustrated in FIGS. 17A-17D, the collet or other expansion portion 1070'''''' can be coupled to one or more tubes or members 1052'''''' positioned within an interior space of the outer tube 1030''''''. In some embodiments, such interior tubes or members 1052'''''' are maintained in a rigid orientation relative to the outer tube 1030'''''' using one or more plugs 1058'''''' or other members or components. The use of interior tubes, plugs and/or other components can assist in reinforcing the assembly and improve the structural integrity and/or capacity of the collet or other expansion portion 1070''''''.

Figure 18A:
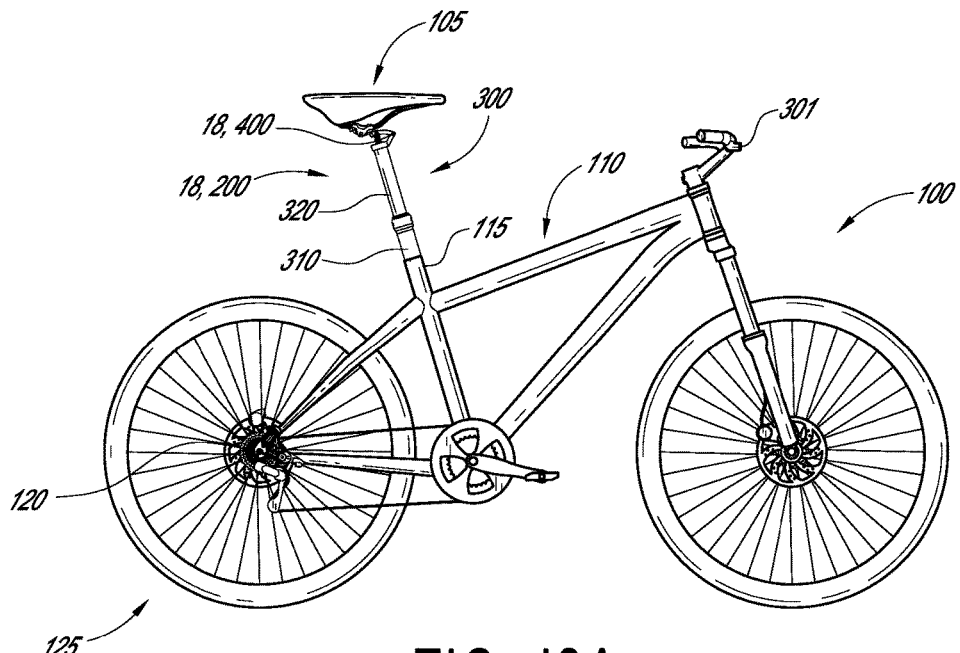
FIG. 18A illustrates a side view of a bicycle including another embodiment of a saddle angle adjustment assembly in a raised position and the saddle at a first saddle angle.

FIGS. 18A-31 illustrate another embodiment of a saddle angle adjustment assembly 18200, wherein a saddle 105 is capable of being tilted between a first rotational position and a second rotational position. For example, FIG. 18A illustrates the saddle 105 in the first rotational position. The first rotational position may be referred to herein as a raised position, tilted forward position, level position, and/or the like. In the first rotational position, in some embodiments, the saddle 105 and/or a saddle rail 107 of the saddle 105 is positioned substantially level or parallel with a ground plane when an unweighted bicycle is positioned on a horizontal ground plane. Although the saddle 105 in FIG. 18A is substantially parallel to a ground plane, the saddle 105 is in a tilted forward position with respect to a central axis of the adjustable height seat post assembly 300.

Figure 18B:
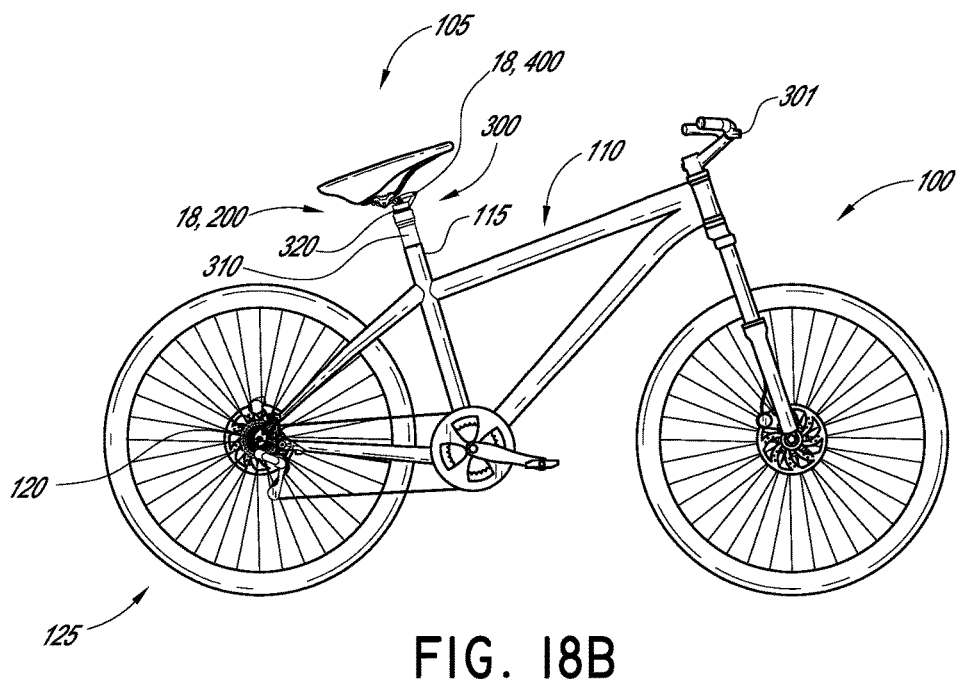
FIG. 18B illustrates a side view of the bicycle of FIG. 18A with saddle angle adjustment assembly in a lowered position and the saddle at a second saddle angle.

The second rotational position may be referred to herein as a lowered position, tilted backward position, and/or the like. As can be seen in FIG. 18B, in the second rotational position, the saddle 105 is no longer level with a ground plane but is tilted backward with respect to a ground plane with the back end of the saddle lower than the front end of the saddle. In this position, as shown in FIG. 18B, the saddle is generally perpendicular to a central axis of the seat post 300. However, in some embodiments, the second rotational position does not necessarily have to be a position wherein the saddle is perpendicular to an axis of a seat post. Rather, the second rotational position can be any rotational position wherein the angle α shown in FIG. 19 and described in greater detail below is larger than in the first rotational position.

FIGS. 18A and 18B illustrate side views of the saddle angle adjustment assembly 18200 installed on a bicycle frame 110. In FIG. 18A, the adjustable height saddle post 300 is shown in a raised position, and the saddle 105 is shown in a raised, tilted forward, or level position (e.g., the first rotational position). As with various other embodiments disclosed herein, the saddle angle adjustment mechanism 18400 can be configured to automatically tilt the saddle 105 backwards when the adjustable height saddle post 300 moves to a lowered position. FIG. 18B illustrates a side view of the adjustable height saddle post 300 in the lowered position and the saddle 105 tilted backwards (e.g., in the second rotational position).

Figure 19:
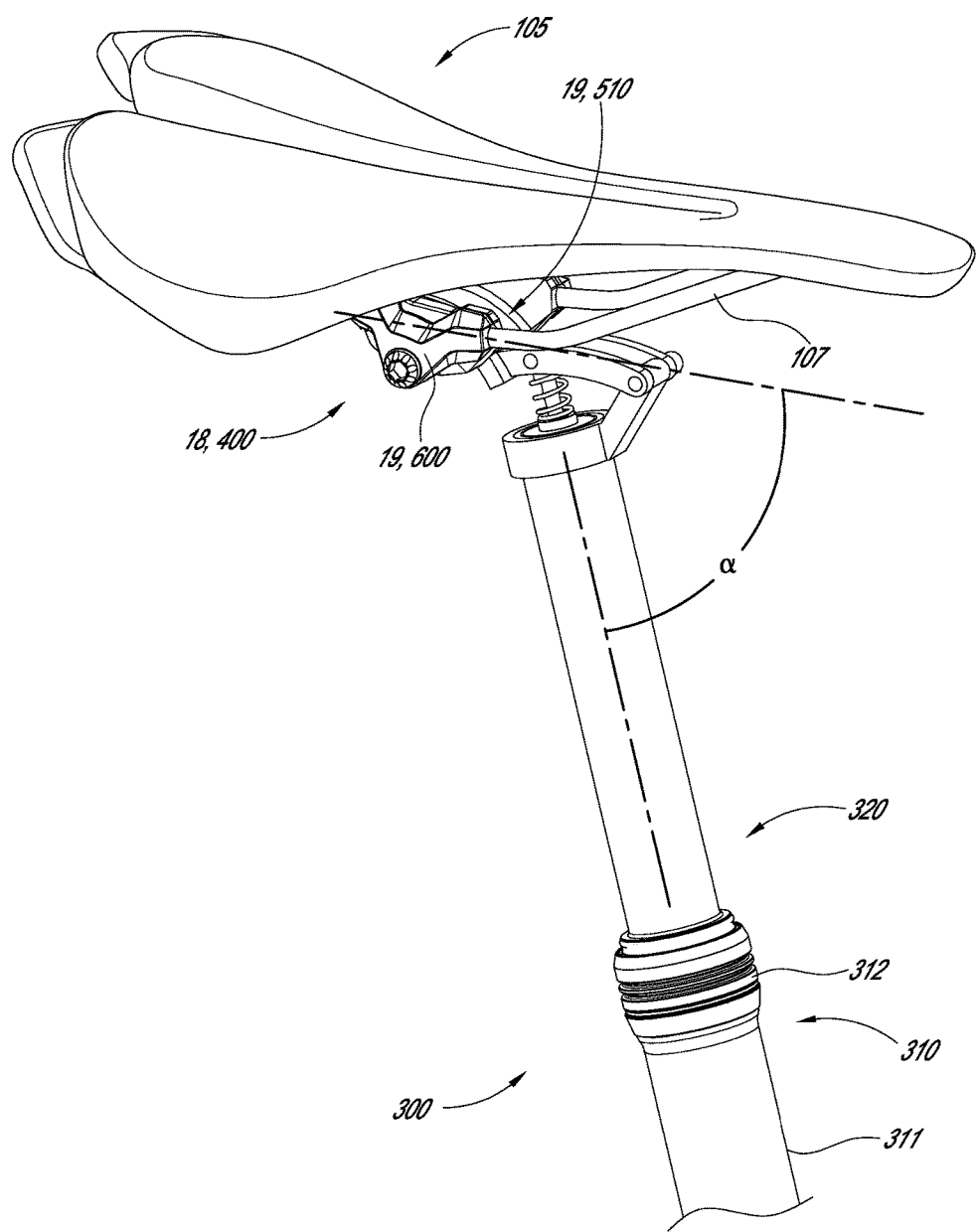
FIG. 19 illustrates a perspective view of a saddle coupled to the saddle angle adjustment assembly of FIG. 18A.

FIG. 19 illustrates a perspective view of the saddle angle adjustment mechanism 18400 of FIGS. 18A and 18B. The saddle angle adjustment mechanism 18400 comprises a saddle receiver 19510 configured to mate with saddle rails 107 of the saddle 105. The saddle receiver 19510 further comprises rail retaining members 19600 configured to clamp against the saddle rails 107 to hold or constrain the saddle 105 in position relative to the saddle receiver 19510. As described in greater detail below, the saddle receiver 19510 and a rotating arm 2002 form a rotating saddle support assembly rotatably coupled to a hydraulic actuating mechanism configured to selectively enable rotating a saddle between a forward and a back position.

Similarly to the embodiment shown in FIGS. 2 and 3 and described above, the saddle receiver 19510 defines a partially cylindrical surface which defines a rail receiving axis which is collinear with a central axis of a portion of the rail 107 engaging the saddle angle adjustment mechanism 18400. The saddle angle "α" shown in FIG. 19 is defined by the angle between the rail receiving axis and the central axis of the upper support 320 of the adjustable height seat post 300. In various embodiments, the saddle angle α can have a range of adjustment between the first rotational position and the second rotational position similar to the ranges described above with reference to FIGS. 2 and 3. Further, adjustments of the adjustable height saddle post 300 can result in adjustments of the saddle angle α similar to as described above with reference to FIGS. 2 and 3. Additionally, in some embodiments, an adjustment of the saddle post 300 of at least five millimeters can result in enabling the saddle 105 to rotate between the first and second rotational positions. In other embodiments, other magnitudes of movement of the saddle post 300 may result in enabling the saddle 105 to rotate between the first and second rotational positions, as further described below.

Figure 22:
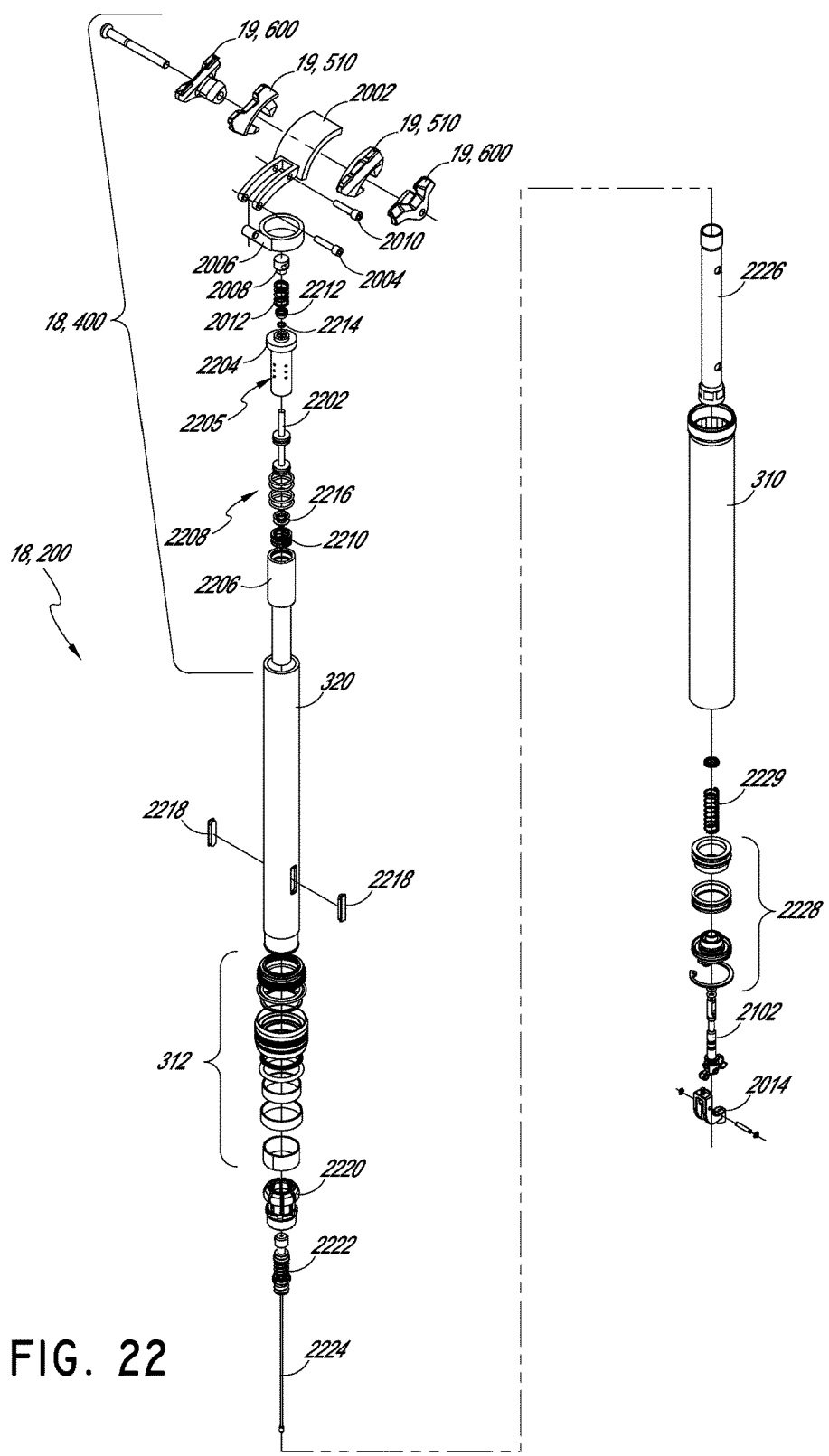
FIG. 22 illustrates an exploded view of the saddle angle adjustment assembly of FIG. 18A.
Figure 23:
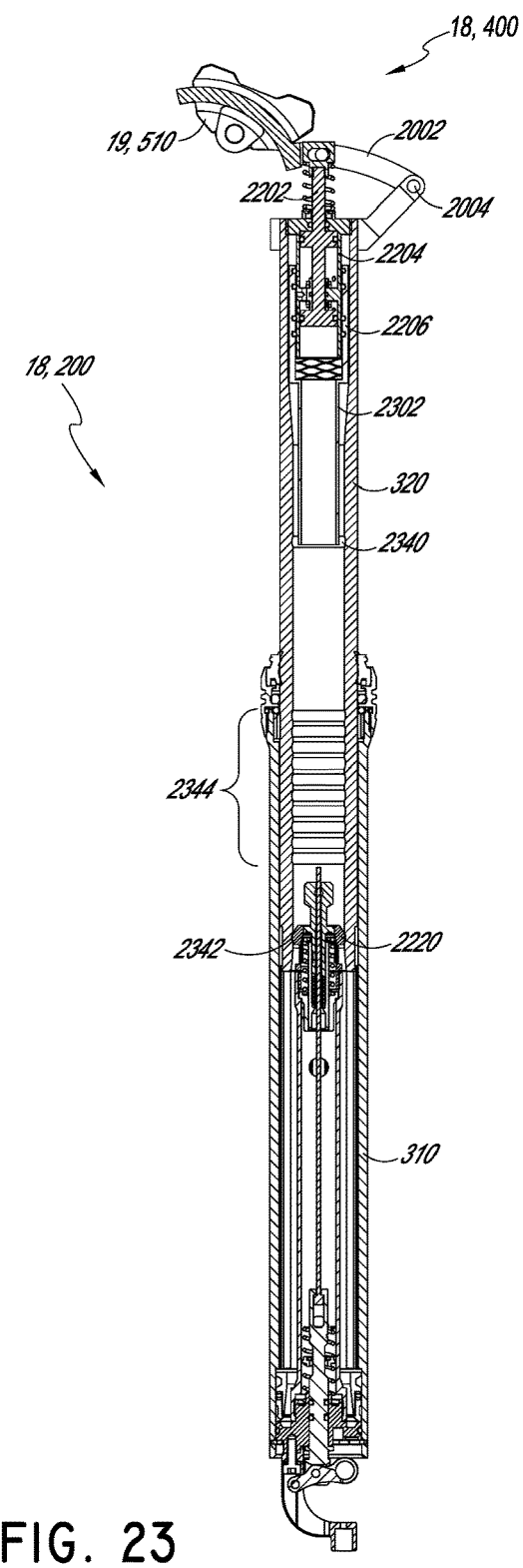
FIG. 23 illustrates a cross-sectional view of the saddle angle adjustment assembly of FIG. 18A.

FIGS. 20-23 illustrate additional views of the saddle angle adjustment assembly 18200. FIG. 20 illustrates a perspective view of the saddle angle adjustment assembly 18200, FIG. 21 illustrates a side view of the saddle angle adjustment assembly 18200, FIG. 22 illustrates an exploded view of the saddle angle adjustment assembly 18200, and FIG. 23 illustrates a cross sectional view of the saddle angle adjustment assembly 18200.

The saddle angle adjustment assembly 18200 comprises the saddle angle adjustment mechanism 18400 connected to an adjustable height saddle post comprising an upper support 320 and a lower support 310. The saddle angle adjustment mechanism 18400 comprises a hydraulic actuating mechanism (described in more detail below) that interacts with a collet mechanism of the adjustable height saddle post to enable automatic actuation of the saddle angle adjustment mechanism when the upper support 320 is moved with respect to the lower support 310.

The height of the saddle post shown in FIGS. 20-23 is adjusted using a collet mechanism similar in design to the height adjusting mechanisms described above with reference to FIGS. 12-17D. As with those embodiments, the embodiment illustrated in FIGS. 20-23 comprises a collet 2220 that mates within one of a plurality of circumferential grooves on an inner surface of the upper support 320. When the collet 2220 is locked in place in one of these grooves, the height of the adjustable heights the post is set. However, unlike the embodiment illustrated in FIG. 12, the collet 2220 of the saddle angle adjustment assembly 18200 desirably also interacts with the saddle angle adjustment mechanism 18400 to enable movement or angle adjustment of the saddle. Specifically, as described in more detail below, an actuating extension 2302 of the saddle angle adjustment mechanism 18400 contacts the collet 2220 when the upper support 320 is in a lowered position. When the actuating extension 2302 contacts the collet 2220, the actuating extension 2302 translates upward, opening a one-way hydraulic fluid flow path that enables the saddle to change angle (in this case, to rotate backwards). Further, when the upper support 320 moves upward to a raised position, the actuating extension 2302 translates back downward switching the hydraulic fluid flow path to enable the saddle to rotate in an opposite direction. Although in this embodiment the collet 2220 contacts the actuating extension 2302 to enable rotation of the saddle 105, in other embodiments the actuating extension 2302 may be configured to contact a different portion of the saddle post, a part of the bicycle or bicycle frame that is not part of the saddle post, and/or the like. Further details of the operation of the hydraulic mechanism are given below with reference to FIGS. 24-31.

The height of the adjustable height seat post can be adjusted similarly to the adjustable height seat post illustrated in FIGS. 12 and 13. Namely, a collet 2220 is configured to mate with a plurality of grooves on an interior surface of the upper support 320. For example, as can be seen in FIG. 23, the upper support 320 comprises a top circumferential groove 2340, a plurality of middle grooves 2344, and a bottom groove 2342. In the configuration shown in FIG. 23, the adjustable height seat post is shown in a raised position, with the collet 2220 being positioned in the bottom groove 2342. With the collet positioned in a groove, a collet positioning mechanism 2222 keeps the collet from collapsing and maintains the relative position of the upper support 320 with respect to the lower support 310. When a collet actuating mechanism 2102 is operated, for example, by pulling a control cable, the collet actuating mechanism 2102 applies a tension force to the cable 2224, which translates the collet positioning mechanism 2222, which then translates relative to the collet 2220, enabling the collet 2220 to collapse. When the collet 2220 is collapsed, the upper support 320 is able to translate or slide relative to the lower support 310. The upper support 320 can then be locked into another position by positioning the collet 2220 in another one of the circumferential grooves 2340 or 2344.

As shown in FIG. 22, a collet actuating mechanism 2102 and a cable guide 2014 is disposed at a bottom of the lower support 310. The cable guide 2014 is configured to route a control actuation cable from the saddle post to, for example, enable the cable to be run to a controller 301 located at, for example, handlebars of the bicycle. The cable can be used to actuate the collet actuating mechanism 2102 which in turn pulls on a cable 2224, which translates a collet positioning mechanism 2222, as described above. Although in this embodiment the cable 2224 is preferably routed to a bottom of the saddle post and actuated by a mechanism disposed on the bottom of the saddle post, in various other embodiments the cable 2224 may be routed to a different location and/or actuated by a mechanism located at a different location. For example, any of the cable and actuation methods described above, for example with reference to FIGS. 12-17D, may be utilized.

With further reference to FIG. 22, the adjustable height saddle post further comprises two alignment keys 2218 to keep the upper support 320 from rotating relative to the lower support 310. The adjustable height saddle post also comprises collet mechanism mounting hardware 2228 and a cable return spring 2229. The cable return spring 2229 is used to return the collet actuating mechanism 2102 to its upward or home position after, for example, a rider releases the control 301. The collet mechanism mounting hardware 2228 is used to mount the collet actuating mechanism 2102 and locate that mechanism with respect to lower support 310. The collet mechanism mounting hardware 2228 in some embodiments may include various seals to keep the elements out of an interior of the device. The adjustable height saddle post further comprises a collet support post 2226 configured to support and position the collet 2220 and collet positioning mechanism 2222.

The saddle angle adjustment mechanism 18400 comprises a saddle receiver 19510 attached to a rotating arm 2002. The rotating arm 2002 rotates about a pivot bolt 2004 coupled to a mounting collar 2006. By rotating about the pivot bolt 2004, the rotating arm 2002 enables the bicycle seat to tilt forward and backward about an axis of rotation defined by the pivot bolt 2004. Although in this embodiment the axis of rotation is defined by a pivot bolt, various other mechanical methods maybe used to define the axis of rotation. The ability of the arm 2002 to rotate is desirably limited by an actuating member 2008 protruding from the upper support 320 and coupled to the arm 2002. The actuating member 2008 is connected to a piston rod 2202 that can be seen in FIGS. 22 and 23. The piston rod 2202 is part of a hydraulic system that enables the actuating member 2008 to be locked in certain positions and/or to be configured to move in only one direction.

In this embodiment, the rotating arm 2002 is rotatably coupled to a mounting collar 2006 which is in turn coupled to the upper support 320. The collar 2006 may include a spacing arm 2106 (shown in FIG. 21) or similar spacing member to space the axis of rotation of the pivot bolt 2004 upward and further forward from an axis of the upper support 320. In other embodiments, the rotating arm 2002 may be rotatably attached directly to the upper support 320 or even rotatably attached directly to the bicycle frame 110.

As with various other embodiments, the assembly illustrated in FIGS. 20-23 is configured to enable the saddle receiver 19510 to rotate, and desirably to rotate in a single direction, when the upper support 320 drops to a lowered position with respect to the lower support 310. FIGS. 20-23 illustrate the saddle receiver 19510 in a raised position. For example, as illustrated in FIG. 18A, the raised position may put the saddle 105 in a level position with respect to a ground plane. However, when the upper support 320 drops to a lowered position, the actuation extension 2302 of the outer body or sleeve 2206 illustrated in FIG. 23 contacts an upper surface of the collet 2220, causing the hydraulic assembly of the saddle angle adjustment mechanism to enable the piston rod 2202 to drop with respect to the upper support 320. When the piston rod 2202 drops, the rotating arm 2002 also drops (rotating the saddle backwards), because the rotating arm 2002 is attached to the actuating member 2008 using bolt 2010, the actuating member 2008 being attached to the piston rod 2202. Accordingly, the saddle receiver 19510 is able to drop to a lowered position, such as is shown in FIG. 18B.

With further reference to FIGS. 22 and 23, the hydraulic portion of the saddle angle adjustment mechanism in this embodiment further comprises a spring 2012 configured to bias the rotating arm 2002 in an upward position. The spring 2012 surrounds the piston rod 2202 and is positioned underneath the actuating member 2008 to bias it upward in an axial direction. For example, when the system is actuated at a lowered position to enable the rotating arm 2002 to drop to a lowered position, a rider's body weight may overcome the force of the spring 2012 and cause the saddle receiver 19510 to lower. However, when the upper support 320 moves upward to a raised position, and the rider takes his or her body weight off of the saddle 105, the spring 2012 can be used to automatically return the saddle 105 to its upper or forward position, as shown in FIG. 18A. The spring 2012 in some embodiments may alternatively be another type of stored energy device such as a rotational spring, an air spring, a resilient material, and/or the like.

The saddle angle adjustment mechanism 18400 further comprises an inner body or sleeve 2204 comprising a plurality of orifices (e.g., holes, openings, slits, outlets, inlets, fluid passages) 2205. The inner sleeve 2204 in this embodiment comprises a support engaging portion that is coupled to the upper support 320. The inner sleeve 2204 fits at least partially within the outer sleeve 2206. A plurality of O-rings 2208 are positioned within grooves of the outer sleeve 2206 to create a plurality of isolated cavities between the inner sleeve 2204 and outer sleeve 2206. The interaction of these cavities can enable the hydraulic operation of this mechanism, as is further described below. The hydraulic mechanism further comprises a seal 2212 and O-ring 2214 positioned at a top of the inner sleeve 2204 to, for example, keep hydraulic fluid within the sleeve and/or to keep dust and other contaminates out of the mechanism. The hydraulic mechanism further comprises shims 2216 and a spring 2210 described in greater detail below.

Figure 25:
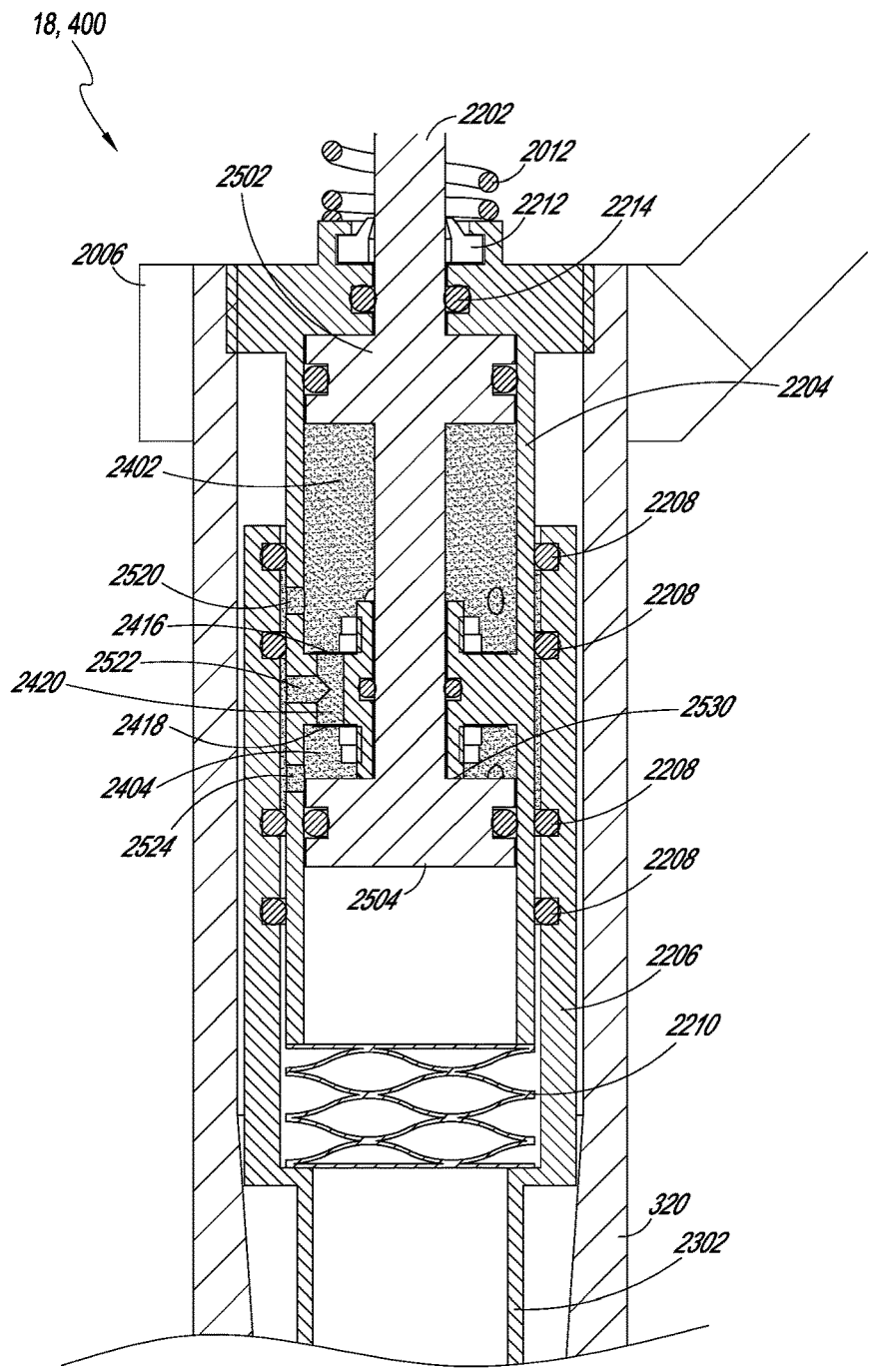
Figure 26:
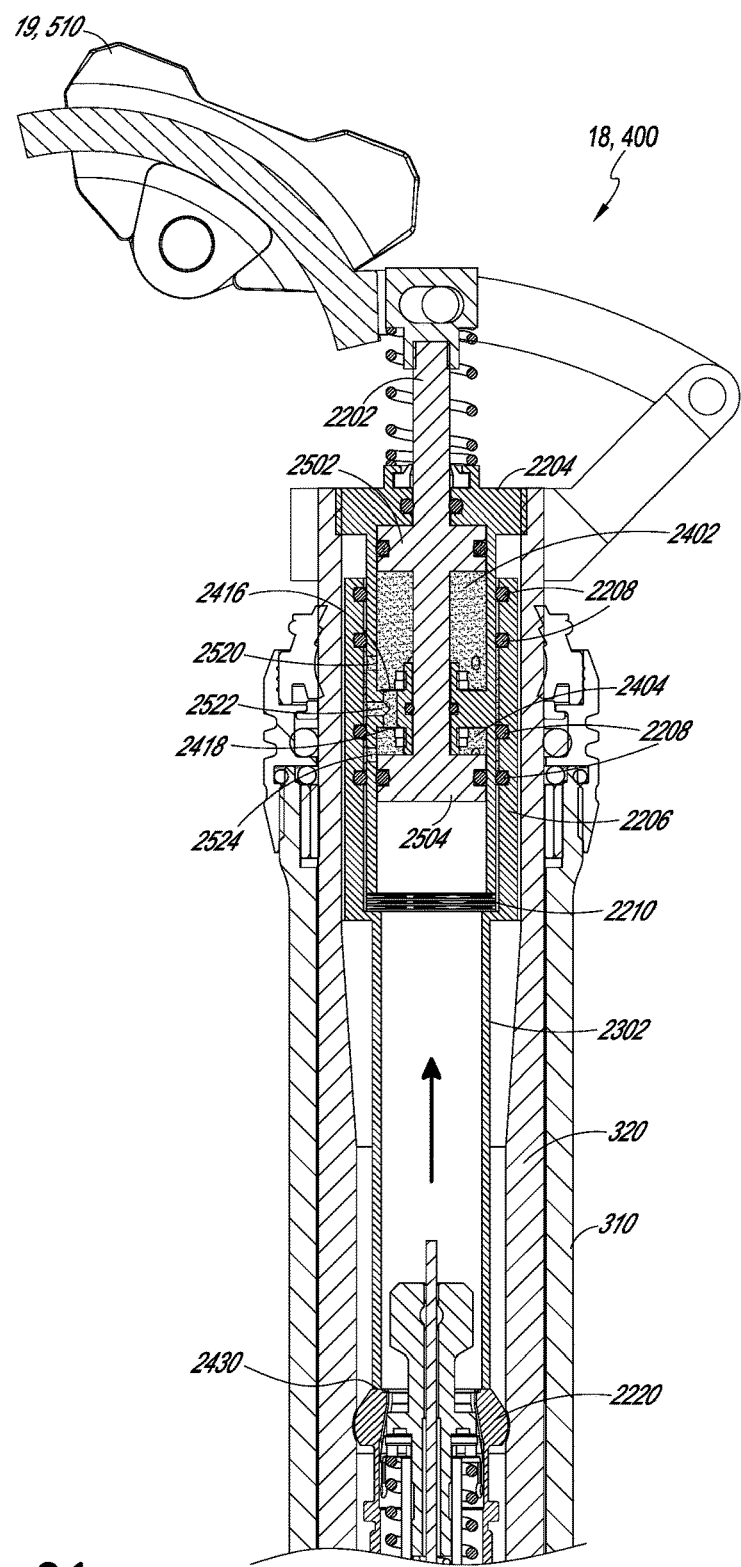
Figure 27:
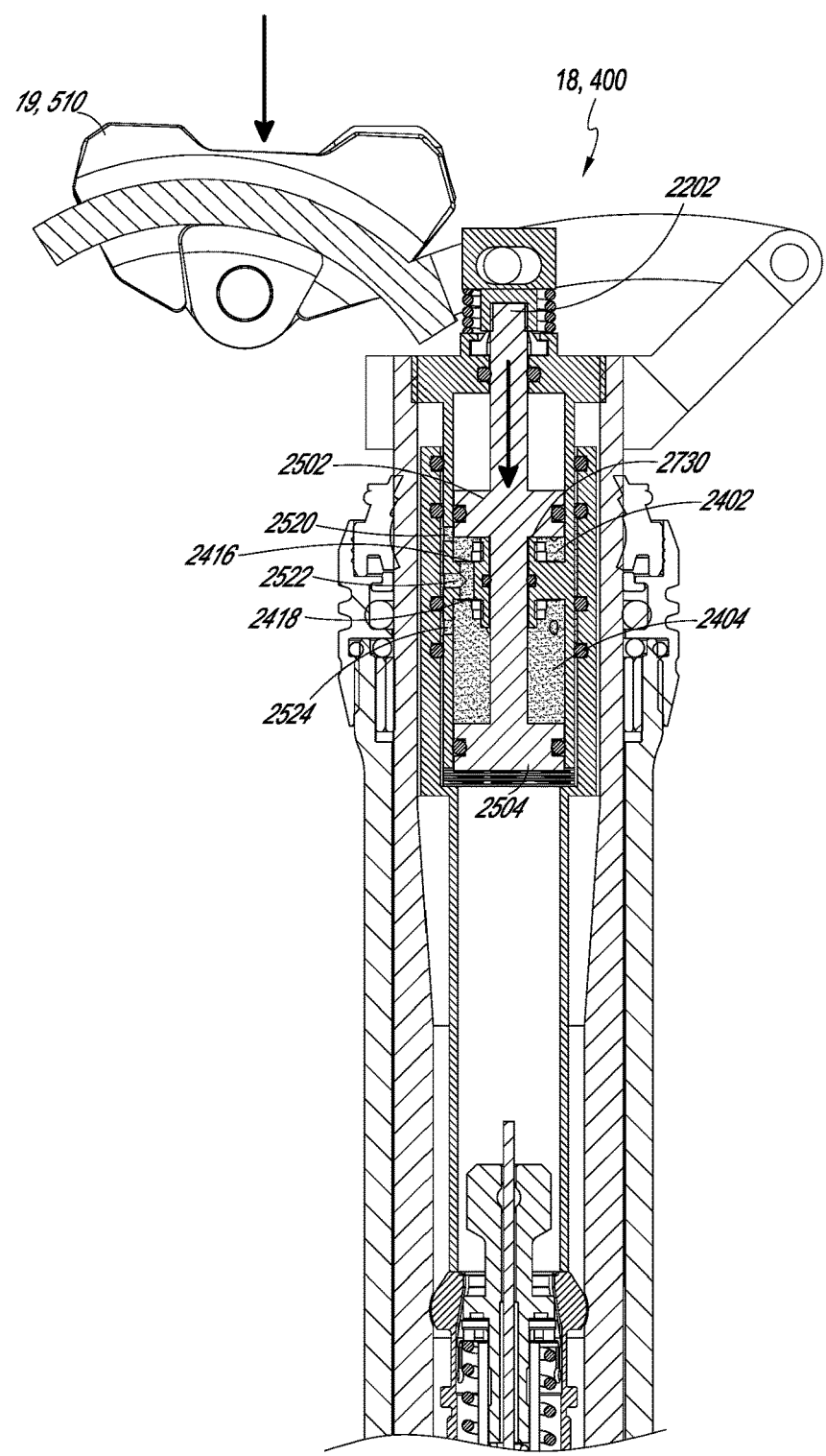
Figure 28:
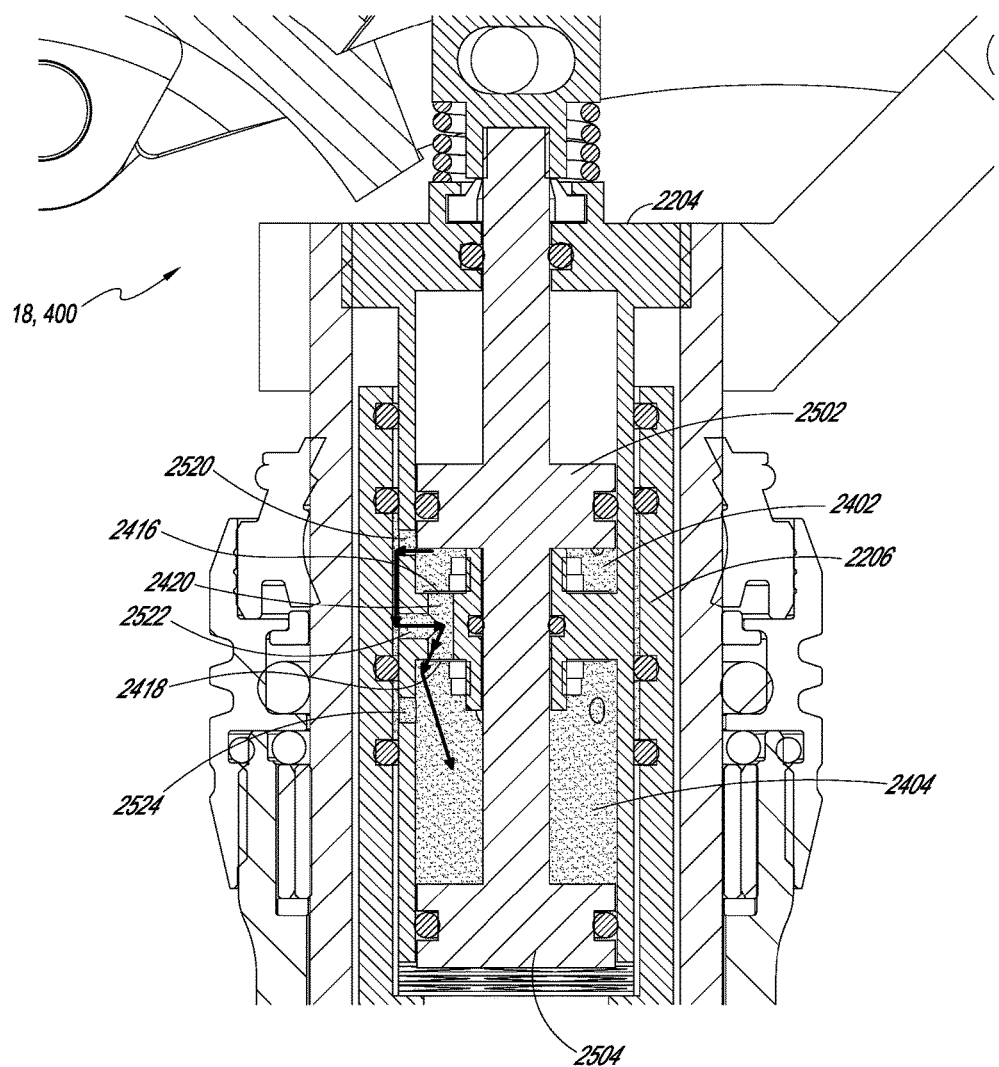
Figure 29:
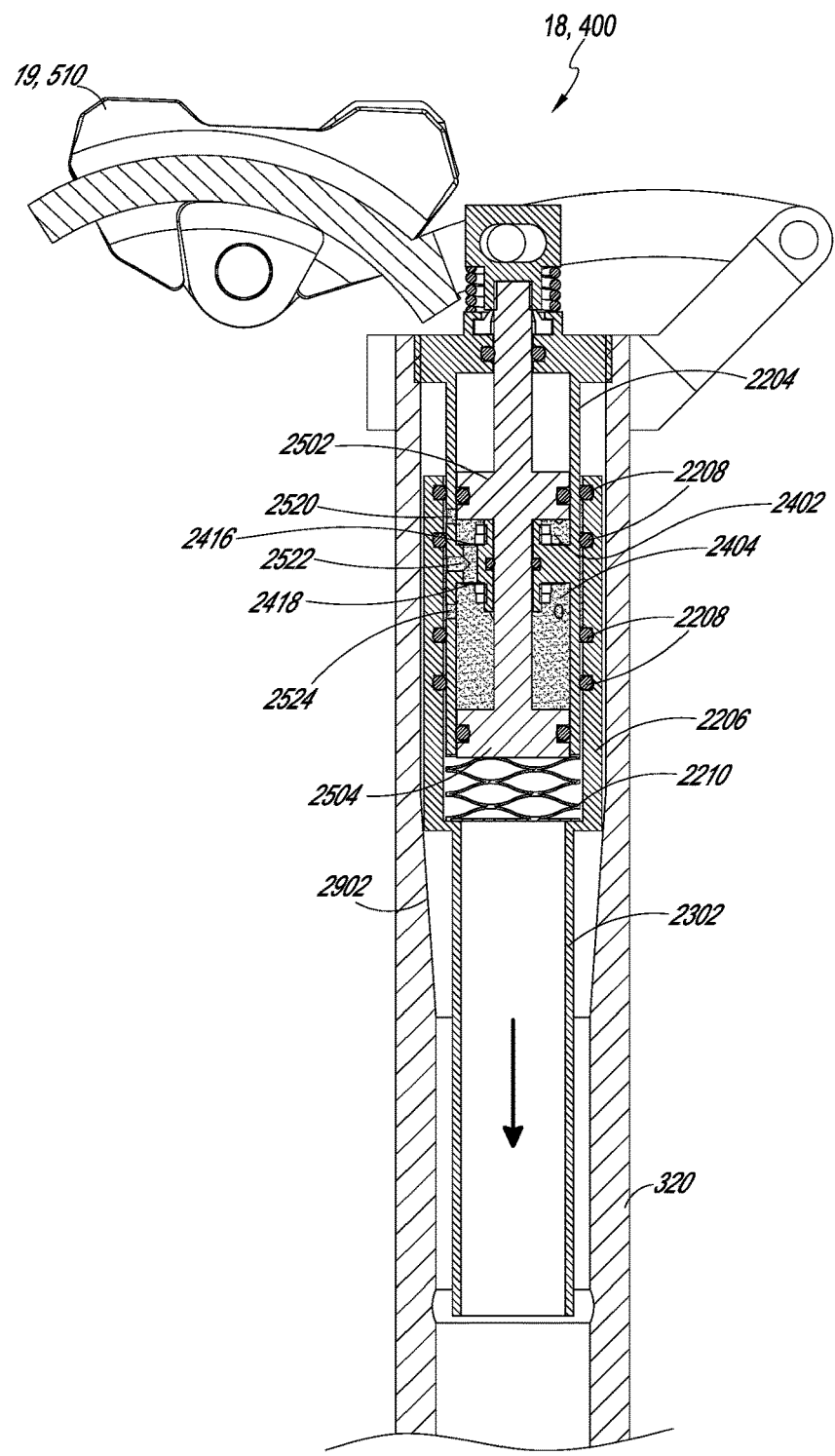
Figure 30:
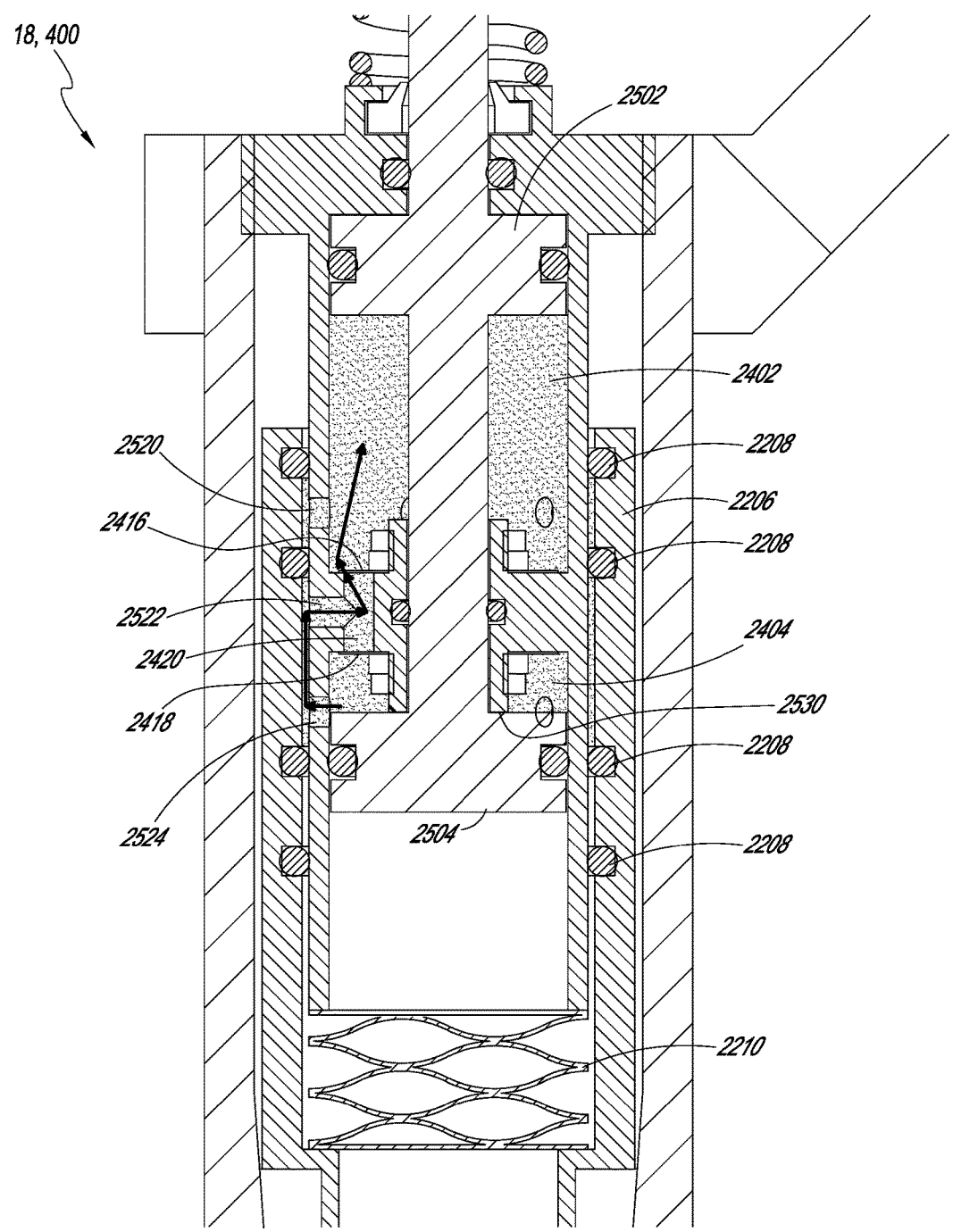
Figure 31:
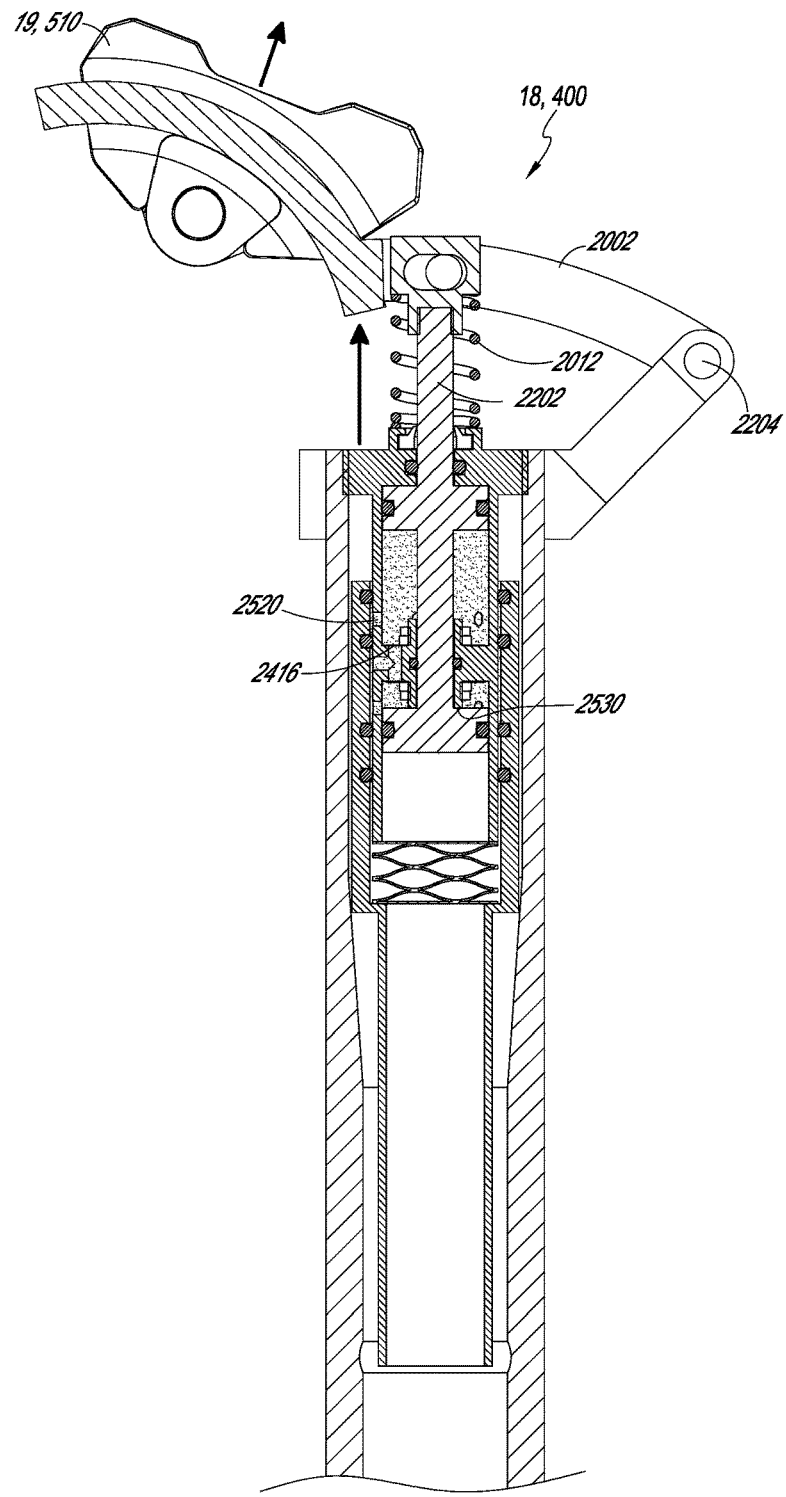

FIGS. 24-31 illustrate cross sectional views of the saddle angle adjustment mechanism 18400 of FIGS. 18A-23 in various stages of actuation. The sequence begins with FIGS. 24 and 25, where the saddle receiver 19510 is in a fully upward or tilted forward position (relative the seat post axis, and desirably horizontal relative the ground surface; e.g., the first rotational position), and the saddle post is in a raised position, such as is shown in FIG. 18A. The sequence proceeds to FIG. 26, where the saddle post has been lowered to a lowered position. Next, FIGS. 27 and 28 illustrate the saddle receiver 19510 in a lowered or tilted backward position (relative the seat post axis, and desirably the horizontal ground surface; e.g., the second rotational position), such as is shown in FIG. 18B. Finally, FIGS. 29 through 31 illustrate the saddle receiver 19510 returning to an upward or tilted forward position, as is shown in FIG. 18A.

Figure 24:
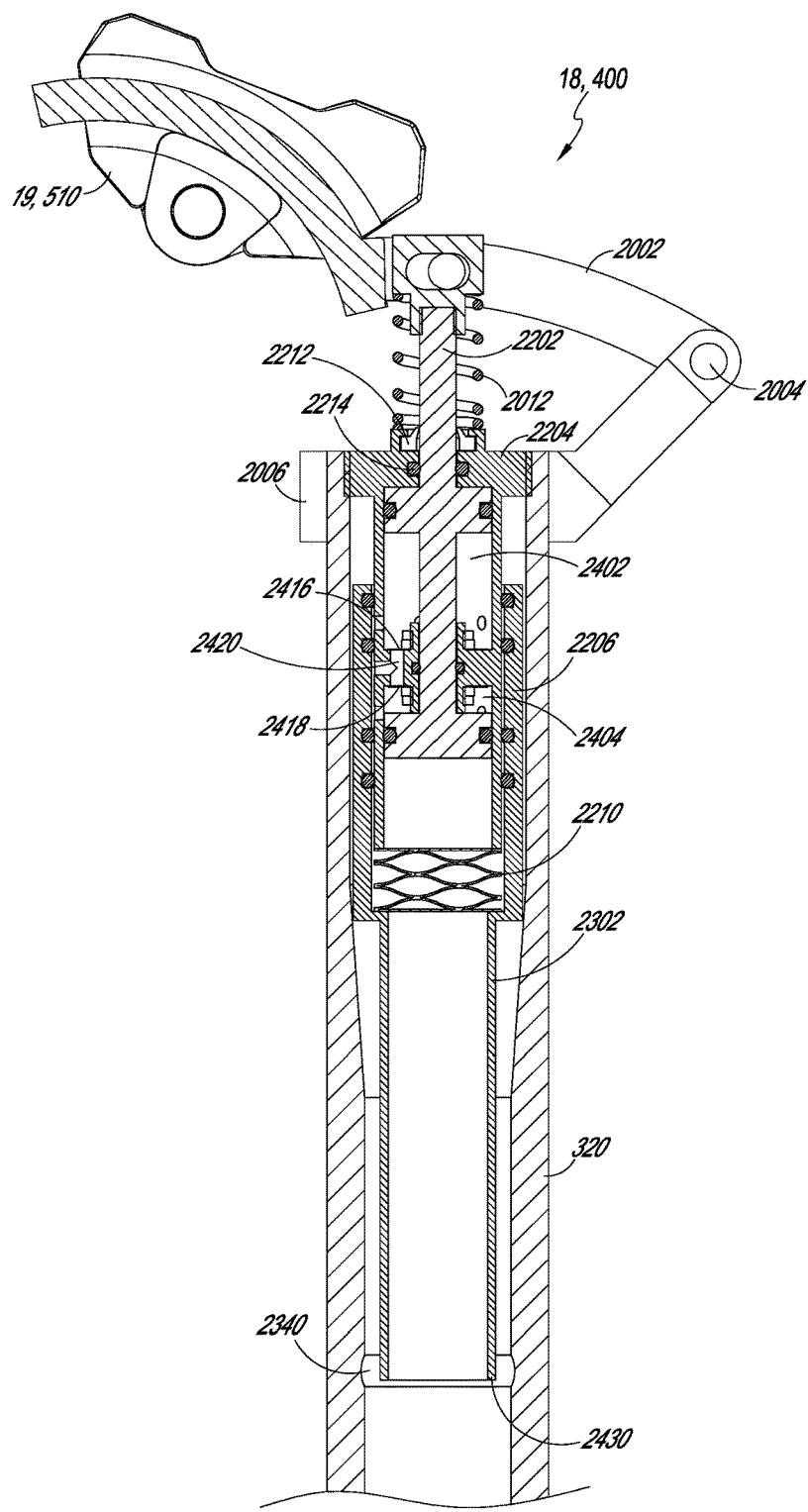
FIGS. 24-31 illustrate cross-sectional views of the saddle angle adjustment assembly of FIG. 18A in various stages of actuation.

FIGS. 24 and 25 illustrate the saddle receiver 19510 in its upward position with the upper support 320 in a raised position. The hydraulic portion of the saddle angle adjustment mechanism comprises two pistons 2502, 2504 and two chambers 2402, 2404. As can be seen in FIGS. 24 and 25, the hydraulic mechanism comprises a top chamber 2402 having a top piston 2502 and a bottom chamber 2404 having a bottom piston 2504. In the illustrated configuration (e.g., with the saddle and saddle post in raised positions), the top chamber 2402 is as large as it can be and the bottom chamber 2404 is as small as it can be. The pistons are locked in an upward position with the bottom piston 2504 being positioned against a stop surface 2530 to stop the piston rod 2202 from moving any further in the upward direction. The piston rod 2202 is prevented from moving any further in a downward direction by a series of one-way valves, which desirably comprise a variety of shims and orifices which prevent hydraulic fluid in the top chamber 2402 from moving to the bottom chamber 2404.

With reference to FIG. 25, the top chamber 2402 comprises a top orifice 2520, and the bottom chamber 2404 comprises a bottom orifice 2524. The inner sleeve 2204 further comprises a middle orifice 2522 leading to a passage 2420 between the top and bottom chambers 2402, 2404. The passage 2420 is sealed off from the top chamber 2402 and bottom chamber 2404 by a top shim 2416 and a bottom shim 2418. The shims act as one-way valves, wherein hydraulic fluid can pass from the passage 2420 to either the top chamber 2402 or the bottom chamber 2404, but the hydraulic fluid cannot pass back into the passage 2420 past the shims. It should be noted that, although shims are used in this design as one-way valves, various other mechanisms for preventing fluid flow in one direction but enabling fluid flow in another direction can be utilized. Further, although the descriptions with respect to FIGS. 24-31 describe fluid flow with respect to a single top, middle and bottom orifice, there are a plurality of orifices extending around the inner sleeve 2204 in the illustrated embodiment. The cross-section of these figures is merely taken through one set of those orifices, and the description is provided with respect to one set of the orifices, for simplicity.

With further reference to FIG. 25, when the saddle receiver 19510 is in the upper or raised position and the actuation extension 2302, and more specifically the actuation surface 2430 of the actuation extension 2302, has not contacted a mating actuation surface of the collet, the hydraulic fluid within the top chamber 2402 prevents the piston rod 2202 from dropping into a lower position. Hydraulic fluid is indicated by shading in FIGS. 25-31. As can be seen in FIG. 25, hydraulic fluid in the top chamber 2402 cannot enter the passage 2420, because the top shim 2416 prevents the fluid from moving into the passage 2420. Further, although hydraulic fluid can exit the top chamber 2402 through the top orifice 2520, the top two O-rings 2208 of the outer sleeve 2206 prevent that hydraulic fluid from moving beyond either of those O rings 2208. Accordingly, the piston rod 2202 is locked in the raised position.

FIG. 26 illustrates the start of a movement of the saddle receiver 19510 to a lowered position. In this case, the upper support 320 has dropped to a lowered position within the lower support 310. The actuation surface 2430 of the outer sleeve 2206 has contacted a mating surface of the collet 2220. This has caused the outer sleeve 2206 to translate upward with respect to the inner sleeve 2204. In translating upward, the spring 2210 has been compressed. Compressing the spring 2210 can enable the outer sleeve 2206 to automatically return to its lower or home position when the upper support 320 goes into a raised position with respect to the lower support 310.

As can be seen in FIG. 26, by raising the outer sleeve 2206, the O-rings 2208 have changed position with respect to the plurality of orifices. In particular, the top two O-rings 2208 have been raised above the top orifice 2520, and enabled fluid to flow out the top orifice 2520 and in through the middle orifice 2522, which enables the fluid to pass beyond the lower shim 2418 and into the bottom chamber 2404. Accordingly, the piston rod 2202 is no longer locked in an upper or raised position. If force is applied to the rod 2202 in a downward direction, as long as the force exceeds the force of the spring 2012, the actuation rod will move downward, transferring hydraulic fluid from the top chamber 2402 to the bottom chamber 2404 as it moves. FIG. 27 illustrates such a movement where the saddle receiver 19510 has been moved to the lowered position and hydraulic fluid from the top chamber 2402 has been moved into the bottom chamber 2404. In this case, at the lowered position, the piston rod 2202 is now locked in the lowered position. The actuation rod cannot move any lower, because the top piston 2502 is mated against a top stop surface 2730. Further, the piston rod 2202 cannot move back upward, because fluid cannot flow out of the bottom chamber 2404. The fluid cannot flow back past the bottom shim 2418, because the shim acts as a one way valve. Further, although the fluid can flow out of the bottom orifice 2524, the fluid cannot flow beyond the bottom two O rings 2208, effectively locking the pistons in the downward position.

In some embodiments, the amount of translation upward required by the outer sleeve 2206 to open the fluid flow paths enabling the piston rod 2202 to move downward is about 5 millimeters. In other embodiments, the amount of translation upward required by the outer sleeve 2206 to open the fluid flow paths enabling the piston rod 2202 to move downward is about 1, 2, 3, 4, 6, 7, 8, 9, 10, 11, 12, 13, 14, 15, 16, 17, 18, 19, or 20 millimeters.

It should be noted that the hydraulic assembly disclosed herein is capable of not only locking the pistons in the fully upward or fully downward position, but also enabling only one way motion. For example, in the configuration illustrated in FIGS. 26 and 27, where the outer sleeve 2206 is in a raised position, the pistons are able to move downward but not upward. Accordingly, if the saddle receiver 19510 were pushed downward only a portion of the way instead of all the way to a bottom position, the spring 2012 would not be able to raise the rotating arm 2002 back to the upward position, because hydraulic fluid cannot flow back from the bottom chamber 2404 into the top chamber 2402. Accordingly, the saddle receiver 19510 would remain in this partway down position until either it is pushed further down or the outer sleeve 2206 is dropped into a lower position as will be discussed in further detail below. Likewise, as is discussed below, when the piston rod 2202 is moving back upward and the outer sleeve 2206 is in a lowered position, the hydraulic system prevents the piston rod 2202 from being able to move downward until the outer sleeve 2206 is again raised into an upper position.

FIG. 28 is a further illustration of the hydraulic fluid flow path when the rotating arm 2002 is rotating downward to put the saddle receiver 19510 in a lowered or tilted backward position. Fluid starts in the top chamber 2402, flows out the top orifice 2520, down in the gap between the inner sleeve 2204 and the outer sleeve 2206, into the passage 2420 through the middle orifice 2522, down past the lower shim 2418, and into the bottom chamber 2404. As discussed above, the hydraulic fluid will then remain in the bottom chamber 2404 until the outer sleeve 2206 drops into a lowered position.

FIGS. 29-31 illustrate a return of the saddle receiver 19510 to its upward or tilted forward position. This movement starts by the actuation extension 2302 and outer sleeve 2206 dropping back down into its lowered position. For example, the upper support 320 may be raised to a raised position with respect to the lower support 310. This will enable the spring 2210 to force the outer sleeve 2206 back down with respect to the inner sleeve 2204. The spring 2210 moves the outer sleeve 2206 down until it stops when it hits the tapered wall 2902 on the interior of the upper support 320. Although in this embodiment, the downward motion of the outer sleeve 2206 is constrained by mating with a tapered wall 2902, various other mechanical means may be used to constrain the downward motion of the outer sleeve 2206. For example, the upper support 320 may include a shelf or step that mates with a mating surface of the outer sleeve 2206. In another example, the outer sleeve 2206 may hit a pin or step or other feature of the inner sleeve 2204, enabling a feature of the inner sleeve 2204 to restrain the downward motion, instead of a feature of the upper support 320. Similarly, although in this embodiment the actuation surface 2430 contacts the collet 2220 to move the outer sleeve 2206 upward, various other embodiments may use various other methods of moving the outer sleeve 2206 upward. For example, a surface of the outer sleeve 2206 may contact a mating surface of the lower support 310. In another embodiment, the outer sleeve 2206 may be cable actuated, such as by a manual control.

When the outer sleeve 2206 has dropped to its lowered position, the O-rings 2208 are positioned such that the bottom orifice 2524 can fluidly communicate with the middle orifice 2522. Accordingly, as shown in FIG. 30, hydraulic fluid can pass from the bottom chamber 2404 out the bottom orifice 2524, through the space between the inner and outer sleeves, into the middle orifice 2522, through the passage 2420, and past the top shim 2416 into the top chamber 2402. Accordingly, as shown in FIG. 30, the pistons and actuating rod can move upward within the inner sleeve 2204, enabling the rotating arm 2002 and saddle receiver 19510 to return to the top raised or tilted forward position. Although the embodiment shown in FIGS. 24-31 desirably comprises a plurality of O-rings 2208 having round cross-sectional shapes to form seals between the outer and inner sleeves, in other embodiments, other sealing means may be used to accomplish the functions described herein. For example, an embodiment may utilize custom-molded rubber or polymer seals, O-rings having cross-sectional shapes other than round, and/or the like.

One advantage of a hydraulic saddle angle adjustment mechanism is that the hydraulic mechanism also incorporates damping features to damp the upward and downward motion of the pistons which in turn damps the rotation of the saddle. The amount of dampening can be adjusted through various means, such as, for example, adjusting orifice size, changing the number of orifices, selecting a different type of one way valve, adjusting a stiffness of the shims used for the one way valves in the current embodiment, using a different viscosity fluid, using a pressure valve which opens under a higher pressure, etc. In an embodiment that uses a pressure valve that opens under a higher pressure, this can enable variable dampening. For example, if a high load is placed on the saddle, this pressure valve may open decreasing the dampening and enabling the saddle to tilt faster. However, if a lighter load is on the saddle, the pressure valve may not open, enabling increased dampening and a slower rotation of the saddle. Further, damping may be different in different directions. For example, a rider may wish there to be very little damping when rotating the saddle backward, but for there to be more damping when returning the saddle to its forward position. This may help to avoid injuring a rider by keeping the saddle from "snapping" forward.

Another advantage of the hydraulic system disclosed herein is the inherent one way motion. For example, in a situation where a bicycle rider wants to lower his or her seat post and tilt the saddle back, the rider may be in, for example, a bumpy downhill riding situation. Accordingly, the rider may operate a control to lower the seat post, and may begin to tilt the saddle back under his or her body weight. However, the rider may ride across a bump or void that causes the rider's body weight to be shifted upward and off of the saddle while the rider is in the process of tilting the saddle backward. If the one way functionality of the saddle rotation mechanism were not present, the spring 2012 may act to tilt the seat back up before the seat has been tilted all the way to its backward position. However, with this embodiment and other embodiments incorporating one way motion, the saddle will remain in its partially tilted position until either the rider places his or her body weight back on the saddle to continue the downward rotation or the seat post raises causing the hydraulic mechanism to unlock and release the saddle to move back to its upward or forward position.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

What is claimed is:

1. A bicycle saddle adjustment assembly comprising:
   an adjustable height saddle post, the adjustable height saddle post comprising a first support and a second support, the second support configured to slidably move relative to the first support between at least a raised position and a lowered position, the first support configured to attach to a bicycle frame; and
   a saddle adjustment mechanism coupled to the second support, the saddle adjustment mechanism comprising:
      a saddle support assembly comprising a saddle receiver adapted to couple to a bicycle saddle,
      wherein the saddle support assembly is pivotally supported at a pivot axis that is offset from a longitudinal axis of the second support; and
      an actuating member configured to translate relative to the second support in a direction parallel to the longitudinal axis of the second support,
      wherein the actuating member is coupled to the saddle support assembly such that translation of the actuating member with respect to the second support will cause the saddle support assembly to rotate about the pivot axis with respect to the second support.

2. The bicycle saddle adjustment assembly of claim 1, wherein the pivot axis is perpendicular to the longitudinal axis of the second support.

3. The bicycle saddle adjustment assembly of claim 1, wherein the second support comprises a tubular shape, and the pivot axis is positioned above a top end of the tubular shape.

4. The bicycle saddle adjustment assembly of claim 3, wherein the pivot axis is positioned at a distal end of a spacing arm that extends upward and laterally outward from the top end of the tubular shape.

5. The bicycle saddle adjustment assembly of claim 1, further comprising the bicycle saddle coupled to the saddle receiver, wherein the pivot axis is positioned forward of a midpoint of the bicycle saddle.

6. The bicycle saddle adjustment assembly of claim 1, wherein the actuating member is centered with respect to the longitudinal axis of the second support.

7. The bicycle saddle adjustment assembly of claim 1, wherein the saddle support assembly further comprises a rotating arm, the saddle receiver being affixed to the rotating arm, and
   wherein the actuating member is coupled to the rotating arm at a location between the pivot axis and the saddle receiver.

8. The bicycle saddle adjustment assembly of claim 1, wherein the saddle support assembly further comprises a rotating arm, the saddle receiver being affixed to the rotating arm, and
   wherein the rotating arm is directly coupled to the second support at the pivot axis.

9. The bicycle saddle adjustment assembly of claim 1, wherein sliding movement of the second support with respect to the first support is configured to cause translation of the actuating member with respect to the second support.

10. The bicycle saddle adjustment assembly of claim 9, wherein sliding movement of the second support with respect to the first support toward the lowered position is configured to cause translation of the actuating member with respect to the second support in a first direction parallel to the longitudinal axis, and sliding movement of the second support with respect to the first support toward the raised position is configured to cause translation of the actuating member with respect to the second support in a second direction, the second direction being opposite the first direction.

11. The bicycle saddle adjustment assembly of claim 10, further comprising a first stop surface that sets a maximum amount of translation of the actuating member in the first direction.

12. The bicycle saddle adjustment assembly of claim 11, further comprising a second stop surface that sets a maximum amount of translation of the actuating member in the second direction.

13. The bicycle saddle adjustment assembly of claim 1, wherein the adjustable height saddle post further comprises a locking mechanism configured to selectively lock the second support in one or more predetermined positions relative to the first support.

14. The bicycle saddle adjustment assembly of claim 13, wherein the locking mechanism comprises a collet positioned at least partially within an interior cavity of the second support.

15. The bicycle saddle adjustment assembly of claim 1, further comprising a controller, the actuation of which permits the height of the adjustable height saddle post to be selectively adjusted while the bicycle is in motion.

16. The bicycle saddle adjustment assembly of claim 1, further comprising an air spring configured to bias the second support toward the raised position.

17. The bicycle saddle adjustment assembly of claim 1, further comprising a damper configured to damp translation of the actuating member.

18. The bicycle saddle adjustment assembly of claim 1, further comprising the bicycle frame.

19. The bicycle saddle adjustment assembly of claim 18, wherein the adjustable height saddle post is attached to the bicycle frame in an arrangement with the pivot axis positioned forward of the longitudinal axis of the second support.

20. The bicycle saddle adjustment assembly of claim 18, further comprising the bicycle saddle, wherein the adjustable height saddle post is attached to the bicycle frame and the bicycle saddle is attached to the saddle receiver in an arrangement with the pivot axis positioned forward of the longitudinal axis of the second support and a midpoint of the bicycle saddle.

* * * * *